United States Patent
Suzuki et al.

[11] Patent Number: 5,929,438
[45] Date of Patent: Jul. 27, 1999

[54] CANTILEVER AND MEASURING APPARATUS USING IT

[75] Inventors: Yoshihiko Suzuki, Funabashi; Miyuki Niikura, Kawasaki; Tetsuji Onuki, Yokohama, all of Japan

[73] Assignee: Nikon Corporation, Japan

[21] Appl. No.: 08/783,951

[22] Filed: Jan. 16, 1997

Related U.S. Application Data

[63] Continuation-in-part of application No. 08/513,651, Aug. 10, 1995, abandoned.

[30] Foreign Application Priority Data

| Aug. 12, 1994 | [JP] | Japan | 6-190626 |
| Dec. 13, 1994 | [JP] | Japan | 6-308568 |
| Jan. 10, 1995 | [JP] | Japan | 7-018458 |
| Mar. 30, 1995 | [JP] | Japan | 7-097817 |
| Mar. 30, 1995 | [JP] | Japan | 7-097818 |
| Aug. 3, 1995 | [JP] | Japan | 7-198737 |
| Jan. 18, 1996 | [JP] | Japan | 8-006487 |

[51] Int. Cl.[6] ..................................................... G01B 7/00
[52] U.S. Cl. .......................... 250/306; 374/6; 374/124; 374/164; 136/228
[58] Field of Search .............................. 374/6, 124, 164; 136/228; 250/306

[56] References Cited

U.S. PATENT DOCUMENTS

| Re. 33,387 | 10/1990 | Binnig | 250/306 |
| 4,724,318 | 2/1988 | Binnig | 250/306 |
| 4,747,698 | 5/1988 | Wickramasinghe et al. | 250/306 |
| 5,047,637 | 9/1991 | Toda | 250/306 |
| 5,239,863 | 8/1993 | Kado et al. | 73/105 |
| 5,294,790 | 3/1994 | Ohta et al. | 250/306 |
| 5,356,218 | 10/1994 | Hopson et al. | 250/306 |
| 5,581,083 | 12/1996 | Majumdar et al. | 250/306 |

FOREIGN PATENT DOCUMENTS 62-130302  6/1987  Japan.

OTHER PUBLICATIONS

Meyer et al., "Novel Optical Approach to Atomic Force Microscopy", Appl. Phys. Lett. 53 (12) Sep. 19, 1988.

Williams et al., "Scanning Thermal Profiler", Appl. Phys. Lett. 49 (23) Dec. 8, 1986.

*Primary Examiner*—Jack I. Berman
*Attorney, Agent, or Firm*—Pennie & Edmonds LLP

[57] ABSTRACT

The present invention relates to a cantilever for separately observing a temperature profile of a surface of a sample and the topography thereof. The cantilever of the present invention comprises a support, a flexible plate one end of which is supported by the support, and a probe provided at the tip of the flexible plate, in which a thermocouple is provided in the probe.

31 Claims, 34 Drawing Sheets

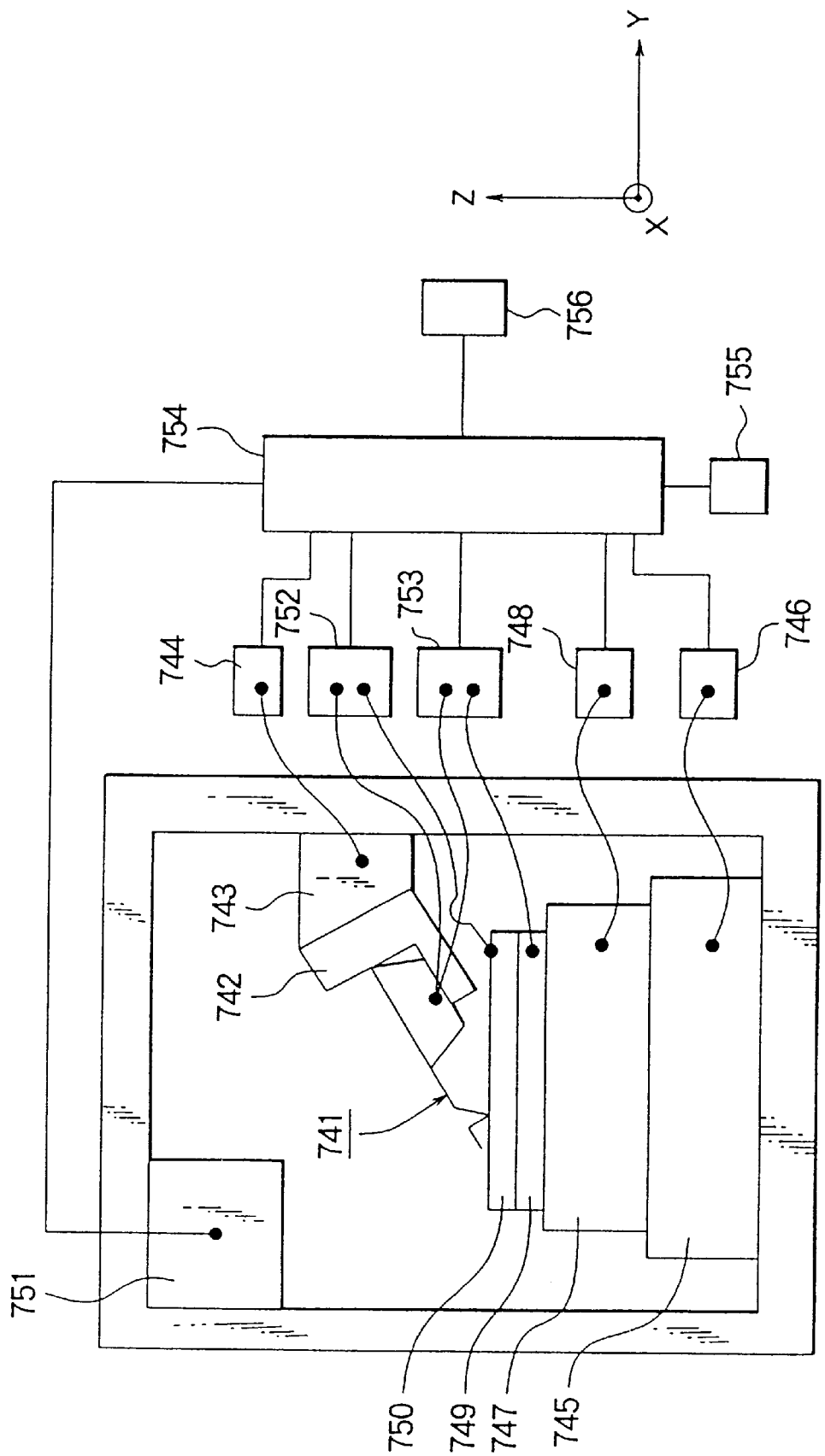

1

CANTILEVER AND MEASURING APPARATUS USING IT

RELATED APPLICATIONS

This a Continuation-In-Part application of application Ser. No. 08/513,651 filed on Aug. 10, 1995, now abandoned.

BACKGROUND OF THE INVENTION

1. Field of the Invention

The present invention relates to a microscopic cantilever, and measuring apparatus using the cantilever, such as a scanning thermal profiler.

2. Related Background Art

The recent progress in scanning microscopes made it possible to obtain an image resulting from the topography of a surface of a substance or a physicochemical property thereof in the resolution of atomic or molecular order.

In the field of such scanning microscopes there is proposed a scanning thermal profiler (hereinafter referred to as STP) for detecting a thermal profile of a surface of a sample (Appl. Phys. Lett. 49 (23), Dec. 8, 1986 P1587–1589). FIG. 1 is a schematic structural drawing to show a conventional STP. This apparatus is an application of the technology of scanning tunneling microscope (hereinafter referred to as STM), which uses a probe 100 having a first conductor 101, an insulator 102, a second conductor 103, and a thermocouple joint 104. In order to compose a thermocouple by the first conductor 101 and second conductor 103, they are made of different types of conductors. Further, the insulator 102 is formed between the first conductor 101 and the second conductor 103, so that the first conductor 101 and the second conductor 103 can be arranged to avoid electrical contact with each other in the portions other than the thermocouple joint 104. The operation of this apparatus is next explained. The probe 100 is arranged as movable by a piezoelectric device 105 in the X-, Y-, and Z-directions. The thermocouple joint 104 in the probe 100 can detect heat in a sample 106. Similarly as with STM, topography of sample 106 can be observed by moving the probe 100 by the piezoelectric device 105 in the Z-axis direction (the direction nearly perpendicular to the surface of sample) while keeping heat of sample detected by the probe 100 always constant upon scanning with probe 100 in the X- and Y-directions, and detecting displacements of probe 100 in the Z-axis direction (the direction nearly perpendicular to the surface of sample). Also, the thermal profile of sample 106 can be observed by scanning the sample with the probe 100 in the X- and Y-directions while keeping the probe 100 at a certain constant height.

SUMMARY OF THE INVENTION

A cantilever of the present invention comprises a support, a flexible plate one end of which is supported by the support, and a probe provided at the tip of the flexible plate, in which a thermocouple is provided in the probe.

A scanning thermal profiler according to the present invention comprises a flexible spring body having a probe and a thermocouple formed in the probe, parallel movement means for effecting relative movement between the probe and a sample substantially in parallel with the surface of the sample while keeping the probe in contact with the surface of sample, and thermal electromotive force detecting means for detecting a thermal electromotive force generated in the thermocouple.

In this case, a preferred embodiment is so arranged that the spring body is the above cantilever and that the cantilever is provided with deflection detecting means for detecting a deflection of the cantilever, perpendicular movement means for effecting relative movement between the cantilever and the sample in a direction substantially perpendicular to the surface of sample so as to keep the deflection of the cantilever constant, based on a signal from the deflection detecting means, and means for detecting an amount of the relative movement in the direction substantially perpendicular to the surface of sample between the cantilever and the sample.

A scanning thermal profiler of the present invention comprises the above cantilever, vibrating means for vibrating the cantilever, thermal electromotive force detecting means for detecting a thermal electromotive force of a thermocouple, vibration frequency detecting means for detecting a vibration frequency of the cantilever, perpendicular movement means for effecting relative movement between the cantilever and the sample in a direction substantially perpendicular to the surface of sample so as to keep constant the vibration frequency detected by the vibration frequency detecting means, and parallel movement means for effecting relative movement between the sample and the cantilever substantially in parallel with the surface of sample.

In this case, a preferred embodiment is so arranged that the apparatus is provided with means for detecting an amount of the relative movement between the probe and the sample in the direction substantially perpendicular to the surface of sample, effected by the perpendicular movement means.

Also, another preferred embodiment is so arranged that the apparatus is provided with means for outputting an image signal for forming an image of thermal profile of the sample, based on a signal from the thermal electromotive force detecting means.

Since the scanning thermal profiler of the present invention can separately detect the topography of the sample surface and the thermal profile of the sample by utilizing the technology of atomic force microscope (hereinafter referred to as AFM), the thermal profile of sample can be accurately detected. More specifically, the thermocouple is mounted in the probe disposed at the tip of the cantilever (spring body) used in AFM etc., the probe is always kept in contact with the sample surface, and the probe scans the sample surface in the X- and Y-directions, whereby only the temperature profile of sample can be independently observed, thus permitting the temperature profile of sample to be accurately detected.

On this occasion, the probe at the tip of the cantilever is always kept in contact with the sample surface. Accordingly, not only the thermal profile of sample but also the topography of sample surface can be observed by providing the means for detecting the deflection of the cantilever, applying the AFM of the contact mode, and moving the cantilever or the sample in the Z-axis direction (the direction perpendicular to the sample surface) so as to keep the deflection constant. The AFM of the contact mode is the technology for detecting the topography of sample surface by bringing the cantilever in contact with the sample surface and detecting the deflection of the cantilever changing depending upon the topography of sample surface.

The scanning thermal profiler of the present invention can permit the thermal profile of sample to be independently observed if it is provided with the means for vibrating the cantilever and the means for detecting the vibration frequency of the cantilever, applying the AFM of the non-contact mode. The AFM of the non-contact mode is the technology for detecting the topography of sample by vibrating the cantilever while keeping constant the distance between the cantilever and the sample and detecting the vibration frequency of the cantilever changing according to the change of distance between the cantilever and the sample. Namely, the above arrangement can always keep constant the distance between the center of vibration of the cantilever and the sample surface, which permits only the thermal profile of sample to be independently observed. On this occasion, the topography of sample surface can also be observed at the same time.

As described above, when the topography of sample surface and the thermal profile of sample are simultaneously and independently observed, there is no defect that the time is consumed for the work for making coincidence between observation regions; and, because an actually observing region is perfectly the same, there is no labor and time for correspondence and analysis between the image of topography of sample surface and the image of temperature profile.

Another cantilever of the present invention comprises a support, a flexible plate one end of which is supported by the support, a probe provided in the tip region of the flexible plate, and a heater for heating the tip of the probe, in which a thermocouple is provided in the probe.

A preferred embodiment is so arranged that at least a part of a metal material composing the thermocouple also serves as a high thermal conductor interposed between the heater and the probe.

A first heater of the present invention comprises the above cantilever, heating drive means for making the heater generate heat, first moving means for moving the probe relative to the sample in a direction on a plane substantially parallel to the surface of the sample, second moving means for moving the probe relative to the sample in a direction substantially perpendicular to the surface of the sample, temperature controlling means for controlling the heating drive means so as to set the temperature of the probe to a desired temperature, based on a thermal electromotive force from the thermocouple, and control means for controlling the heating drive means and the first and second moving means so that only a desired point on the surface of the sample is heated or points in a desired region on the surface of sample are successively heated in the state where the cantilever is deflected so as to urge the probe against the surface of the sample.

A second heating apparatus of the present invention comprises the above cantilever, heating drive means for making the heater generate heat, deflection detecting means for detecting a deflection of the cantilever, first moving means for moving the probe relative to the sample in a direction on a plane substantially parallel to the surface of the sample, second moving means for moving the probe relative to the sample in a direction substantially perpendicular to the surface of the sample, means for controlling the first moving means so that the probe comes to be opposed to a desired point on the surface of sample or successively scans points in a desired region on the surface of sample, while controlling the second moving means so that the deflection of the cantilever becomes constant, based on a detection signal from the deflection detecting means, means for controlling the heating drive means so as to heat only a desired point on the surface of sample or so as to successively heat points in a desired region on the surface of sample, and temperature controlling means for controlling the heating drive means so as to set the temperature of the probe to a desired temperature, based on a thermal electromotive force from the thermocouple.

A third heating apparatus of the present invention comprises the above cantilever, heating drive means for making the heater generate heat, vibrating means for vibrating the cantilever, vibration frequency detecting means for detecting a vibration frequency of the cantilever, first moving means for moving the probe relative to the sample in a direction on a plane substantially parallel to the surface of sample, second moving means for moving the probe relative to the sample in a direction substantially perpendicular to the surface of the sample, means for controlling the first moving means so that the probe comes to be opposed to a desired point on the surface of sample or successively scans points in a desired region on the surface of sample, while controlling the second moving means so as to keep the vibration frequency of the cantilever constant, based on a detection signal from the vibration frequency detecting means, means for controlling the heating drive means so as to heat only a desired point on the surface of sample or so as to successively heat points in a desired region on the surface of sample, and temperature controlling means for controlling the heating drive means so as to set the temperature of the probe to a desired temperature, based on a thermal electromotive force from the thermocouple.

A heating-topography measuring apparatus of the present invention comprises the above heating apparatus, and means for obtaining information concerning a relative position of the probe to the surface of sample in the direction substantially perpendicular to the surface of sample with respect to a relative position of the probe to the surface of sample in the direction on the plane substantially parallel to the surface of sample.

With the cantilever in which the heater heats the tip of the probe, the surface of sample can be heated through the tip of the probe by bringing the tip of the probe into contact with the surface of sample or to the proximity of the surface with a fine gap. Since the tip of the probe can be arranged as very sharp as in the cantilever employed in the scanning atomic force microscope, a fine region of atomic or molecular order on the surface of sample can be heated through the tip of the probe. Further, when the probe is provided with the thermocouple, the temperature of the probe can be controlled at desired temperature, based on the thermal electromotive force from the thermocouple. This enables a fine region of atomic or molecular order on the surface of sample to be heated locally and at desired temperature through the tip of the probe.

With the cantilever employing the cantilever beam structure, the tip of the probe can be brought into contact with the surface of sample or to the proximity of the surface with a fine gap, skillfully utilizing the deflection of the flexible plate.

With the cantilever in which at least a part of the metal material composing the thermocouple also serves as a high thermal conductor interposed between the heater and the probe, heat from the heater is efficiently transferred to the tip of the probe even if the heater is set at a position relatively distant from the probe, for example when the heater is located around the probe in the flexible plate. Thus, the surface of sample can be efficiently heated.

In the first heating apparatus of the present invention, the control means controls the heating drive means and the first and second moving means so as to heat only a desired point on the surface of sample or so as to successively heat points in a desired region on the surface of sample in the state where the cantilever is deflected so as to urge the probe against the surface of sample. In this case, because the probe is urged against the surface of sample by the deflection of the cantilever, the probe can be kept in sure contact with the surface of sample, and heat conduction is effectively made from the tip of the probe to the surface of sample. Also, when the probe scans the surface of sample to heat a desired region on the surface of sample, the probe can follow the topography of the surface of sample because of the deflection of the cantilever, which can keep the probe in sure contact with the surface of sample and which can make effective heat conduction from the tip of probe to the surface of sample. Further, the sample can be heated at desired temperature because the temperature of the probe is controlled at desired temperature, based on the thermal electromotive force from the thermocouple.

In the second heating apparatus of the present invention, the first moving means is controlled so as to make the probe opposed to a desired point on the surface of sample or so as to make the probe successively scan points in a desired region on the surface of sample, while the second moving means is controlled so as to keep the deflection of cantilever constant. Also, the heating drive means is controlled so as to heat only a desired point on the surface of sample or so as to successively heat points in a desired region on the surface of sample. Accordingly, only the desired point on the surface of sample is heated or the points in the desired region on the surface of sample are successively heated, while realizing the movement control of the probe similar to the so-called contact mode in the atomic force microscope. Since this arrangement permits the contact state between the probe and the surface of sample to be kept constant following the topography of the surface of sample, the heating efficiency of the surface of sample can be kept constant independent of the topography of the surface of sample. Since the movement control of the probe similar to the contact mode is realized, data on the topography of the surface of sample can be obtained at the same time as heating of the surface of sample, before heating, or after heating by obtaining information concerning relative positions, as in the above heating-topography measuring apparatus, which is preferred in respect of determining a heating portion on the surface of sample or observing the sample. Since the temperature of the probe is controlled at desired temperature, based on the thermal electromotive force from the thermocouple, the sample can be heated at desired temperature.

In the third heating apparatus of the present invention, the cantilever is vibrated by the vibrating means, and the first moving means is controlled so as to make the probe opposed to a desired point on the surface of sample or so as to make the probe successively scan points in the desired region on the surface of sample, while controlling the second moving means so as to keep the vibration frequency constant. Also, the heating drive means is controlled so as to heat only a desired point on the surface of sample or so as to successively heat points in a desired region on the surface of sample. Accordingly, only the desired point is heated on the surface of sample or the points are successively heated in a desired region on the surface of sample, while realizing the movement control of the probe similar to the so-called non-contact mode in the atomic force microscope. Since this arrangement permits the distance between the center of vibration of the probe and the surface of sample to be kept constant as following the topography of the surface of sample, the heating efficiency of the surface of sample can be kept constant independent of the topography of the surface of sample. Since the movement control of the probe similar to the non-contact mode is realized, data on the topography of the surface of sample can be obtained at the same time as heating of the surface of sample, before heating, or after heating by obtaining information concerning relative positions as in the above heating-topography measuring apparatus, which is preferred in respect of determining a heating portion on the surface of sample or observing the sample. Further, because the temperature of the probe is controlled at desired temperature, based on the thermal electromotive force from the thermocouple, the sample can be heated at desired temperature.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 67 is a schematic structural drawing of a scanning probe microscope according to Embodiment 18 of the present invention.

DESCRIPTION OF THE PREFERRED EMBODIMENTS

Embodiment 1

Figure 1:
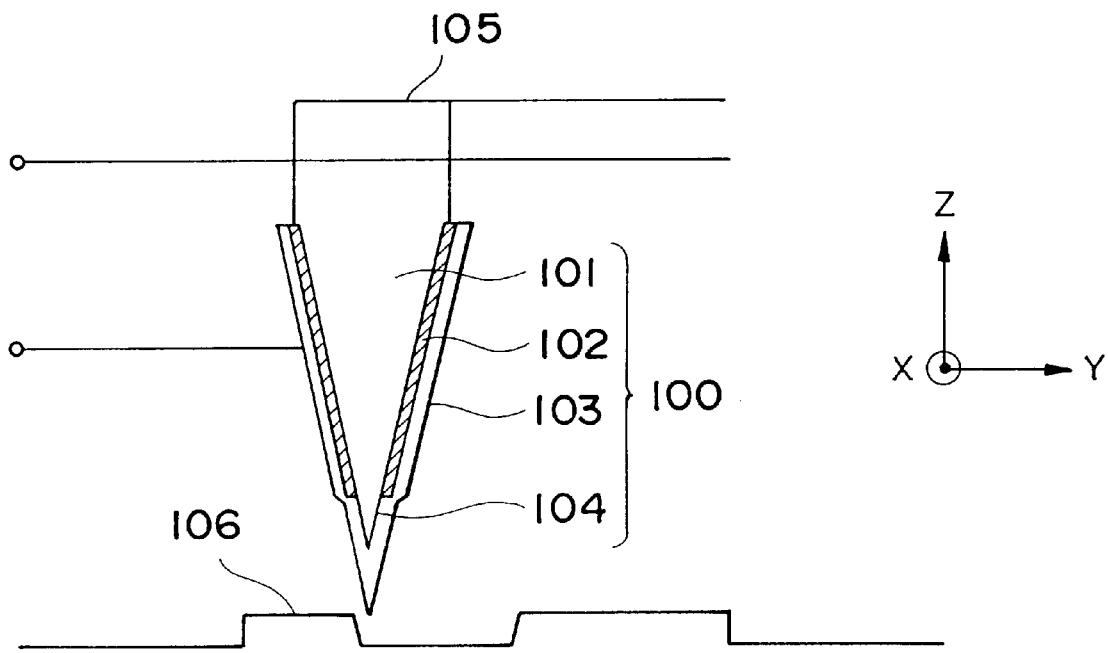
FIG. 1 is a schematic structural drawing to show a conventional scanning thermal profiler.

In observing the thermal profile of sample 106, the conventional STP as shown in FIG. 1 would fail to perform accurate detection of thermal profile of sample 106 if the sample 106 should have topography. The reason is that the conventional apparatus were not arranged to be capable of observing the thermal profile of sample 106 and the topography of sample surface separately from each other.

The present invention enables separate observation of the thermal profile and the topography of the sample surface.

Figure 2A:
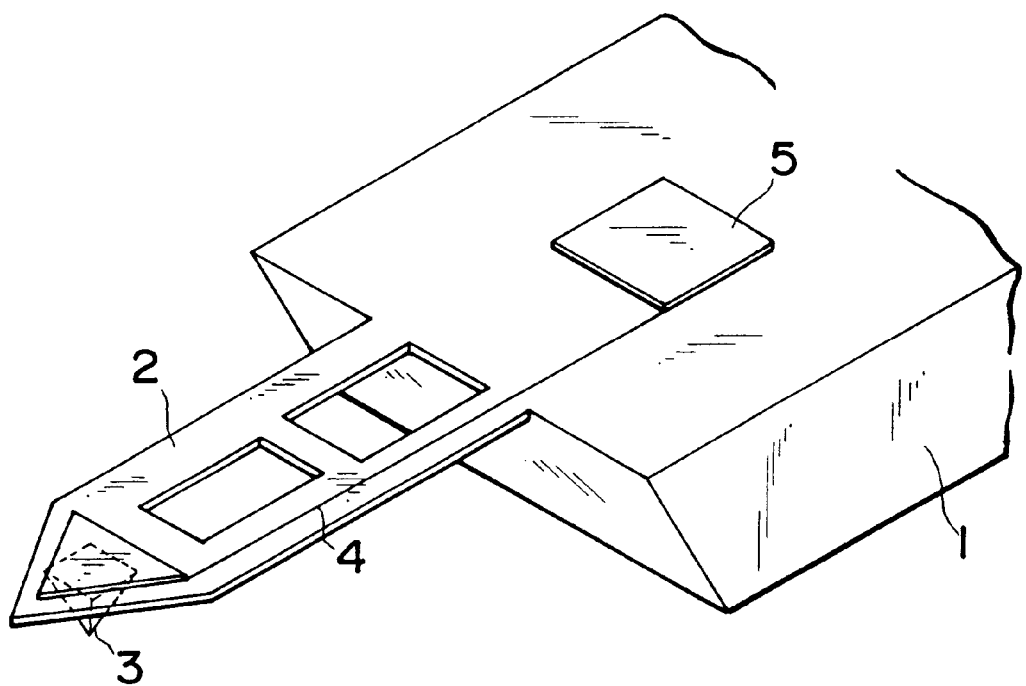
FIG. 2A is a schematic perspective view to show a cantilever according to Embodiment 1 of the present invention.
Figure 2B:
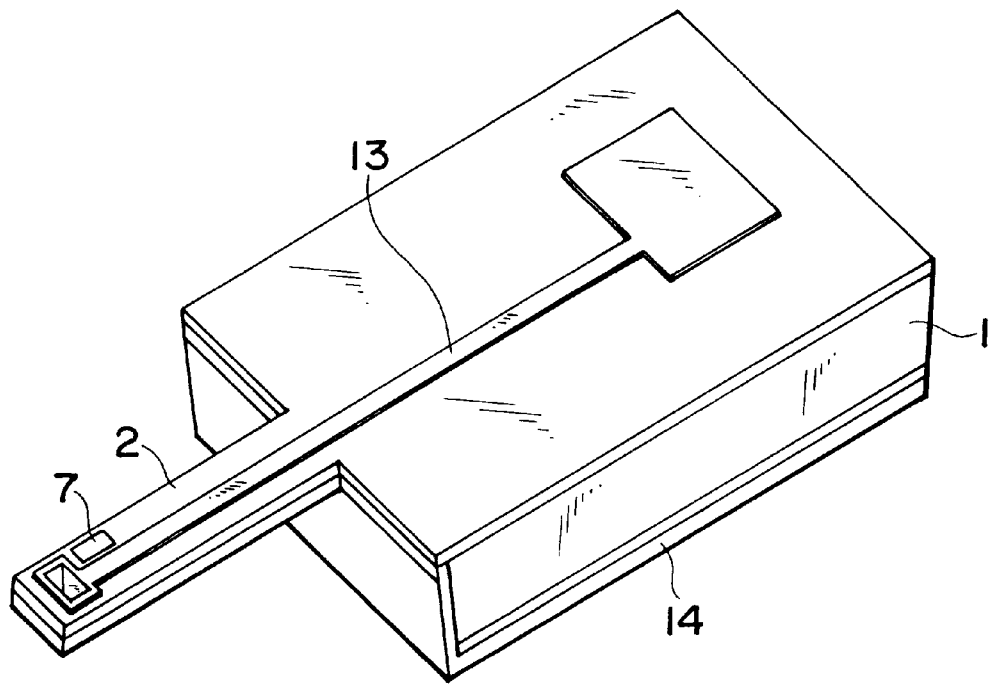
FIGS. 2B and 2C show a first modification of Embodiments 1 of the present invention.

FIG. 2A is a schematic perspective view to show a cantilever according to Embodiment 1 of the present invention.

The cantilever according to Embodiment 1 has a support 1, a flexible plate 2 one end of which is supported by the support 1, a probe 3 provided with a thermocouple, a metal line 4, and an electrode layer 5.

Next explained referring to FIGS. 3A, 3B, 3C and 3D are a method for fabricating the cantilever according to Embodiment 1.

Figure 3A:
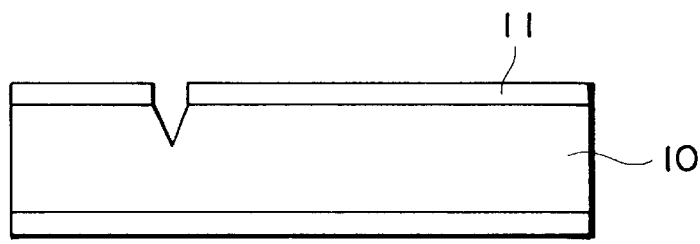
FIGS. 3A, 3B, 3C and 3D are drawings to show a method for fabricating the cantilever according to Embodiment 1.

On an n-type silicon substrate 10 of the (100) plane orientation covered with a natural oxide film and having the diameter of 3 inches and the thickness of 250 $\mu$m, a silicon nitride film 11 was formed in the thickness of 700 nm by the low pressure vapor phase growth process, using raw materials of dichlorosilane and ammonia gas. Further, the silicon nitride film 11 on the substrate 10 was partially removed by the photolithography process and the dry etching process. The shape of the removed portion was about 5 $\mu$m to 10 $\mu$m square. These pattern shape and size may be arbitrarily set. Then this sample was immersed in a silicon etchant, such as an aqueous potassium hydroxide (KOH) solution or an aqueous tetramethylammonium hydroxide (TMAH) solution, to etch the exposed silicon part in a quadrangular pyramid shape to form a trench (FIG. 3A).

Figure 3B:
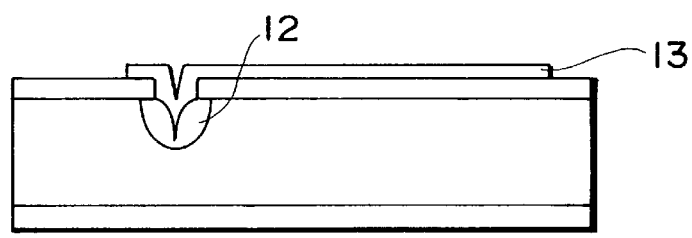

Then the sample was set in an electric oven to grow a silicon dioxide film 12 in the exposed silicon trench. Generally, the growth rate of the silicon oxide film is faster at a flat portion but slower at corners. Because of this property, a cross section of the silicon dioxide film grown in the trench is as shown in FIG. 3B, very thin in the bottom part. A metal film 13, such as gold, platinum, nichrome, chromel, alumel, platinum rhodium, or nickel, was patterned on the top surface of the sample by the lift-off process (FIG. 3B).

Figure 3C:
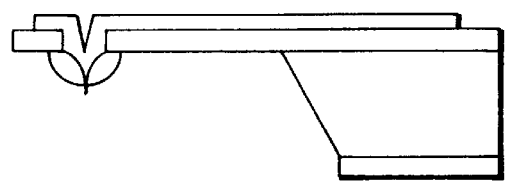

After that, this sample was subjected to such patterning that the top surface of substrate was patterned in the cantilever shape and the back surface of substrate in the shape of support. Then the sample was immersed in an aqueous tetramethylammonium hydroxide (TMAH) solution adjusted in a concentration of 20 to 25 wt % and heated at 80°, thereby dissolving only unnecessary silicon portions to form a cantilever in a cantilever beam state. The sample was then immersed in an aqueous potassium hydroxide solution adjusted in a concentration of 40 wt % and heated at 85°, for about 30 minutes, thereby etching a very small amount of the entire silicon dioxide film 12 in the probe portion to expose the metal film 13 in the thinnest probe top part of the silicon dioxide film (FIG. 3C).

Figure 3D:
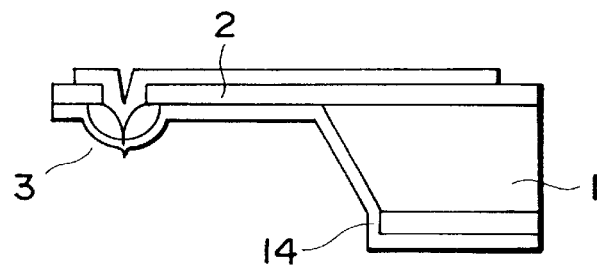

Then a metal film 14 of a kind different from the metal film 13 previously formed was formed on the back surface side of substrate, thereby producing the cantilever comprised of the support 1 for supporting the flexible plate 2, the flexible plate 2 projecting from the support 1, and the probe 3 provided with a thermocouple at the top, in the tip region of the flexible plate (FIG. 3D).

Incidentally, as generally known, detection of temperature in the thermocouple is conducted in a joint portion of thermocouple (where two conductors are connected to each other). Therefore, for more accurate detection of thermal profile of sample, the lower conductor of the cantilever of FIG. 3D (the metal film 14) is preferably to be thin in film thickness and high in thermal conductivity in the two conductors used for the thermocouple in the cantilever of Embodiment 1.

Further, the tip of probe is preferably arranged as acute as possible for observing the thermal profile of sample and the topography of sample surface in high resolution. The metal materials used for the metal films 13, 14 as two types of conductors may be arbitrarily selected so as to match with temperatures of a sample subjected to temperature measurement.

Figure 2C:
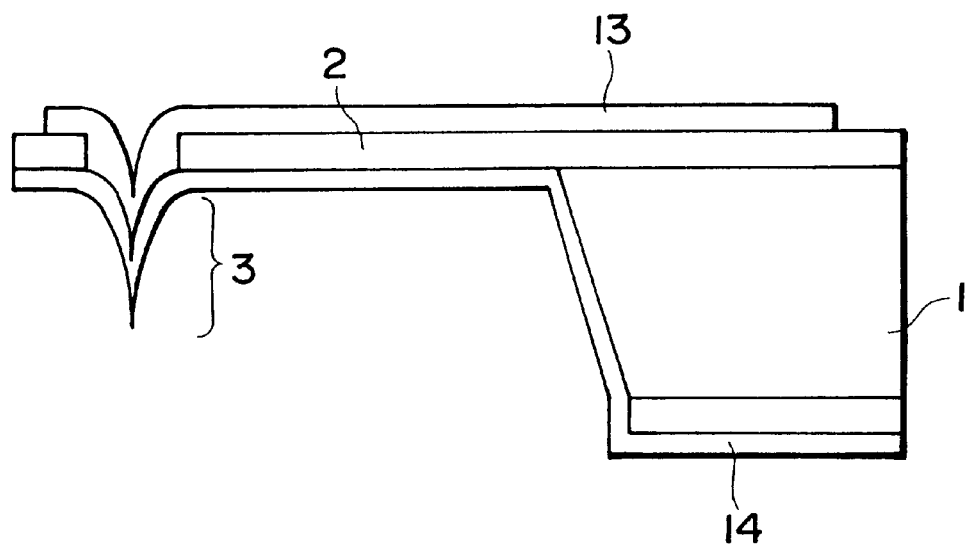
Figure 4A:
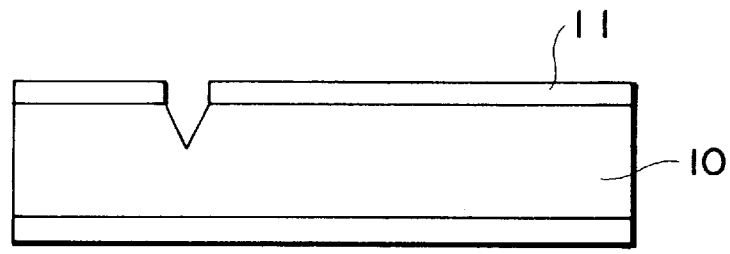
FIGS. 4A, 4B, 4C and 4D are drawings to show each steps in a mehod of fabricating the cantilever according to the first modification of Embodiment 1.
Figure 4B:
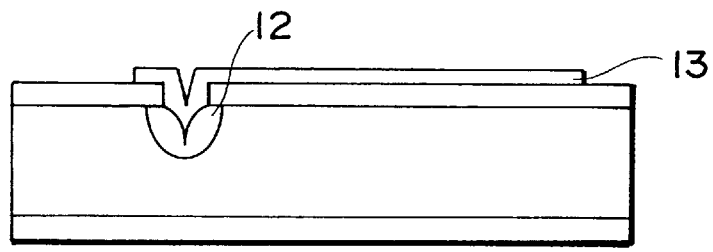
Figure 4C:
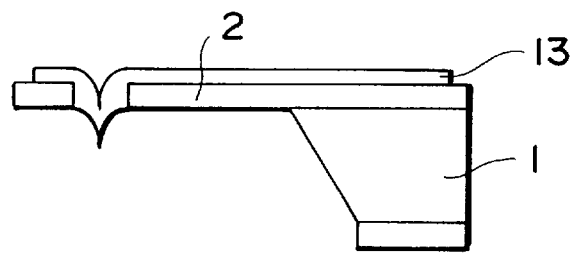
Figure 4D:
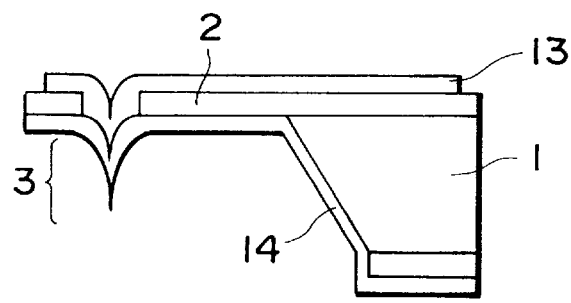

FIGS. 4A–4D show the first modification of Embodiment 1. FIGS. 4A–4B are the same as FIGS. 3A and 3B. In the first modification, as shown in FIG. 2C, a silicon dioxide film 12 is not provided between the metal film 13 and the metal film 14. Further, a laser reflection film 7 is formed on a main surface of the flexible plate and the laser reflection film 7 is used for measurement. In the first modification, the formation of the trench, the growth of the silicon dioxide film 12 and the patterning of a cantilever shape are the same as those of Embodiment 1. But, in the first modification, the formation of the laser reflection film 7 and the complete removal of the silicon dioxide 12 are performed. Especially, after the patterning of the cantilever shape, the sample 10 is immersed in an aqueous potassium hydroode (KOH) adjusted in a concentration of 33 wt % and heated at 80° thereby etching the substrate 10. That is, the exposed silicon which is not covered with a silicon nitride film and all of the silicon dioxide 12 are dissolved so that a cantilever in a cantilever beam state is formed (FIG. 4C). Next, the metal film 14 is formed on a main surface opposite to a main surface on which the metal film 13 is formed. The metal film 14 is formed on the whole of the surface without applying patterning. Therefore the metal layer covers the junction hole formed on the flexible plate and the metal film 14 extends to the support 1. Therefore, a probe 3 of a thermal couple which consists the metal films 13 and 14 is located on a top of the flexible plate 2. The tip of the probe 3 has a sharp shape as a niddle.

Figure 5A:
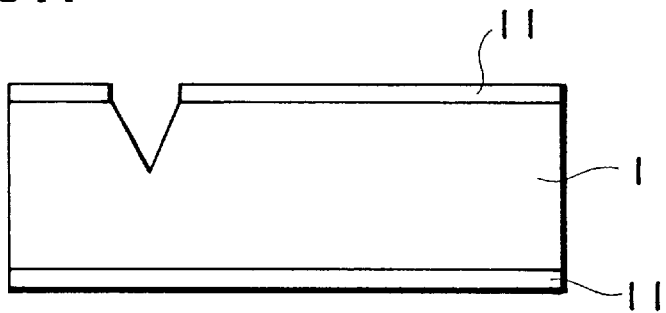
FIGS. 5A, 5B, 5C and 5D are drawings to show each steps in a method for fabricating the cantilever according to the second modification of Embodiment 1.
Figure 5B:
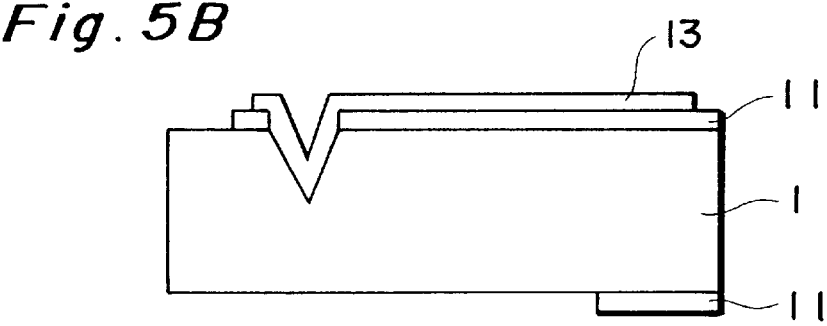
Figure 5C:
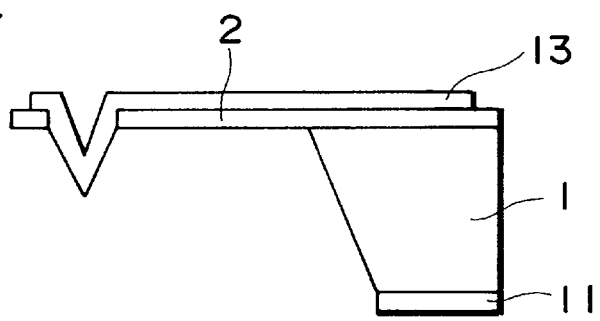
Figure 5D:
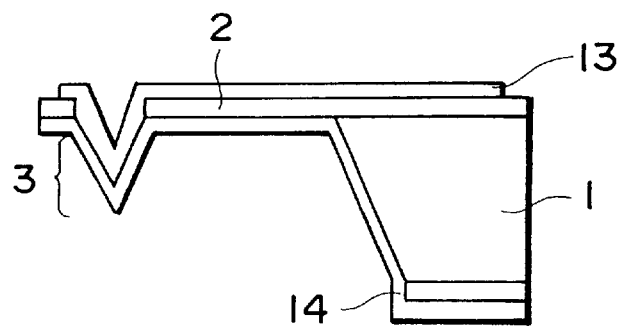

Next, FIGS. 5A–5D show the second modification of Embodiment 1. FIG. 5A is the same as FIGS. 3A and 4A. The second modification is formed without forming a silicon dioxide film 12. A probe of the second modification is formed by utilizing the anisotropic etching. The second modification has a probe of which tips has a apex angle of about 70 degree of which angel is defined by anisotropic etching of (111) plane in a silicon single crystal, as shown in FIG. 5A. Each step of the fabrication method of the second modification is shown in FIGS. 5A–5D. The formation of the junction hole is the same as that of the first modification anf the Embodiment 1 and the formations of the metal films 13 and 14 are the same as those of the first modification and the Embodiment 1. That is, the etching of the substrate 1 is performed by anisotoropic etchant, KOH and the etching automatically stops when 4-(111) planes of the silicon sigle crystal are exposed. The trench exposed by the junction hole 3a is defined by (111) planes of the silicon single crystal which are exposed by the etching. The other steps in the second modification are the same as those of the first modification. Therefore, the probe 6 of a thermocouple has a sharp shape having a apex angle of about 70 degree. In the second modification, the fablication method becomes simple because it is not necessary to form silicon dioxide film.

Embodiment 2

Figure 7:
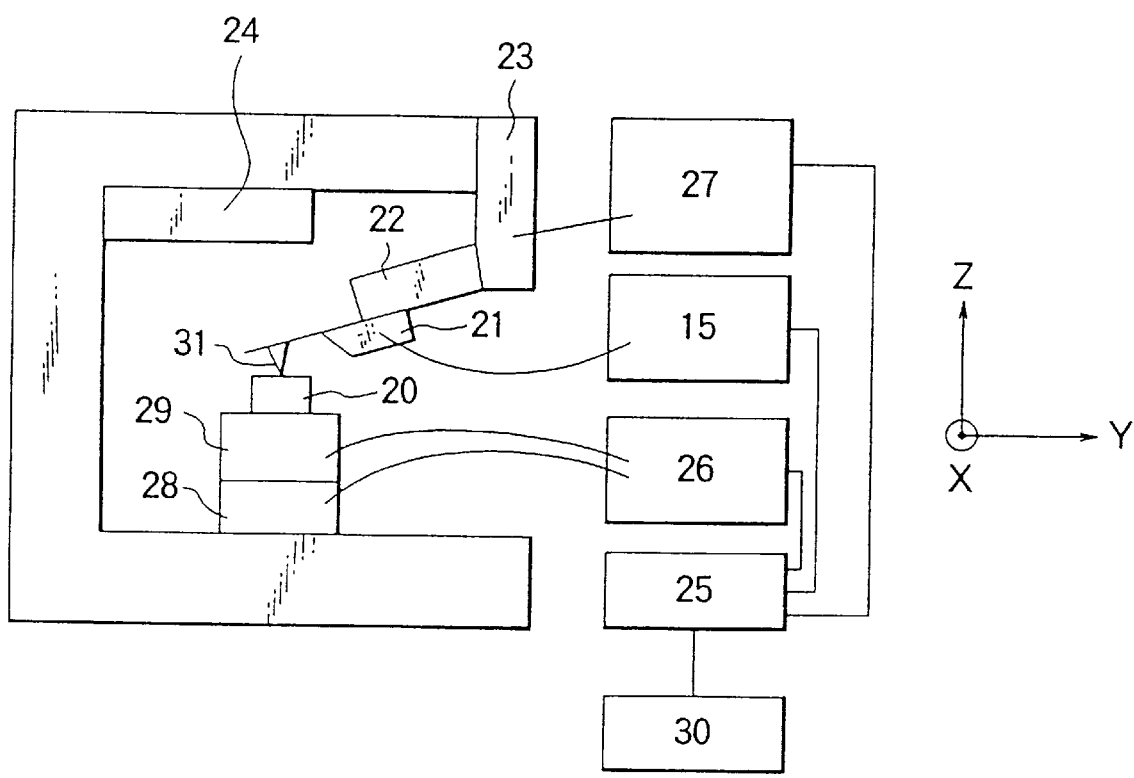
FIG. 7 is a schematic structural drawing to show a scanning thermal profiler according to Embodiment 2 of the present invention.

FIG. 7 is a schematic structural drawing to show a scanning thermal profiler (STP) according to Embodiment 2 of the present invention.

The cantilever used in the STP according to Embodiment 2 was the cantilever produced in Embodiment 1.

The STP according to Embodiment 2 has the cantilever 21 produced in Embodiment 1, a cantilever holder 22 for holding the cantilever 21, a cantilever moving unit 23 for moving the cantilever 21 together with the cantilever holder 22, a sample coarse movement unit 28 for coarsely moving a sample 20 (or roughly moving the sample), a sample fine movement unit 29 for finely moving the sample 20 (or microscopically moving the sample), a deflection detecting unit 24 for detecting a deflection of the flexible plate of the cantilever 21, a cantilever movement power supply 27 for supplying an electric signal to the cantilever moving unit 23, a thermal electromotive force detecting apparatus 15 for detecting a thermal electromotive force generated by the thermocouple provided in the cantilever 21, a sample movement power supply 26 for supplying electric signals to the sample coarse movement unit 28 and the sample fine movement unit 29, a computer 25 for controlling the sample movement power supply 26 and the cantilever movement power supply 27, based on information from the deflection measuring unit 24, to obtain image signals as to the topography of the surface of sample 20 and the temperature profile thereof from a signal from the thermal electromotive force detecting apparatus 15, and also from states of the deflection measuring unit 24, sample movement power supply 26, and cantilever movement power supply 27, and a CRT 30 for displaying an image, based on the image signals from the computer 25. The sample fine movement unit 29 also serves as a sample stage for a sample to be measured.

Specifically describing, the cantilever moving unit 23 is a stepping motor or a piezoelectric device, and the sample coarse movement unit 28 is a stepping motor. The sample fine movement unit 29 is one as called as a tube scanner comprised of a piezoelectric device, which is movable in the X-, Y-, and Z-directions. The deflection detecting unit 24 is composed of a laser light source for irradiating a laser beam to the cantilever 21 and a bisected photodetector for detecting the laser light reflected by the cantilever 21, which detects a deflection by the optical lever method.

The operation of this apparatus is next explained.

First, position adjustment of the cantilever is carried out using the cantilever moving unit 23. This position adjustment means that the position of the cantilever 21 is adjusted so that when the laser light from the laser light source composing the deflection detecting unit 24 is irradiated onto a predetermined position of the cantilever 21, the laser light reflected by the cantilever 21 is incident at a predetermined position of the bisected photodetector thereto. Next, the sample is set on the sample fine movement unit 29, and thereafter, in order to roughly bring the cantilever 21 to near the sample, the sample is moved by the sample coarse movement unit 28. Next, the sample coarse movement unit 28 and sample fine movement unit 29 are driven by electric signals generated by the sample movement power supply 26, whereby the sample 20 is moved in the Z-axis direction shown in FIG. 7 (in the direction nearly perpendicular to the sample surface) before the sample 20 comes into contact with the probe 31 provided at the tip of cantilever 21. On this occasion, contact of the sample 20 with the probe 31 of the cantilever 21 is detected by measuring the deflection of cantilever 21 by the above deflection measuring unit 24. After achievement of contact between the sample 20 and the probe 31, the sample is moved about 100 μm in each of the X- and Y-directions while the sample fine movement unit 29 is driven so as to keep constant the deflection of cantilever measured by the deflection measuring unit 24 to move the sample 20 up and down in the Z-axis direction (in the direction nearly perpendicular to the sample surface). Further, the computer 25 stores Z-directional positions or Z-directional heights of sample and sample temperatures detected in the scanning by the thermal electromotive force detecting unit 15, with respect to positions (i.e., X and Y coordinates), and, based on image signals from the computer 25, an image of surface topography of surface of sample 20 and an image of temperature profile of sample 20 are output to CRT 30. Although Embodiment 2 was arranged to monitor electric signals from the sample movement power supply 26 for moving the sample fine movement unit 29 in the Z-axis direction in order to detect the heights of sample, it is needless to mention that any of a variety of methods used in AFM etc. may be employed as a method for detecting the heights of sample.

Although Embodiment 2 illustrated the STP which was capable of measuring the thermal profile of sample 20 and was also capable of measuring the topography of surface of sample 20, the STP may be arranged to detect only the thermal profile of sample 20, and the deflection detecting unit 24 in Embodiment 2 may be omitted. In this case, a preferred arrangement is such that, utilizing the fact that the cantilever 21 is a spring member, the probe is strongly urged against the sample so as to keep the probe of cantilever 21 in contact with the surface of sample 20. In that case, the cantilever 21 may be replaced by another spring body provided with a probe having a thermocouple at the tip of the spring body.

Figure 6:
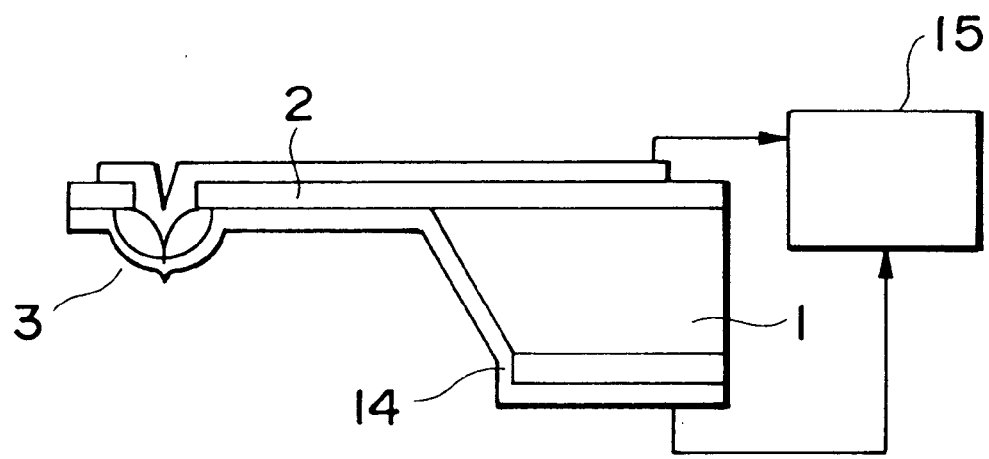
FIG. 6 shows the Embodiment 1 in which a detecting apparatus is connected thereto.

The thermocouple is a device for detecting the temperature, utilizing the fact that thermal electromotive forces are generated in two types of conductors by the Seebeck effect and that the thermal electromotive forces are different between the two types of conductors, and each of the conductors generates the thermal electromotive force due to a temperature difference between an observation contact of conductor where the temperature is detected, and a reference contact set at a reference temperature. Thus, the reference contact side needs to be kept at a constant temperature. However, because a compensating apparatus for compensating for the reference temperature is commercially available, no problem would arise if the conductors in the thermocouple composed of two types of conductors (FIG. 6) are electrically connected each to the thermal electromotive force detecting unit 15 including the above compensating apparatus.

Embodiment 3

Embodiment 2 illustrated the STP applying the AFM of the contact mode (which is a type in which the cantilever is always kept in contact with the sample surface), but it is also possible to apply the AFM of the non-contact mode (which is a type in which the cantilever is in no contact with the sample surface). Next explained is Embodiment 3 concerning the STP of such a kind.

Figure 8:
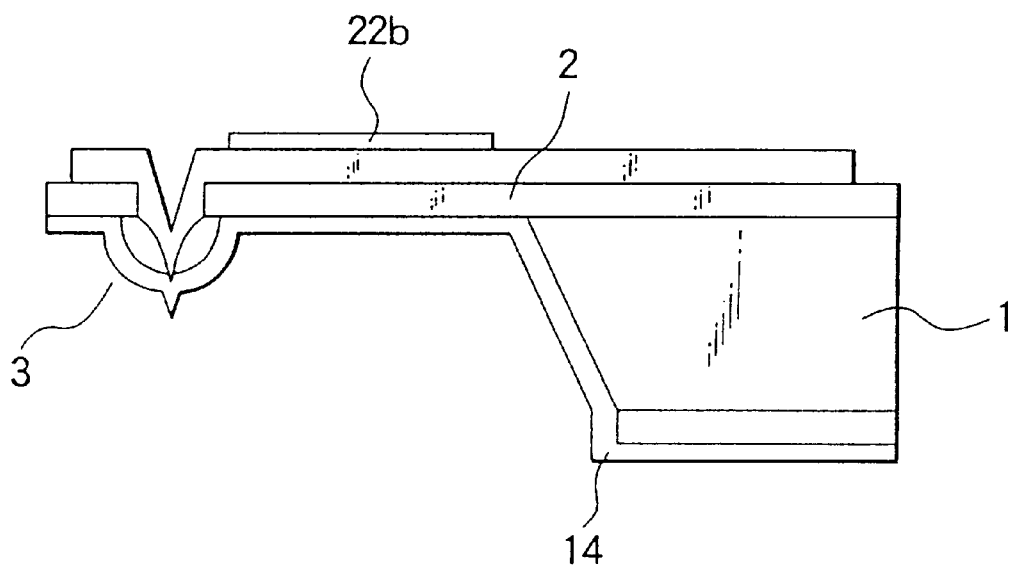
FIG. 8 is a schematic structural drawing to show a cantilever according to Embodiment 3 of the present invention.

The structure of the STP according to Embodiment 3 is nearly the same as that of the STP explained in Embodiment 2. The structure of the STP according to Embodiment 3 is explained below referring to FIG. 8.

In the apparatus according to Embodiment 3, a piezoelectric device 22b is provided on the flexible plate portion of the cantilever 21, and the cantilever vibrates with application of an ac voltage to the piezoelectric device 22b. The frequency of the ac voltage applied to the piezoelectric device 22b should be so determined that the frequency of vibration generated in the cantilever is slightly different from the natural frequency of the cantilever. Further, a vibration frequency detecting unit is provided for detecting the frequency of vibration of the cantilever. Specifically, the vibration frequency detecting unit can be constructed for example of a piezo resistor formed on the cantilever, whereby the frequency of vibration of cantilever can be detected from a change in resistance of the piezo resistor.

Since the vibration frequency of cantilever 21 changes depending upon the distance between the surface of sample 20 and the probe 31, the sample 20 and cantilever 21 are moved up and down relative to each other so as to keep the vibration frequency constant. This arrangement permits only the thermal profile of sample 20 to be detected independently because the distance is constant between the sample 20 and the center of vibration of the cantilever 21. It is needless to state that the apparatus according to Embodiment 3 can also observe the topography of surface of sample 20 at the same time, similarly as in Embodiment 2, because the cantilever 21 or sample 20 is moved while keeping constant the distance between the center of vibration of the cantilever 21 and the sample 20. Further, Embodiment 3 does not need the deflection measuring unit 24.

The other points of structure are the same as in Embodiment 2.

Since the cantilever 21 is vibrated in the STP according to Embodiment 3, signals of temperatures detected by the thermocouple formed in the probe are also modulated. Thus, temperatures of sample are detected in synchronization with the modulation frequency. Since signals of temperatures are modulated, dc drift etc. of temperature signals can be prevented, thereby permitting precise temperature detection.

Embodiment 4

Embodiment 4 of the present invention will be described in detail referring to FIGS. 9 to 13.

Figure 9:
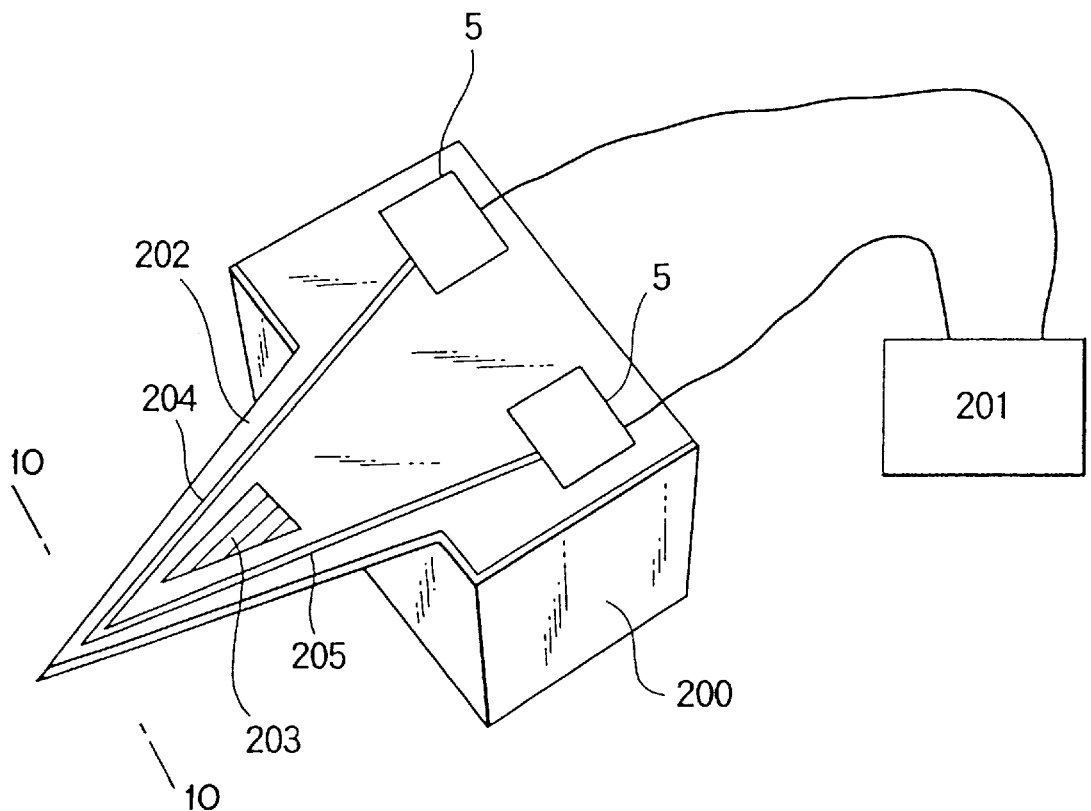
FIG. 9 is a schematic perspective view to show a cantilever according to Embodiment 4 of the present invention.

FIG. 9 is a schematic perspective view to show the cantilever in Embodiment 4.

Figure 10:
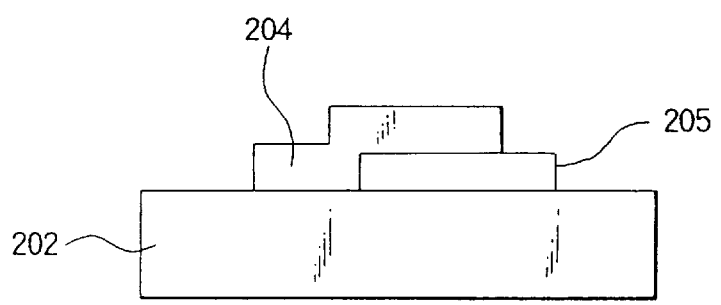
FIG. 10 is a drawing to show a cross section of the tip region of the cantilever according to Embodiment 4 of the present invention.

The cantilever according to Embodiment 4 is comprised of a support 200, a flexible plate 202 one end of which is supported by the support 200, two types of metal films 204, 205 for forming a thermocouple in the tip region of cantilever, electrode layers 5, and a metal film 203 for reflection. FIG. 10 shows a cross section of the tip region of the present cantilever, in which the two types of metal films 204, 205 are superimposed on the flexible plate 202 to form a thermocouple.

Figure 11:
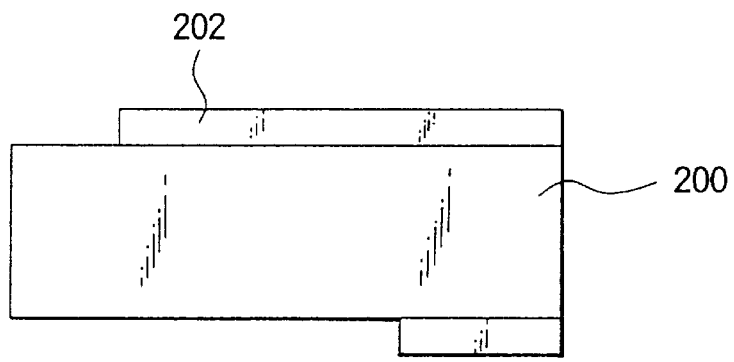
FIGS. 11 to 13 are drawings to show a method for fabricating the cantilever according to Embodiment 4.
Figure 12:
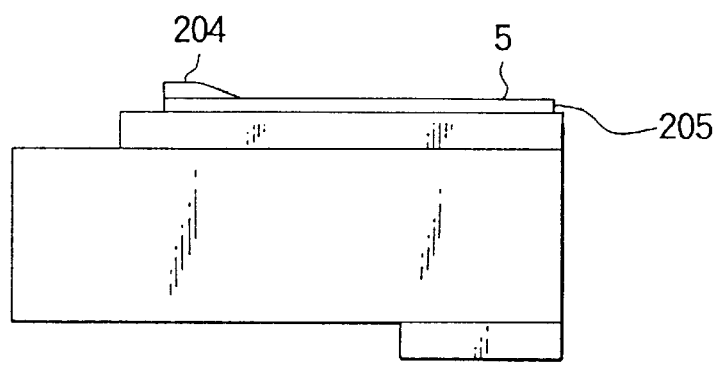
Figure 13:
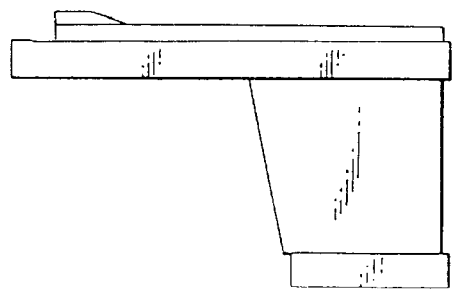

Fabrication procedures of the cantilever are next described referring to FIGS. 11 to 13. A silicon dioxide film 202 was formed by the thermal oxidation process in the thickness of 700 nm on a p-type silicon substrate 200 of the (100) plane orientation covered with a natural oxide film and having the diameter of 3 inches and the thickness of 250 μm. Further, the silicon dioxide film on the substrate was partially removed by patterning in the cantilever shape and the support shape by the photolithography process and the dry etching process. (FIG. 11)

Next, the metal film 205 and metal film 204 were formed as arbitrarily selecting two different types out of the metal films of gold, platinum, nichrome, chromel, alumel, platinum rhodium, nickel, etc., and they were patterned by the lift-off process on the substrate to form a thermocouple of the metal films 204 and 205 overlaid in the tip region of cantilever. Next, the reflecting metal film 203 was formed by the lift-off process. (FIG. 12)

Here, the reflecting metal film 203 is for efficiently reflecting laser light upon detection of deflection of the cantilever by the optical lever method, and thus, it becomes unnecessary if another deflection detecting method is employed or if the reflectivity of laser is sufficiently high when employing the optical lever method.

After that, the sample was immersed in an aqueous tetramethylammonium hydroxide (TMAH) solution adjusted in a concentration of 20 to 25 wt % and heated at 80°, thereby dissolving only unnecessary silicon portions to form a cantilever in a cantilever beam state. (FIG. 13)

By this process, a cantilever was obtained as composed of the support for supporting the flexible plate, the cantilever consisting of the flexible plate projecting from the support, the reflecting metal film, and the thermocouple provided in the tip region of the cantilever.

The thus obtained cantilever was put in a solution such as fluorinert (a product from Sumitomo 3M Inc.) or a physiological salt solution, and it was confirmed that the cantilever was able to perform simultaneous measurement of an image of topography and an image of thermal profile of a thin-film resistor of tantalum oxide etc. on an aluminum substrate, set in the same solution and heated with power of about 100 mW.

Embodiment 5

Embodiment 5 of the present invention will be described in detail referring to FIGS. 14 to 18.

Figure 14:
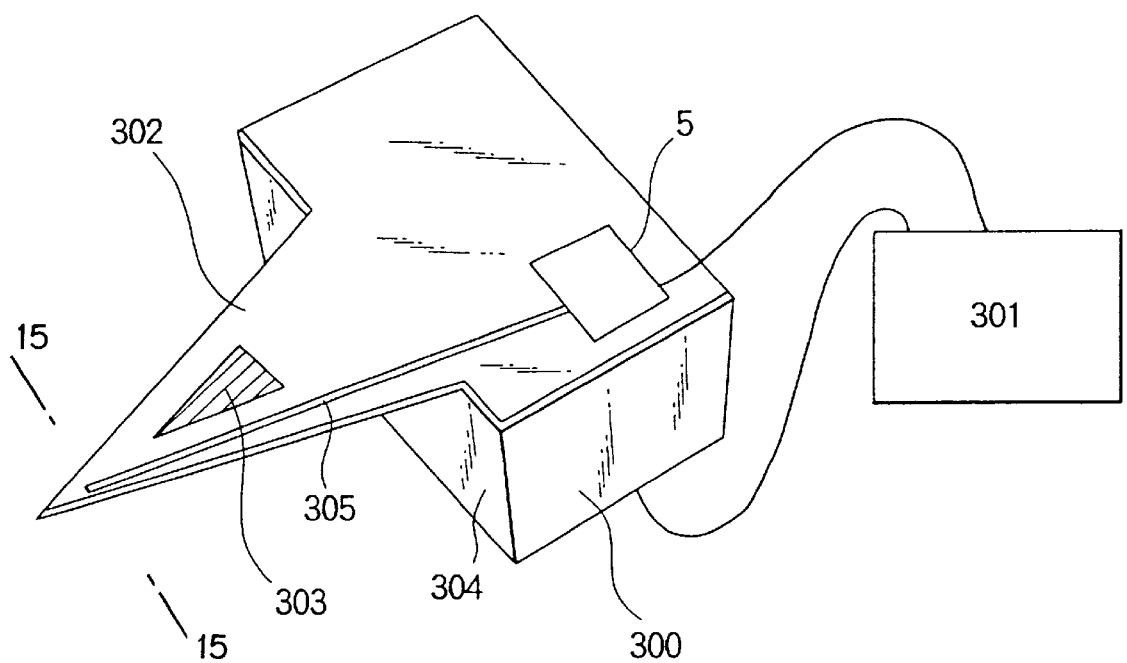
FIG. 14 is a schematic perspective view to show a cantilever according to Embodiment 5 of the present invention.

FIG. 14 is a schematic perspective view to show the cantilever in Embodiment 5.

The cantilever according to Embodiment 5 is comprised of a support 300, a flexible plate 302 one end of which is supported by the support 300, two types of metal films 304 and 305 composing a thermocouple in the tip region of the flexible plate 302, an electrode layer 5, and a reflecting metal film 303.

Figure 15:
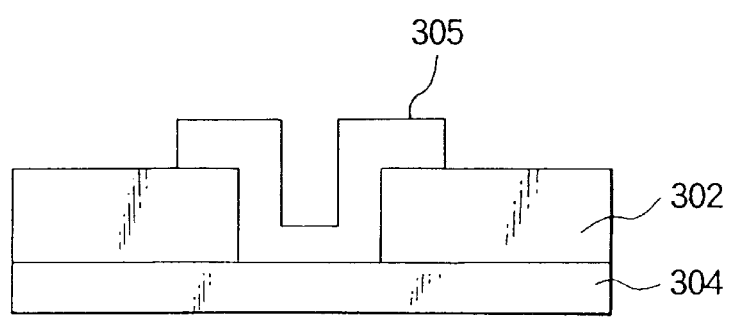
FIG. 15 is a drawing to show a cross section along B—B, of the tip region of a flexible plate.

FIG. 15 is a drawing to show the B—B cross section of the tip region of the flexible plate 302, in which the metal film 305 is patterned on the flexible plate 302 and in which the metal film 304 is formed over the entire bottom surface of the flexible plate 302. Further, a contact hole is formed in the tip region of the flexible plate, whereby the two metal films are partially in contact with each other.

Figure 16:
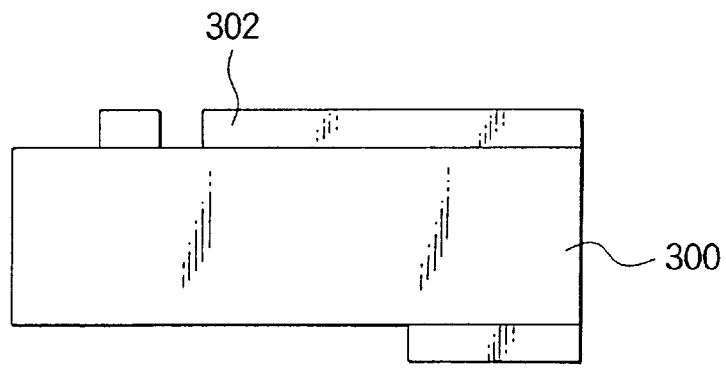
FIGS. 16 to 18 are schematic cross sections to show a method for fabricating the cantilever according to Embodiment 5.
Figure 17:
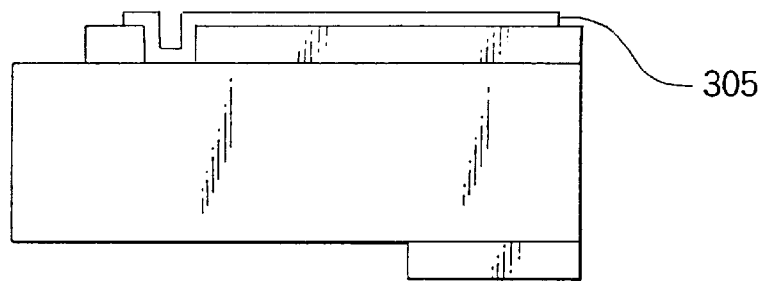
Figure 18:
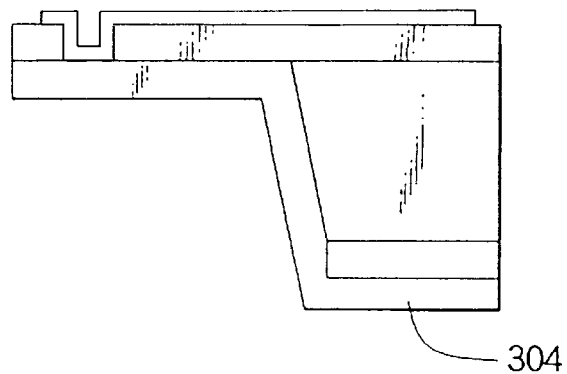

Next explained is a method for fabricating the cantilever of Embodiment 5. FIGS. 16 to 18 are schematic cross sections to illustrate fabrication procedures of the cantilever of the present embodiment.

First, a silicon nitride film 302 was formed in the thickness of 700 nm on an n-type silicon substrate 300 of the (100) plane orientation covered with a natural oxide film and having the diameter of 3 inches and the thickness of 250 μm by the low pressure vapor phase growth method using raw materials of dichlorosilane and ammonia gas. Further, the silicon nitride film 302 was partially removed by the photolithography process and the dry etching process to form the shape of the through hole, the shape of the cantilever, and the shape of the support. The shape of the through hole was about 1 μm to 100 μm square. These shapes and sizes can be arbitrarily set. (FIG. 16)

On the top face of the sample, a type of metal film 305, arbitrarily selected from gold, platinum, nichrome, chromel, alumel, platinum rhodium, nickel, etc., was patterned to form a constituent material of the thermocouple, and a metal film 303 for reflection film was further formed by the lift-off process. (FIG. 17)

Here, the reflecting metal film 303 is for efficiently reflecting laser light upon detection of deflection of cantilever by the optical lever method, which is unnecessary if another deflection detecting method is employed or if the reflectivity of laser is sufficiently high even in the use of the optical lever method.

After that, the sample was immersed in an aqueous tetramethylammonium hydroxide (TMAH) solution or an aqueous potassium hydroxide solution adjusted in a concentration of 20 to 25 wt % and heated at 80°, thereby dissolving only unnecessary silicon parts to form a cantilever in a cantilever beam state and to form the metal film 304, different from the metal film 305, on a flexible plate surface opposite to the surface where the metal film 305 was formed. (FIG. 18)

By the above process, the cantilever was obtained as composed of the support for supporting the flexible plate, the flexible plate projecting from the support, the reflecting metal film, and the thermocouple provided in the tip region of the flexible plate.

The thus obtained cantilever was set in the atmosphere or in the atmosphere of reduced pressure, and it was confirmed that the cantilever was able to perform simultaneous measurement of an image of topography and an image of thermal profile of a thin-film resistor of nichrome etc. on a glass substrate, set in the same atmosphere and heated with power of about 100 mW.

Embodiment 6

Figure 19:
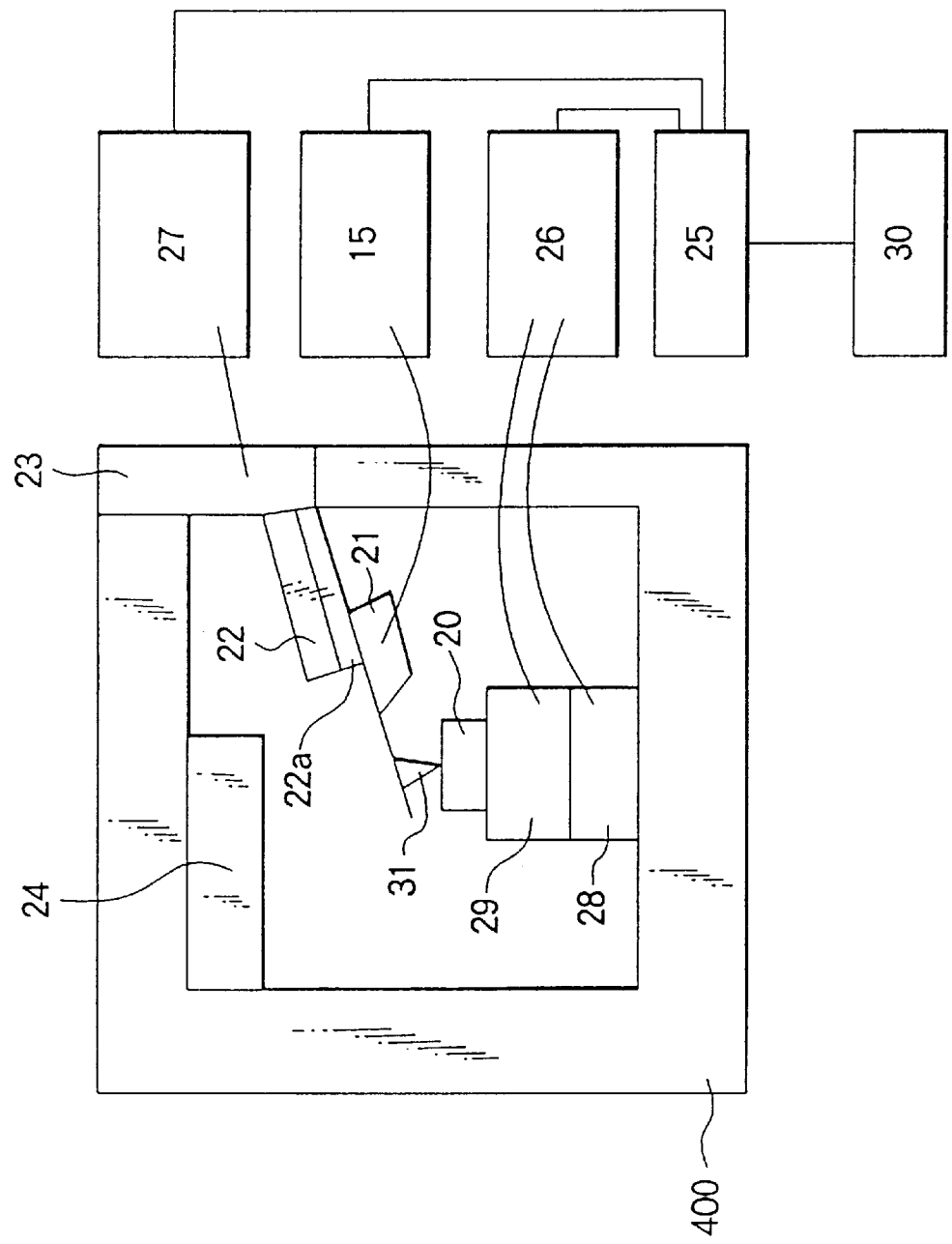
FIG. 19 is a schematic structural drawing to show a scanning thermal profiler according to Embodiment 6 of the present invention.

Embodiment 6 is next explained referring to FIG. 19. Arbitrarily selecting a cantilever 21 out of the cantilevers described in Embodiments 1, 4, and 5, the selected cantilever 21 was fixed in a cantilever holder 22 with a piezoelectric device 22a incorporated therein. This cantilever holder 22 was driven by a cantilever moving unit 23 to which an electric signal generated by a cantilever movement power supply 27 was supplied. Further, electric signals generated by a sample movement power supply 26 drove sample coarse movement unit 28 and sample fine movement unit 29 in the Z-direction before the tip of cantilever 21 came into contact with the sample 20. On this occasion, contact of the cantilever 21 with the sample 20 was detected by measuring a deflection of the cantilever by a deflection measuring unit 24 employing a measuring method such as the optical lever method, the tunnel current measuring method, or the electrostatic capacity measuring method. After achieving contact between the sample and the probe, the sample was moved back about 1 μm by the sample fine movement unit 29 to produce a constant gap between the sample and the cantilever. After that, an ac voltage was applied to the piezoelectric device 22a to vibrate the cantilever 21. The vibration frequency at this moment was set near the resonance frequency of the cantilever 21 determined by the material and dimensions of cantilever 21. As the sample 20 was kept approaching the cantilever in this state, the resonance point shifted because of attraction from the sample on the cantilever. The sample 20 was scanned in the X- and Y-directions by the sample fine movement unit 29 as effecting such feedback to the Z-directional sample fine movement unit 29 as to keep the shift amount of the resonance point constant. On this occasion, heights of sample 20 were obtained with respect to positions (x, y) from values of voltages applied to the Z-directional sample fine movement unit 29. Further, thermal electromotive forces output from the cantilever 21 during scanning were measured by a thermal electromotive force measuring unit 15, thereby confirming that temperatures of the sample were able to be simultaneously obtained with respect to the positions (x, y). The above control was executed by a computer 25, and measurement results obtained can be stored or can be output to CRT 30.

The cantilever 21, sample 20, sample coarse movement unit 28, sample fine movement unit 29, cantilever holder 22, cantilever moving unit 23, and deflection measuring unit 24 as described above were able to be used as set not only in the atmosphere, but also in an environment except for the atmosphere, for example, in a vacuum atmosphere or in an atmosphere of an arbitrary gas such as nitrogen gas, while setting these in a closed container 400.

Embodiment 7

For locally heating a sample, the sample can conceivably be heated, for example, under irradiation with laser light.

However, because the size of laser light spot is very large as compared with the atomic or molecular order of sample even if the light spot is converged up to the diffraction limit. Thus, it is impossible to locally heat a microscopic region of sample in the atomic or molecular order using the laser light spot. There has been no means developed for locally heating the sample heretofore accordingly.

The AFM was conventionally provided as apparatus for measuring the topography of the surface of sample (substance) in the resolution of atomic or molecular order. The AFM employs as a probe the cantilever provided with the support, the flexible plate one end of which is supported by the support, and the probe provided in the tip region of the flexible plate. However, the conventional AFMs were capable of measuring the topography of sample surface, but were incapable of locally heating the sample.

As described above, because it was impossible heretofore to locally heat a microscopic region of sample in the atomic or molecular order, it was impossible, for example, to elucidate a change of a property in a molecular-level region of an organism sample, depending upon the temperature.

Figure 20:
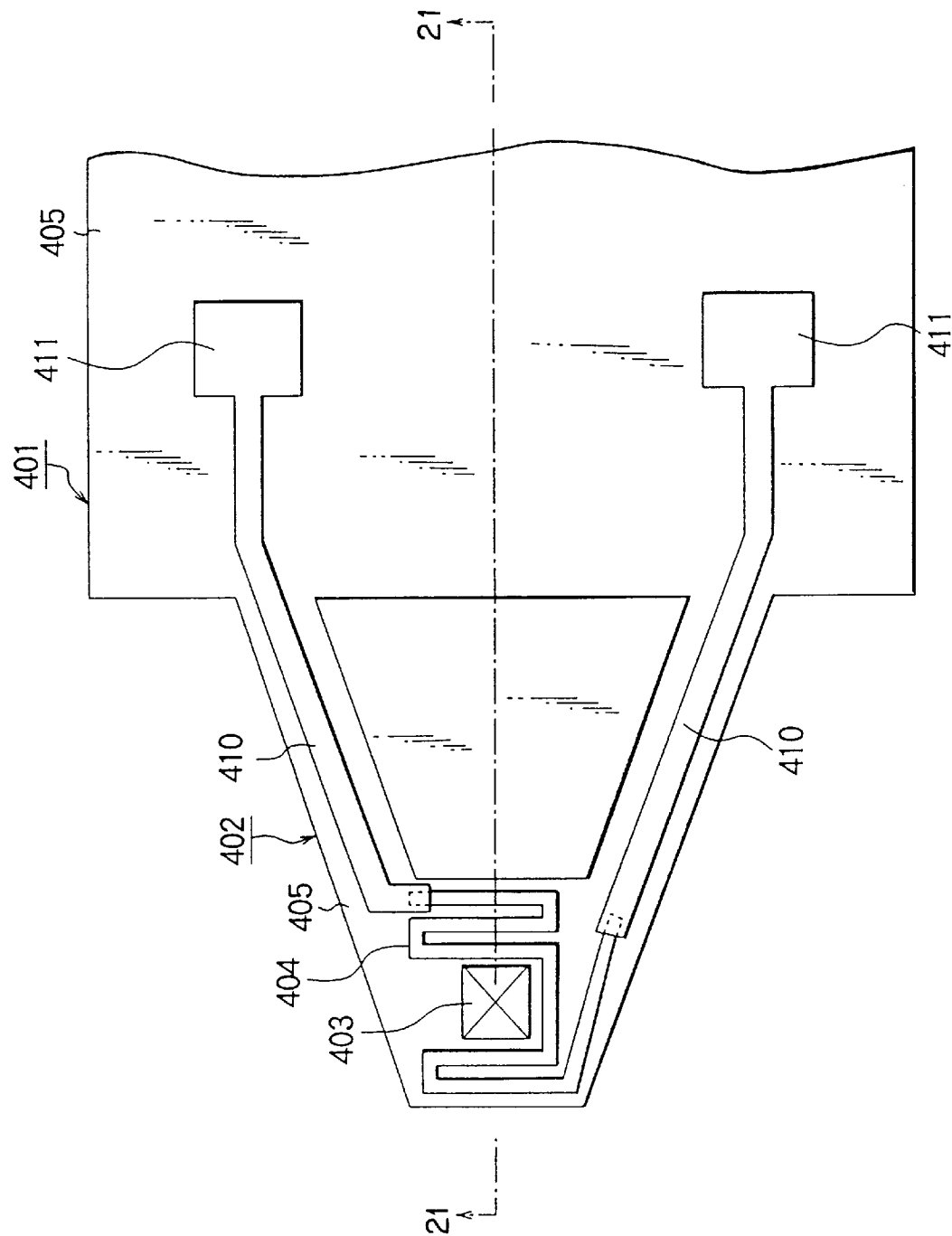
FIG. 20 in a schematic plan view to show a cantilever according to Embodiment 7 of the present invention.
Figure 21:
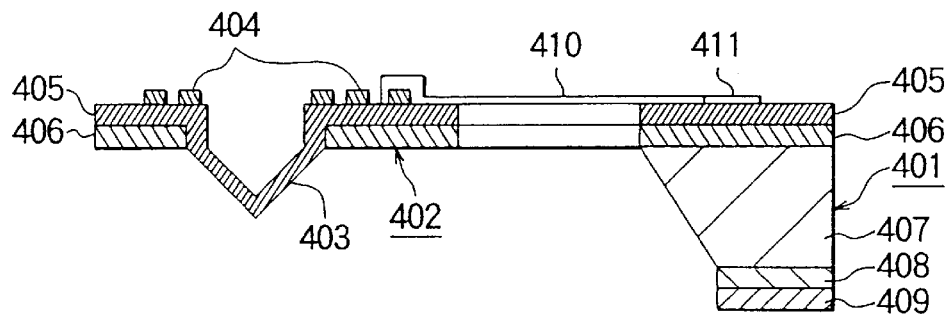
FIG. 21 is a schematic cross section taken along C—C line in FIG. 20.

First explained referring to FIGS. 20 and 21 is the cantilever according to Embodiment 7 of the present invention.

FIG. 20 is a schematic plan view to show the cantilever according to Embodiment 7. FIG. 21 is a schematic cross section taken along C—C line in FIG. 20.

This cantilever is provided, as shown in FIGS. 20 and 21, with a support 401, a flexible plate 402 one end of which is supported by the support 401, a probe 403 provided in the tip region of the flexible plate 402, and a heater 404 for heating the tip portion of the probe 403.

In the present embodiment, the support 401 is composed of silicon nitride films 405, 406, a silicon layer 407, and silicon nitride films 408, 409. The flexible plate 402 is comprised of double films of silicon nitride films 405, 406. It should be, however, noted that the structure of support 401 and flexible plate 402 is not limited to the above structure.

In the present embodiment, the heater 404 is formed in a hairpin shape around the probe 403 on the flexible plate 402. Heat from the heater 404 is transferred to the tip portion of the probe 403 by heat conduction, so that the heater 404 may heat the tip portion of probe 403. Materials applicable for the heater 404 are metal films with high volume resistivity etc., for example such as chromel, alumel, and nichrome. In the cases where a heat amount of the heater 404 can be relatively small, a material used for wiring pattern 410, such as aluminum, can be used as a material for the heater 404 if the line width is set narrow enough to increase the resistance per unit length.

Wiring patterns 410 electrically connected to the heater 404 are formed on the flexible plate 402. The wiring patterns 410 also extend on the support 401 to be connected with electrode patterns 411 for electrical connection with external components, as formed on the support 401.

Figure 22:
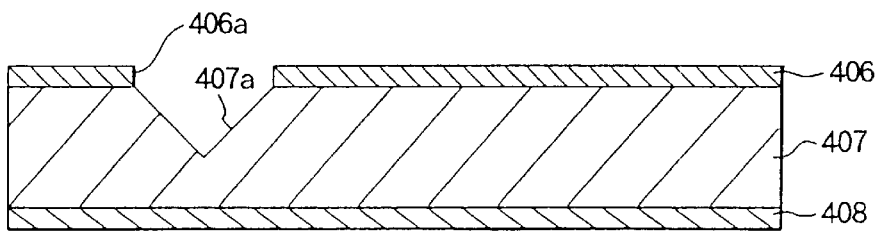
FIGS. 22 to 24 are schematic cross sections to show a method for fabricating the cantilever according to Embodiment 7.
Figure 23:
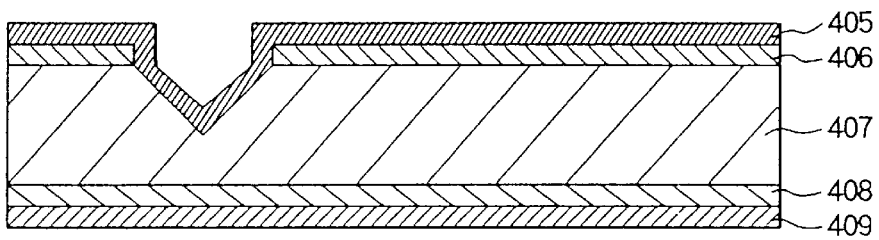
Figure 24:
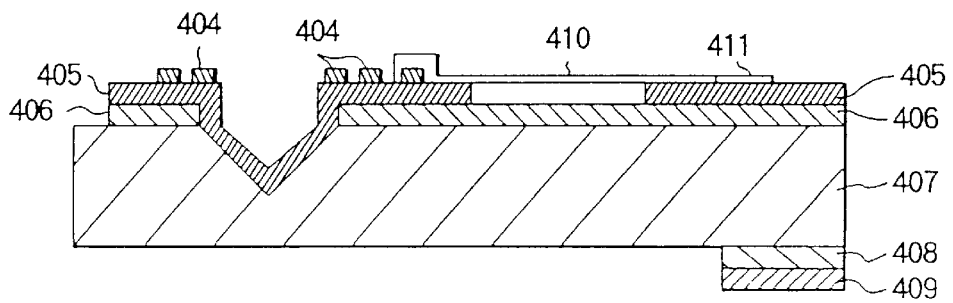

Next explained referring to FIGS. 22 to 24 is an example of the method for fabricating the cantilever shown in FIGS. 20 and 21. FIGS. 22 to 24 are schematic cross sections to show an example of fabrication steps of the cantilever shown in FIGS. 20 and 21. In FIGS. 22 to 24, elements corresponding to those in FIG. 20 are denoted by the same reference numerals.

First, silicon nitride films 406, 408 are formed in the thickness of 700 nm on the both surfaces of a (100) plane orientation n-type silicon substrate 407 covered with a natural oxide film and having a thickness of 250 $\mu$m for fabrication of semiconductor, by the low pressure vapor phase growth method using raw materials of dichlorosilane and ammonia gas. Further, the silicon nitride film 406 on the top surface of the substrate 407 is patterned by the photolithography process and the dry etching process to form a square opening 406a for exposing the surface of substrate 407, at a predetermined portion of the silicon nitride film 406 on the top surface of substrate 407. After that, this substrate is immersed in a silicon etchant, such as a potassium hydroxide solution or tetramethylammonium hydroxide, to effect anisotropic etching with the silicon nitride films 406, 408 as a mask to etch the exposed portion of substrate 407 through the opening 406a into a quadrangular pyramid shape, thereby forming a quadrangular pyramid trench 407a continuously formed from the opening 406a of the silicon nitride film 406 (FIG. 22). Since the substrate 407 is of the (100) plane orientation, etching automatically stops at the (111) plane of silicon, as well known, so that faces of the trench 407a are tapered surfaces with angle of 54.7°.

After that, silicon nitride films 405, 409 are formed on the both surfaces of the substrate in the state shown in FIG. 22, by the low pressure vapor phase growth method using raw materials of dichlorosilane and ammonia gas (FIG. 23).

Next, a film of chromel, alumel, nichrome, or the like is formed on the top surface of substrate in the state shown in FIG. 23, and the resultant is then subjected to patterning by the photolithography process and the dry etching process to form the heater 404 in the hairpin shape around the trench 407a in the silicon nitride film 405. The heater 404 can also be formed by the lift-off process etc. Further, the wiring patterns 410 and electrode patterns 411 (FIG. 20) as discussed above are formed by patterning of a metal layer for example of gold, platinum, aluminum, or the like on the top surface of the silicon nitride film 405, by the lift-off process. Although not illustrated in the drawing, the wiring patterns 410 can be arranged also to serve as a reflecting layer for reflecting a light beam for detection of deflection of the flexible plate 402 moving as the AFM, projected toward the flexible plate 402, by devising the shape of the wiring patterns 410 (for example, by arranging predetermined portions thereof as to be thick). However, a separate reflecting layer from the wiring patterns 410 may be formed on the flexible plate 402, or the reflecting layer does not have to be formed if any other method than the optical lever method is employed for detecting a deflection of the flexible plate 402 or if detection of deflection of the flexible plate 402 is unnecessary. After that, the silicon nitride films 405, 406, 408, 409 on the both surfaces of substrate 407 are subjected to patterning by the photolithography process and the dry etching process in a desired shape of flexible plate 402 and in a desired shape of support 401 (FIG. 24).

After that, the substrate in the state shown in FIG. 24 is immersed in a silicon etchant such as a tetramethylammonium hydroxide solution heated, thereby dissolving only unnecessary silicon portions exposed by the above patterning. This completes the cantilever shown in FIGS. 20 and 21.

The tip portion of the probe 403 is preferably shaped as acute as possible in order to effect heating of sample and measurement of topography of sample surface in high resolution.

In the cantilever as described above and shown in FIGS. 20 and 21, the tip portion of the probe 403 is heated by the heater 404. Accordingly, the surface of sample can be heated through the tip portion of probe 403 by bringing the tip portion of probe 403 in contact with the sample surface or to near the sample surface with a fine gap. Since the tip portion of the probe 403 can be constructed in a very acute shape in this case as in the cantilever employed in AFM, a microscopic region of atomic or molecular order of the sample surface can be locally heated through the tip portion of probe 403. Further, because the cantilever shown in FIGS. 20 and 21 employs the cantilever beam structure, the tip portion of probe 403 can be kept in contact with or adjacent at a fine gap to the sample surface, skillfully utilizing the deflection of the flexible plate 402 as detailed later.

Embodiment 8

Figure 25:
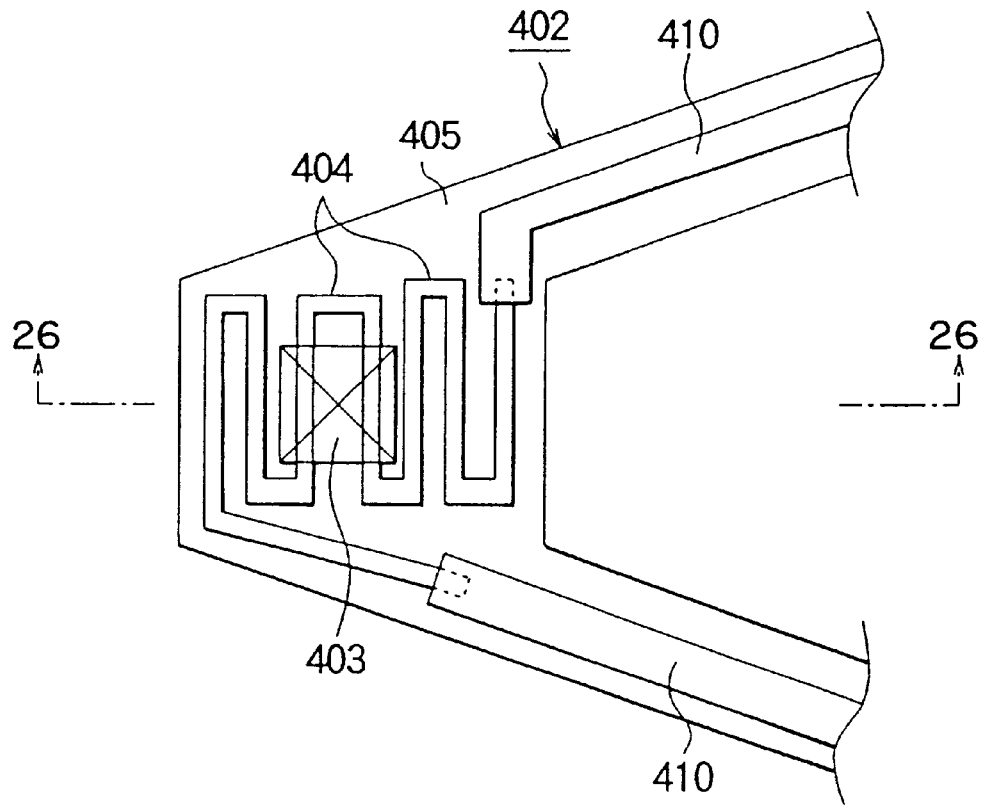
FIG. 25 is a schematic plan view to show a major part of a cantilever according to Embodiment 8 of the present invention.
Figure 26:
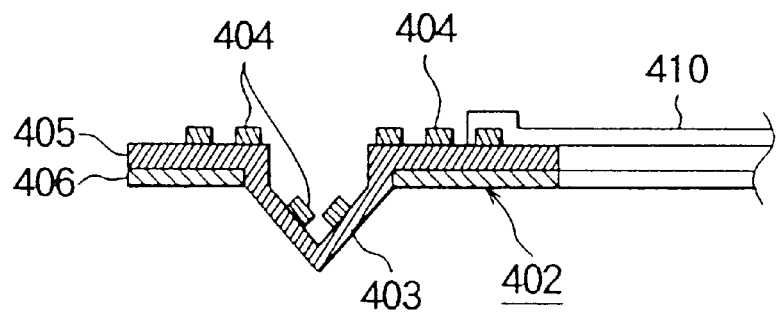
FIG. 26 is a schematic cross section taken along D—D line in FIG. 25.

The cantilever according to Embodiment 8 of the present invention is next explained referring to FIGS. 25 and 26.

FIG. 25 is a schematic plan view to show the major part of the cantilever according to the present embodiment, and FIG. 26 is a schematic cross section taken along D—D line in FIG. 25. In FIGS. 25 and 26, identical or corresponding constituent elements to those shown in FIGS. 20 and 21 are denoted by the same reference numerals.

The cantilever shown in FIGS. 25 and 26 is different from that shown in FIGS. 20 and 21 only in that the heater 404 formed in a hairpin shape also runs in an internal portion of the probe 403 as well as around the probe 403.

Although to form the hairpin heater 404 in the internal portion of probe 403 is relatively difficult because of the inclined internal portion of probe 403, the cantilever of the present embodiment can efficiently heat the tip portion of probe 403 as compared with the cantilever shown in FIGS. 20 and 21.

Embodiment 9

Figure 27:
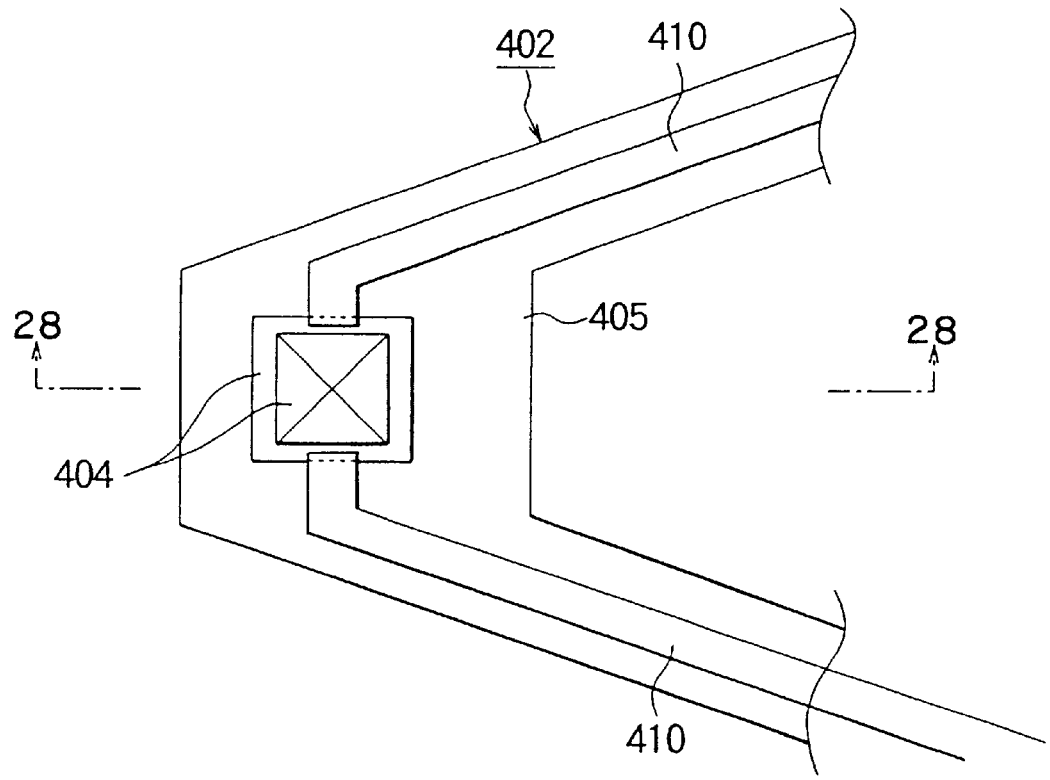
FIG. 27 is a schematic plan view to show a major part of a cantilever according to Embodiment 9 of the present invention.
Figure 28:
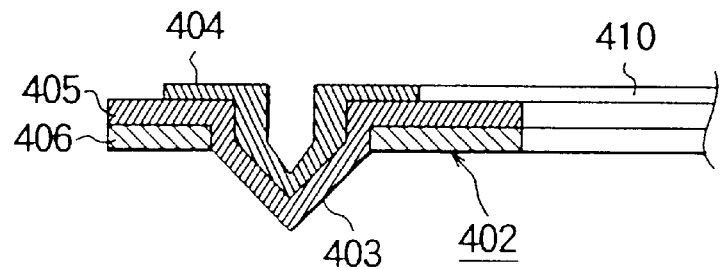
FIG. 28 is a schematic cross section taken along E—E line in FIG. 27.

The cantilever according to Embodiment 9 of the present invention is next explained referring to FIGS. 27 and 28.

FIG. 27 is a schematic plan view to show the major part of the cantilever according to the present embodiment, and FIG. 28 is a schematic cross section taken along E—E line in FIG. 27. In FIGS. 27 and 28, identical or corresponding constituent elements to those shown in FIGS. 20 and 21 are denoted by the same reference numerals.

The cantilever shown in FIGS. 27 and 28 is different from that shown in FIGS. 20 and 21 only in that the heater 404 is not formed in the hairpin shape, but in a rectangular shape in the entire internal portion of and around the probe 403.

This cantilever can also efficiently heat the tip portion of probe 403.

Embodiment 10

Figure 29:
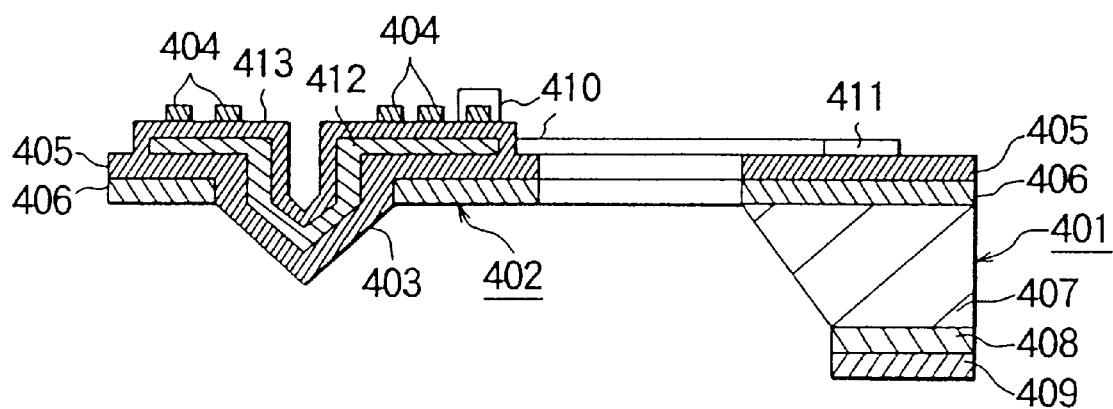
FIG. 29 is a schematic cross section to show a cantilever according to Embodiment 10 of the present invention.

The cantilever according to Embodiment 10 of the present invention is next explained referring to FIG. 29.

FIG. 29 is a schematic cross section to show the cantilever according to the present embodiment. In FIG. 29, identical or corresponding constituent elements to those shown in FIGS. 20 and 21 are denoted by the same reference numerals.

The cantilever shown in FIG. 29 is different from that shown in FIGS. 20 and 21 only in that a high thermal conductor 412 is provided between the heater 404 and the probe 403. In the present embodiment, the high thermal conductor 412 can be made of a metal such as silver, copper, or aluminum. Since these metals show electric conduction, an electric insulator layer 413 is interposed between the high thermal conductor 412 and the heater 404.

Although the cantilever shown in FIG. 29 is so constructed that the heater 404 is relatively apart from the tip portion of probe 403, similarly as in the cantilever shown in FIGS. 20 and 21, the tip portion of probe 403 can be efficiently heated because heat generated by the heater 404 is effectively thermally transferred to the probe 403 through the high thermal conductor 412.

Here is explained, referring to FIGS. 30 to 33, the method for fabricating the cantilever shown in FIG. 29. FIGS. 30 to 33 are schematic cross sections to show an example of fabrication steps of the cantilever shown in FIG. 29. In FIGS. 30 to 33, elements corresponding to those in FIG. 29 are denoted by the same reference numerals.

First, silicon nitride films 406, 408 are formed in the thickness of 700 nm on the both surfaces of a (100) plane orientation n-type silicon substrate 407 covered with a natural oxide film and having a thickness of 250 $\mu$m for fabrication of semiconductor by the low pressure vapor phase growth method using raw materials of dichlorosilane and ammonia gas. Further, the silicon nitride film 406 on the top surface of substrate 407 is subjected to patterning by the photolithography process and the dry etching process to form a square opening 406a for exposing the surface of substrate 407 at a predetermined portion of the silicon nitride film 406 on the top surface of substrate 407. After that, this substrate is immersed in a silicon etchant such as a potassium hydroxide solution or tetramethylammonium hydroxide to effect anisotropic etching with the silicon nitride films 406, 408 as a mask to etch the exposed portion of substrate 406 from the opening 406a into a quadrangular pyramid shape, thereby forming a quadrangular pyramid trench 407a continuous to the opening 406a of the silicon nitride film 406 (FIG. 30).

Figure 30:
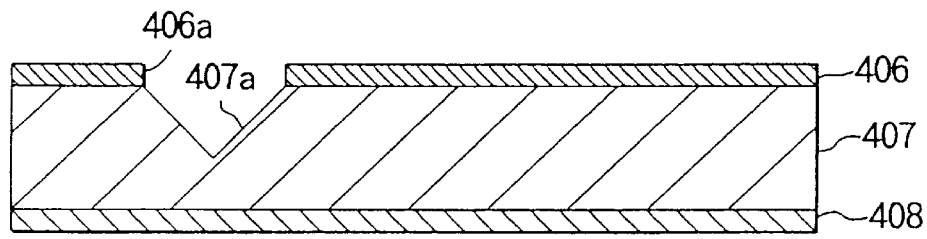
FIGS. 30 to 33 are schematic cross sections to show a method for fabricating the cantilever according to Embodiment 10.
Figure 31:
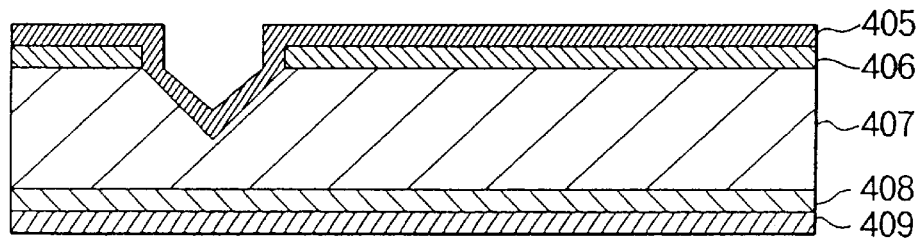

After that, silicon nitride films 405, 409 are formed on the both surfaces of the substrate in the state shown in FIG. 30, by the low pressure vapor phase growth method using raw materials of dichlorosilane and ammonia gas (FIG. 31).

Figure 32:
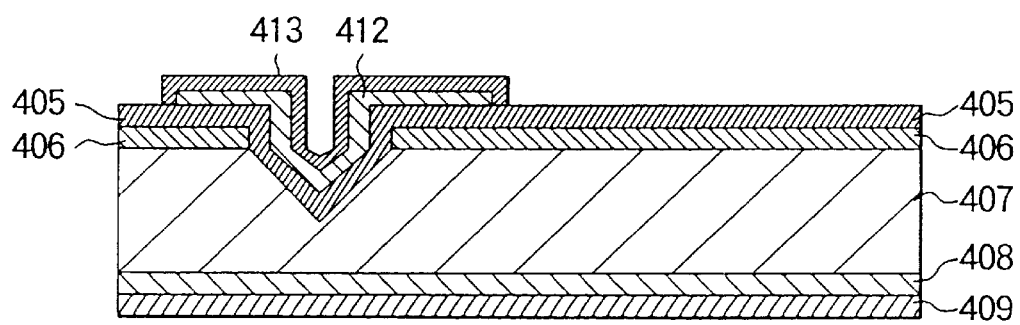

Next, a metal film, for example of silver, copper, or aluminum, is formed on the top surface of the substrate in the state shown in FIG. 31 and is subjected to patterning by the photolithography process and the wet etching process, thereby forming the high thermal conductor 412 in and around the trench 407a of the silicon nitride film 405. Further, a film of silicon dioxide or silicon nitride etc. is formed on the top surface of the substrate in this state, and thereafter it is subjected to patterning by the photolithography process and the dry etching process, thereby forming the insulator layer 413 on the high thermal conductor 408 (FIG. 32). The insulator layer 413 may also be formed by the lift-off process etc.

Next, a film of chromel, alumel, nichrome, or the like is formed on the top surface of the substrate in the state shown in FIG. 32, and it is then subjected to patterning by the photolithography process and the dry etching process, thereby forming the heater 404 in a hairpin shape on the insulator layer 413. Here, the heater 404 may also be formed by the lift-off process etc. Further, a metal layer of gold, platinum, aluminum, or the like is patterned by the lift-off process etc. on the top surface of the silicon nitride film 405, thereby forming the wiring patterns 410 and electrode patterns 411. After that, the silicon nitride films 405, 406, 408, 409 on the both surfaces of substrate 407 are subjected to patterning by the photolithography process and the dry etching process so as to match with a desired shape of the flexible plate 402 and a desired shape of the support 401 (FIG. 33).

Figure 33:
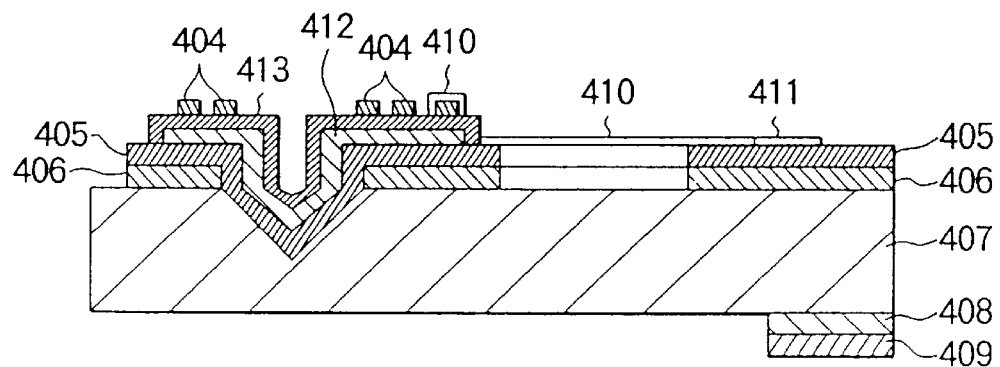

After that, the substrate in the state shown in FIG. 33 is immersed in a silicon etchant such as a tetramethylammonium hydroxide solution heated, thereby dissolving only unnecessary silicon parts exposed by the above patterning. This completes the cantilever shown in FIG. 29.

Although the above fabrication method formed the heater after formation of the high thermal conductor 412 and insulator layer 413, the heater 404 may be formed before forming the high thermal conductor 412 and insulator layer 413 and thereafter the insulator 413 and high thermal conductor 412 may be formed in order. Namely, the high thermal conductor 412 is disposed below the heater 404 in the cantilever shown in FIG. 29, but inversely, the high thermal conductor 412 may be disposed above the heater 404. Also in this case, the high thermal conductor 412 is disposed between the heater 404 and the probe 403.

Embodiment 11

Figure 34:
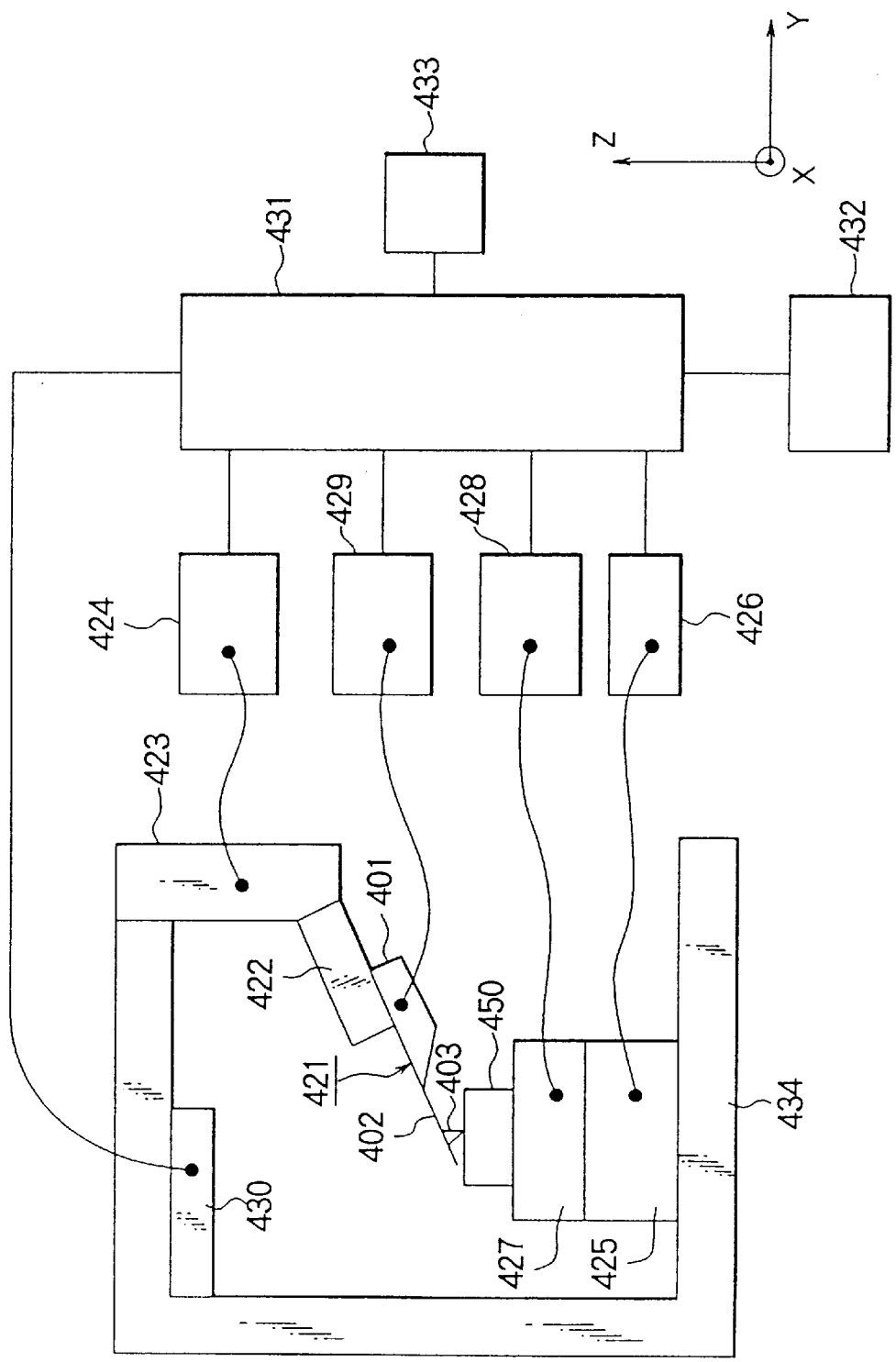
FIG. 34 is a schematic structural drawing to show a heating-topography measuring apparatus according to Embodiment 11 of the present invention.

Next explained referring to FIG. 34 is Embodiment 11 concerning a heating-topography measuring apparatus using either one of the cantilevers as explained above. FIG. 34 is a schematic structural drawing of the heating-topography measuring apparatus.

The heating-topography measuring apparatus has the cantilever 421 shown in FIGS. 20 and 21 (or the cantilever shown in FIGS. 25–28 or FIG. 29), a cantilever holder 422 for supporting the cantilever 421, a cantilever moving device 423 for moving the cantilever holder 422 in the X-, Y-, and Z-directions (where the X-direction is defined as a direction normal to the plane of FIG. 34, the Y-direction is a horizontal direction in FIG. 34, the Z-direction is a vertical direction in FIG. 34, and the XY plane is a plane substantially parallel to the surface of sample 450), a drive circuit 424 for driving the moving device 423, a moving device 425 for coarsely moving the sample 450 in the X-, Y-, and Z-directions, a drive circuit 426 for driving the moving device 425, a moving device 427 for finely moving the sample 450 in the X-, Y-, and Z-directions, a drive circuit 428 for driving the moving device 427, a heating drive circuit 429 for heat-driving a heater 404 in the cantilever by supplying power to the heater 404 through the electrode patterns 411 and wiring patterns 410 in the cantilever 421, a deflection detecting unit 430 for detecting a deflection of the flexible plate 402 of the cantilever 421, an arithmetic operation-control unit 431 comprised of a computer etc. for controlling the drive circuits 424, 426, 428, 429 and capturing a detection signal from the deflection detecting unit 430 to execute predetermined operation, an input device 432 such as a keyboard or a mouse for the user to give a command or the like to the arithmetic operation-control unit, and a display device 433 such as a CRT for displaying a result obtained etc. The moving device 427 also serves as a sample stage for sample 450. In FIG. 34, numeral 434 designates a base.

In the present embodiment the deflection detecting unit 430 is constructed to detect a deflection of the flexible plate 402 of cantilever 421 in accordance with the well-known optical lever method. More specifically, the deflection detecting unit 430 is composed, for example, of a laser light source consisting of a He—Ne laser or the like for emitting laser light to the flexible plate 402 and a bisected photodetector for detecting the laser light reflected by the flexible plate 402. It is, however, noted that the structure of the deflection detecting unit 430 is not limited to the above structure and thus, it does not have to apply the optical lever method.

The structure of the heating-topography measuring apparatus as described above appears similar to that of the conventional AFM, but is completely different from the conventional AFM in that the cantilever 421 has the heater 404, the apparatus has the heating drive circuit 429, and the arithmetic operation-control unit 431 executes the heating control as detailed below.

Next explained is an example of the operation of the heating-topography measuring apparatus.

In the first heating operation of the heating-topography measuring apparatus, the arithmetic operation-control unit 431 controls the drive circuits 424, 426, 428, 429 in response to a specific command given by the user through the input device 432 so that the heater heats only a desired point on the surface of sample 450 or successively heats points in a desired region on the surface of sample 450 in the state where the cantilever 421 is deflected to urge the probe 403 against the surface of sample 450.

Specifically, supposing only a desired point of sample 450 is heated, for example, the moving devices 425, 427 are actuated through the drive circuits 426, 428 to move the sample 450 in the X- and Y-directions before the tip of probe 403 reaches a position on the XY plane corresponding to the desired point on the surface of sample 450; thereafter the sample 450 is moved in the Z-direction to deflect the cantilever 421 so as to make the tip of probe 403 urged against the surface of sample 450. Then the heater 404 in the cantilever 421 is actuated to heat through the drive circuit 429 or the heater 404 is preliminarily set in a heating state.

Further, supposing a predetermined region of sample 450 is heated, for example, the moving devices 425, 427 are actuated through the drive circuits 426, 428 to move the sample 450 in the X- and Y-directions before the tip of probe 403 reaches a position on the XY plane corresponding to the desired region in the surface of sample 450; thereafter the sample is moved in the Z-direction to deflect the cantilever 421 so as to make the tip of probe 403 urged against the surface of sample 450. Then the moving devices 425, 427 are actuated through the drive circuits 426, 428 while keeping the sample 450 at the position in the Z direction, so that the sample 450 may be moved in the X- and Y-directions so as to scan the desired region in the surface of sample 450. During the scan the heater 404 in the cantilever 421 is actuated to heat through the drive circuit 429.

Since in the first heating operation as described above the probe 403 is urged against the surface of sample 450 by deflection of cantilever 421, the probe 403 is kept in sure contact with the surface of sample 450, and thermal conduction is effectively done from the tip of probe 403 to the surface of sample 450. When the probe 403 scans the surface of sample 450 in order to heat the desired region in the surface of sample 450, the probe 403 can follow the topography of the surface of sample 450 by deflection of cantilever 421, whereby the probe 403 can be kept in sure contact with the surface of sample 450 and heat conduction can be effectively done from the tip of probe 403 to the surface of sample 450 as well.

Since the first heating operation does not necessarily detect the deflection of cantilever 421, the deflection detecting unit 430 can be removed in case of only the first heating operation being executed.

In the second heating operation of the heating-topography measuring apparatus, in response to a specific command given by the user through the input device 432, the arithmetic operation-control unit 431 executes such control that while it controls the Z-directional position of sample 450 through the drive circuits 426, 428 and moving devices 425, 427 so as to keep the deflection of cantilever 421 constant, based on detection signals from the deflection detecting unit 430, it controls the position of sample 450 on the XY plane through the drive circuits 426, 428 and moving devices 425, 427 so as to make the probe 403 opposed to a desired point on the surface of sample 450 or so as to successively scan points in a desired region in the surface of sample 450, and the arithmetic operation-control unit 431 also controls the heating drive circuit 429 so as to heat only a desired point on the surface of sample 450 or so as to successively heat points in the desired region in the surface of sample.

Specifically, in the second heating operation, position adjustment of the cantilever 421 is first carried out using the moving device 423. This position adjustment means that the laser light from the laser light source constituting the deflection detecting unit 430 is projected to a predetermined position of cantilever 421 and the position of cantilever 421 is adjusted so that reflected light from the cantilever 421 is incident to a predetermined position of the bisected photodetector. Next, the moving devices 425, 427 are actuated through the drive circuits 426, 428, thereby moving the sample 450 in the X- and Y-directions before the tip of probe 403 reaches a desired point or a position on the XY plane corresponding to a desired region on the surface of sample 450. After that, the moving devices 425, 427 are actuated to move the sample 450 in the Z-direction before the probe 403 of cantilever 421 comes into contact with the sample 450. On this occasion, contact between the probe 403 of cantilever 421 and the sample 450 can be achieved by detecting the deflection of cantilever 421 by the deflection detecting unit 430. In the cases where only a desired point is heated on the surface of sample 450, the heater 404 in the cantilever 421 is actuated to heat through the drive circuit 429 in this contact state, then completing the heating. In the cases where a desired region is heated on the surface of sample 450, after achieving the contact between the sample 450 and the probe 403, the moving device 427 is actuated to effect such movement that while the sample 450 is moved up and down in the Z-direction so as to keep constant the deflection of the cantilever 421 measured by the deflection detecting unit 430, the sample 450 is moved in the X- and Y-directions so as to scan the desired region on the surface of sample 450 with the tip of probe 403. During the scan, the heater 404 in the cantilever 421 is actuated to heat through the drive circuit 429.

In the second heating operation as described above, while achieving the movement control of the probe 403 similar to the so-called contact mode in AFM, the heater heats only a desired point on the surface of sample 450 or the heater successively heats points in a desired region on the surface of sample 450. Since the probe 403 can be kept in a constant contact state with the surface of sample 450 to follow the topography of surface of sample 450, a heat amount of the surface of sample 450 can be kept constant regardless of the topography of the surface of sample 450 accordingly.

For example, supposing the so-called raster scan is executed with the probe 403, any region in an arbitrary shape can be heated on the surface of sample 450 by actuating the heater 404 pulsewise in accordance with the scanning sequence.

In the topography measuring operation of the heating-topography measuring apparatus, in response to a specific command given by the user through the input device 432, the arithmetic operation-control unit 431 executes such control, similarly as in case of the second heating operation as described above, that while it controls the Z-directional position of sample 450 through the drive circuits 426, 428 and the moving devices 425, 427 so as to keep the deflection of cantilever 421 constant, based on detection signals from the deflection detecting unit 430, the control unit controls a position of sample 450 on the XY plane through the drive circuits 426, 428 and moving devices 425, 427 so as to successively scan points in a desired region on the surface of sample 450 with the probe 403, and the arithmetic operation-control unit 431 also obtains information concerning relative positions of the probe 403 relative to the surface of sample 450, that is, data on the topography of surface of sample 450.

This topography measuring operation is the same as the operation in the contact mode in the conventional AFM.

Since in the present embodiment the position control of moving devices is based on open loop control, the control signals output from the arithmetic operation-control unit 431 to the moving devices 423, 425, 427 correspond to position information of the moving devices 423, 425, 427. Because of this, the arithmetic operation-control unit 431 stores the data on the topography of surface of sample 450 based on the control signals, in the inside memory. If the position control of moving devices 423, 425, 427 is based on feedback control, for example, position detectors are to be provided for the respective moving devices 423, 425, 427.

In the present embodiment, the arithmetic operation-control unit 431 processes the topography data described above to display an image of topography of surface of sample 450 on the display device.

Since the scan itself with the probe 403 is common to the second heating operation and the topography measuring operation, these operations may be carried out at a time.

Since the heating-topography measuring apparatus performs the operations as discussed above, it can also be used in the following manner.

Namely, when the second heating operation and the third topography measuring operation are simultaneously carried out, the apparatus can simultaneously perform acquisition of data on the topography of surface of sample 450 and total or local heating of the surface of sample 450.

In another use, the topography measuring operation is first performed to obtain the data on the topography of surface of sample 450 before heating, a heating portion is determined based on the topography data, and thereafter the second heating operation is performed to locally heat the portion determined. In more detail, if one desires to start a thermal reaction at a peculiar point or arbitrary position based on observation of topography etc. of sample 450 by the topography measuring operation, the position can be locally heated by the second heating operation. In this case, a preferred example is such that a user interface is constructed in such an arrangement that when the user points a part in an image of topography of surface of sample 450 before heating, as displayed on the display device 433, through a mouse or the like as the input device 432, that part is automatically heated by the second heating operation.

Further, a change in topography of the surface of sample 450 before and after heating can also be observed in such a manner that the topography measuring operation is performed to obtain the data on the topography of surface of sample 450 before heating, the second heating operation is then performed to totally or locally heat the surface of sample 450, and thereafter the topography measuring operation is again performed to obtain the data on the topography of surface of sample 450 after heating.

The second heating operation and the topography measuring operation in the heating-topography measuring apparatus in the embodiment as described above are those in the contact mode in AFM.

It is also possible to realize the heating operation and topography measuring operation in the non-contact mode in AFM by modifying the heating-topography measuring apparatus as described above in the following manner.

Namely, in FIG. 34, added to the apparatus are a vibrating portion for vibrating the cantilever 421 and a vibration frequency detecting unit for detecting the vibration frequency of the cantilever 421.

Specific examples of the vibrating portion are a piezoelectric device (not shown) provided in the part of flexible plate 402 in the cantilever 421, a piezoelectric device (not shown) interposed between the cantilever holder 422 and the cantilever moving device 423, etc. The cantilever 421 vibrates with application of an ac voltage to the piezoelectric device. Preferably, the frequency of the ac voltage applied to the piezoelectric device in this case is so set that the vibration frequency of the cantilever 421 becomes a frequency a little different from the natural frequency of the cantilever 421.

Since the deflection detecting portion 430 is composed of the laser light source and the bisected photodetector, they can be used as the vibration frequency detecting portion as they are. In another example, the vibration frequency detecting portion may employ the piezo resistor provided in the portion of flexible plate 402 in the cantilever 421, and then the vibration frequency can be detected from a change in resistance of the piezo resistor.

Since the vibration frequency changes depending upon the distance between the surface of sample 450 and the probe 431, the sample 450 and the cantilever 421 are relatively moved up and down to change the distance between them so as to keep the vibration frequency of the cantilever 421 constant. Since this arrangement can keep constant the distance between the sample 450 and the center of vibration of the cantilever 421, a heat amount of the sample surface can be kept constant regardless of the topography of the surface of sample 450 and data can be obtained on the topography of the surface of sample 450.

The above modification of the heating-topography measuring apparatus described previously to realize the heating operation and the topography measuring operation in the non-contact mode is substantially equivalent to the heating-topography measuring apparatus as described previously.

Embodiment 12

Further effective is such an arrangement that the apparatus is arranged not only as capable of locally heating a fine region, as in the previous embodiments, but also as capable of heating the fine region at desired temperature.

Embodiment 12 concerning a cantilever having such a function is explained below referring to FIGS. 35 and 36.

Figure 35:
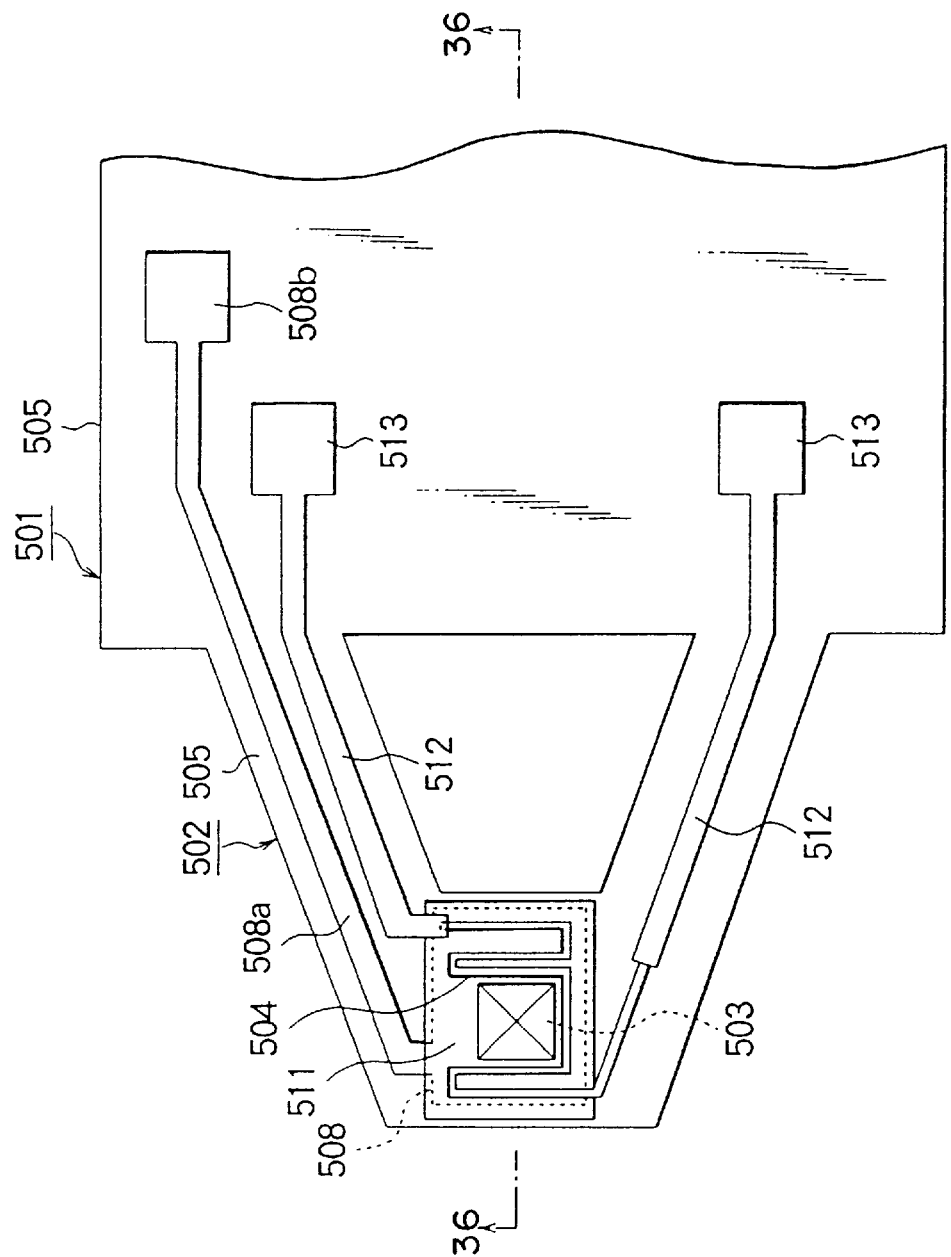
FIG. 35 is a schematic plan view to show a cantilever according to Embodiment 12 of the present invention.

FIG. 35 is a schematic plan view to show the cantilever according to Embodiment 12. FIG. 36 is a schematic cross section taken along F—F line in FIG. 35.

Figure 36:
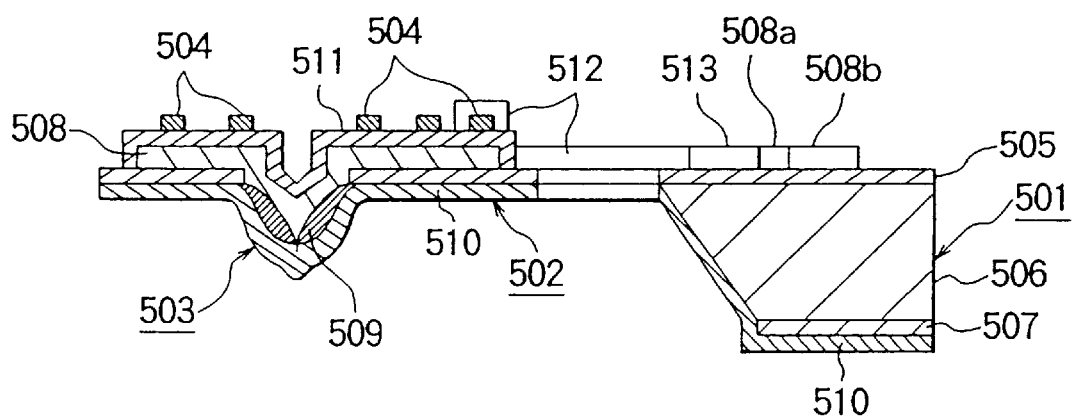
FIG. 36 is a schematic cross section taken along F—F line in FIG. 35.

This cantilever is provided, as shown in FIGS. 35 and 36, with a support 501, a flexible plate 502 one end of which is supported by the support 501, a probe 503 having a thermocouple provided in the tip region of the flexible plate 502, and a heater 504 for heating the tip portion of the probe 503.

In the present embodiment, the support 501 is composed of a silicon nitride film 505, a silicon layer 506, and a silicon nitride film 507. The flexible plate 502 is comprised of the silicon nitride film 505. It should be, however, noted that the structure of support 501 and flexible plate 502 is not limited to the above structure.

In the present embodiment the probe 503 is comprised of a first thermocouple constituent 508 made of a metal material for constituting the thermocouple, a silicon dioxide film 509 surrounding a projecting portion of the first thermocouple constituent 508, and a second thermocouple constituent 510 (which is made of a metal material of a different type from that of the first thermocouple constituent 508) formed in a film form constituting the thermocouple and connected with the tip of the first thermocouple constituent 508 a little projecting from the top part of the silicon dioxide film 509. It is, however, noted that the structure of the probe is not limited to the above structure.

The first thermocouple constituent 508 spreads around the periphery of the probe 503 on the flexible plate 502 and further extends on the support 501, as a wiring pattern 508a for thermocouple and an electrode pattern 508b for electric connection to the outside. The second thermocouple constituent 510 spreads over the entire lower surface of flexible plate 502 and the entire lower surface of support 501.

In the present embodiment an electric insulator layer 511 is formed on the first thermocouple constituent 508, and the heater 504 is formed in a hairpin shape on the insulator layer. Heat from the heater 504 is transferred to the tip of the probe 503 by the thermal conduction phenomenon, so that the heater 504 may heat the tip of the probe 503. In the present embodiment, because the first thermocouple constituent 508 also serves as a high thermal conductor interposed between the heater 504 and the probe 503, heat from the heater 504 is efficiently transferred to the tip of probe 503.

The heater 504 may be formed not only in the peripheral portion of probe 503, but also in the inside portion of probe 503, and may be formed in a rectangular shape covering the entire inside portion and the surroundings of the probe 503 instead of the hairpin shape. Materials applicable for the heater 504 are metal films with high volume resistivity etc., for example such as chromel, alumel, and nichrome. In the cases where a heat amount of the heater 504 can be relatively small, a material used for wiring pattern, such as aluminum, can be used as a material for the heater 504 it the line width is set narrow enough to increase the resistance per unit length.

Wiring patterns 512 electrically connected to the heater 504 are formed on the flexible plate 502. The wiring patterns 512 also extend on the support 501 to be connected with electrode patterns 513 for electrical connection with external components, as formed on the support 501.

Next explained referring to FIGS. 37 to 40 is an example of the method for fabricating the cantilever shown in FIGS. 35 and 36. FIGS. 37 to 40 are schematic cross sections to show an example of fabrication steps of the cantilever shown in FIGS. 35 and 36. In FIGS. 37 to 40, elements corresponding to those in FIG. 35 are denoted by the same reference numerals.

Figure 37:
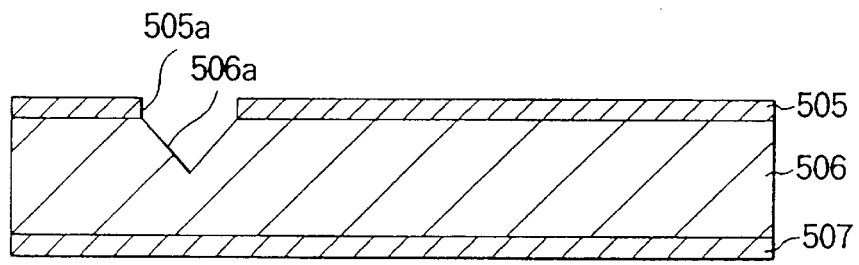
FIGS. 37 to 40 are schematic cross sections to show a method for fabricating the cantilever according to Embodiment 12.

First, silicon nitride films 505, 507 are formed in the thickness of 700 nm on the both surfaces of a (100) plane orientation n-type silicon substrate 506 covered with a natural oxide film and having a thickness of 250 $\mu$m for fabrication of semiconductor, by the low pressure vapor phase growth method using raw materials of dichlorosilane and ammonia gas. Further, the silicon nitride film 505 on the top surface of the substrate 506 is patterned by the photolithography process and the dry etching process to form a square opening 505a for exposing the surface of substrate 506, at a predetermined portion of the silicon nitride film 505 on the top surface of substrate 506. After that, this substrate is immersed in a silicon etchant, such as a potassium hydroxide solution or tetramethylammonium hydroxide, to effect anisotropic etching with the silicon nitride films 505, 507 as a mask to etch the exposed portion of substrate 506 through the opening 505a into a quadrangular pyramid shape, thereby forming a quadrangular pyramid trench 506a continuously formed from the opening 505a of the silicon nitride film 505 (FIG. 37). Since the substrate 506 is of the (100) plane orientation, etching automatically stops at the (111) plane of silicon, as well known, so that faces of the trench 506a are tapered surfaces with angle of 54.7°.

Figure 38:
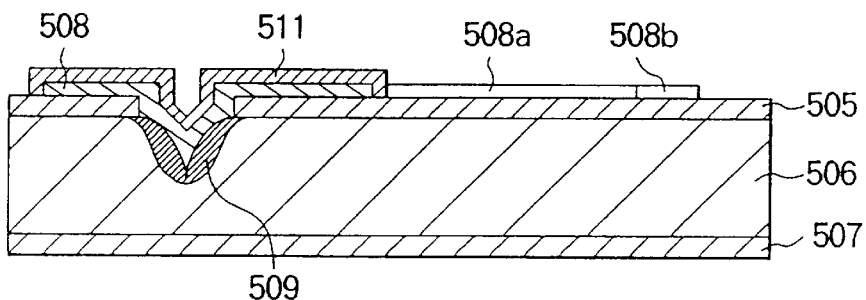

After that, the substrate in the state shown in FIG. 37 is set in an electric oven and then is heated, whereby the silicon dioxide film 509 is grown by thermal oxidation in the part of trench 506a of exposed substrate 506. As well known, the growth rate of the silicon dioxide film is faster in a flat portion but slower at corners. Thus, the cross section of the silicon dioxide film 509 grown in the part of trench 506a is as shown in FIG. 38, in which the thickness of the bottom part is extremely thinner than the other portions. Then a film of a metal such as silver, copper, or aluminum is formed on the substrate in this state, and it is subjected to patterning by the photolithography process and the wet etching process, thereby forming the first thermocouple constituent 508 in a rectangular shape in and around the part of trench 506a of the silicon dioxide film 509 and also forming the wiring pattern 508a and electrode pattern 508b continuous thereto. Further, a film of silicon dioxide or silicon nitride etc. is formed on the top surface of the substrate in this state, and thereafter it is subjected to patterning by the photolithography process and the dry etching process, thereby forming the insulator layer 511 on the first thermocouple constituent 508 (FIG. 38). Here, the insulator layer 511 may be formed by the lift-off process etc.

Next, a film of chromel, alumel, nichrome, or the like is formed on the top surface of substrate in the state shown in FIG. 38, and the resultant is then subjected to patterning by the photolithography process and the dry etching process to form the heater 504 in the hairpin shape on the insulator layer 511. The heater 504 can also be formed by the lift-off process etc. Further, the wiring patterns 512 and electrode patterns 513 as discussed above are formed by patterning of a metal layer for example of gold, platinum, aluminum, or the like on the top surface of the silicon nitride film 505, by the lift-off process. Although not illustrated in the drawing, the wiring patterns 512 can be arranged also to serve as a reflecting layer for reflecting a light beam for detection of deflection of the flexible plate 502, projected toward the flexible plate 502, by devising the shape of the wiring patterns 512 (for example, by arranging predetermined portions thereof as to be thick). However, a separate reflecting layer from the wiring patterns 512 may be formed on the flexible plate 502, or the reflecting layer does not have to be formed if any other method than the optical lever method is employed for detecting a deflection of the flexible plate 502 or if detection of deflection of the flexible plate 502 is unnecessary. After that, the silicon nitride films 505, 507 on the both surfaces of substrate 506 are subjected to patterning by the photolithography process and the dry etching process in a desired shape of flexible plate 502 and in a desired shape of support 501 (FIG. 39).

Figure 39:
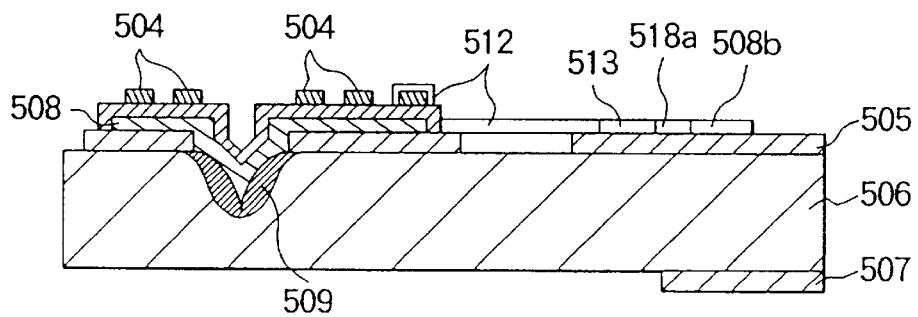
Figure 40:
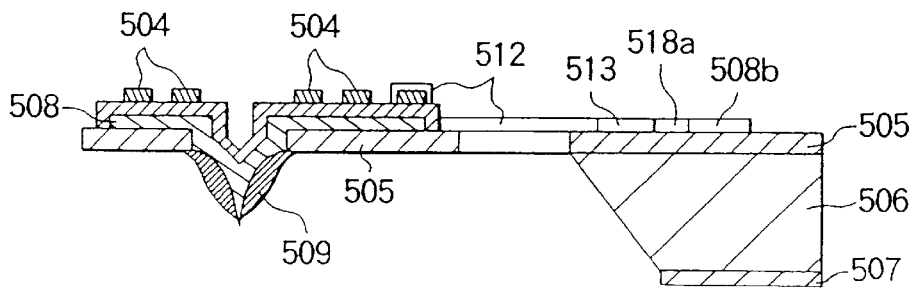

After that, the substrate in the state shown in FIG. 39 is immersed in a silicon etchant such as a tetramethylammonium hydroxide solution heated, thereby dissolving only unnecessary silicon portions exposed by the above patterning. Further, this substrate is immersed in an aqueous potassium hydroxide solution (which etches the silicon dioxide film at low rate) to isotropically etching-remove a very small part of the silicon dioxide film 509, thereby slightly projecting the tip of the first thermocouple constituent 508 from the top part (corresponding to the thinnest part before etching) of the silicon dioxide film 509 after etching removal (FIG. 40).

Finally, a film of a metal material of a different kind from the first thermocouple constituent 508 is formed on the bottom surface side of the substrate, thereby forming the second thermocouple constituent 510. This completes the cantilever shown in FIGS. 35 and 36.

The tip portion of the probe 503 is preferably shaped as acute as possible in order to effect heating of sample and measurement of topography of sample surface in high resolution.

In the cantilever as described above and shown in FIGS. 35 and 36, the tip portion of the probe 503 is heated by the heater 504. Accordingly, the surface of sample can be heated through the tip portion of probe 503 by bringing the tip portion of probe 503 in contact with the sample surface or to near the sample surface with a fine gap. Since the tip portion of the probe 503 can be constructed in a very acute shape in this case as in the cantilever employed in AFM, a microscopic region of atomic or molecular order of the sample surface can be locally heated through the tip portion of probe 503. In addition, because the probe 503 is provided with the thermocouple in the cantilever shown in FIGS. 35 and 36, the temperature of the probe can be controlled at desired temperature, based on the thermal electromotive force from the thermocouple. This permits a fine region in the atomic or molecular order in the surface of sample to be heated locally and at desired temperature through the tip of probe 503. Further, because the cantilever shown in FIGS. 35 and 36 employs the cantilever beam structure, the tip portion of probe 503 can be kept in contact with or adjacent at a fine gap to the sample surface, skillfully utilizing the deflection of the flexible plate 502 as detailed later.

Embodiment 13

Figure 41:
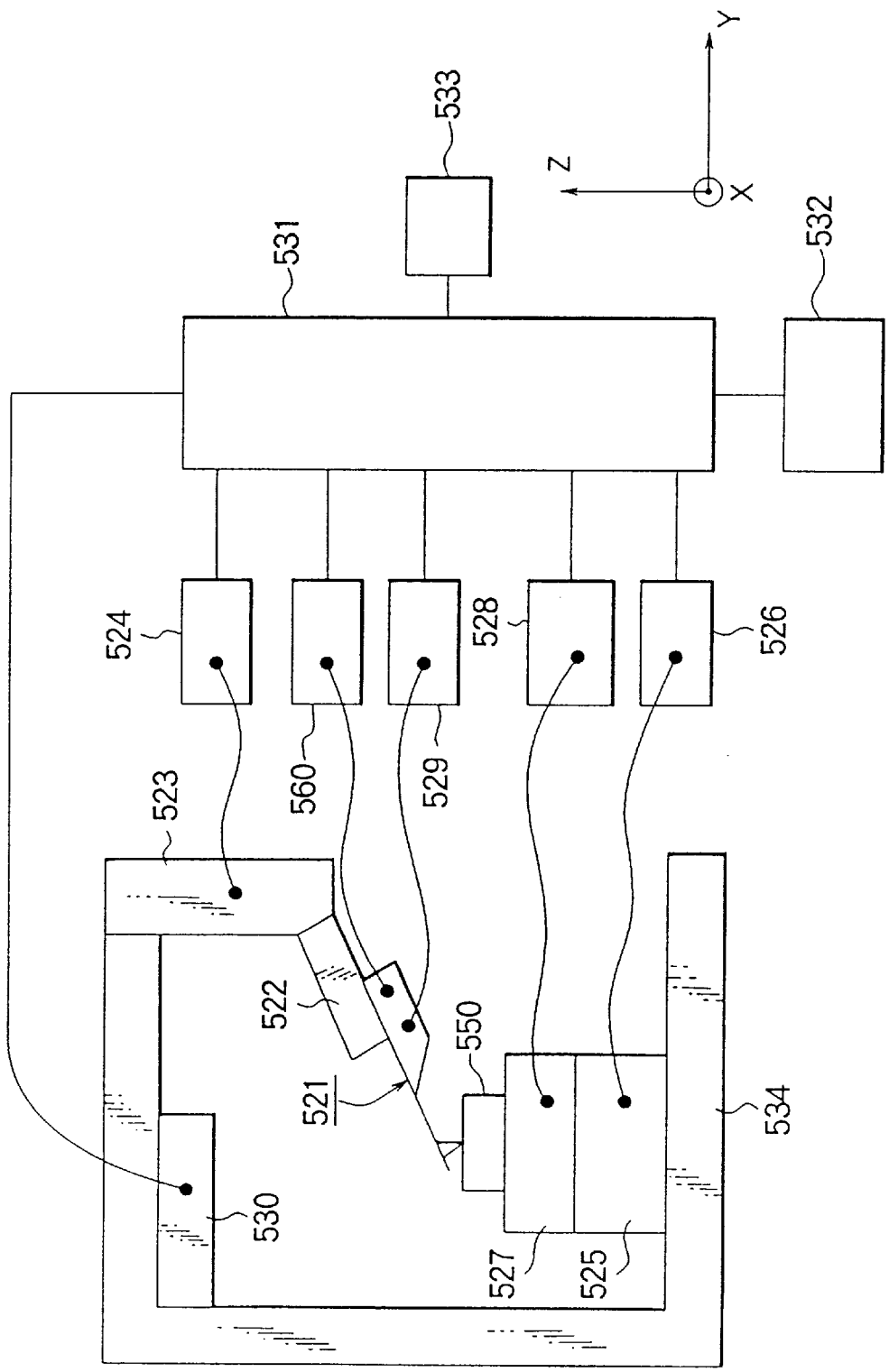
FIG. 41 is a schematic structural drawing to show a heating-topography measuring apparatus according to Embodiment 13 of the present invention.

Next explained referring to FIG. 41 is Embodiment 13 concerning a heating-topography measuring apparatus using either one of the cantilevers as explained above. FIG. 41 is a schematic structural drawing of the heating-topography measuring apparatus.

The heating-topography measuring apparatus has the cantilever 521 shown in FIGS. 35 and 36, a cantilever holder 522 for supporting the cantilever 521, a cantilever moving device 523 for moving the cantilever holder 522 in the X-, Y-, and Z-directions (where the X-direction is defined as a direction normal to the plane of FIG. 41, the Y-direction is a horizontal direction in FIG. 41, the Z-direction is a vertical direction in FIG. 41, and the XY plane is a plane substantially parallel to the surface of sample 550), a drive circuit 524 for driving the moving device 523, a moving device 525 for coarsely moving the sample 550 in the X-, Y-, and Z-directions, a drive circuit 526 for driving the moving device 525, a moving device 527 for finely moving the sample 550 in the X-, Y-, and Z-directions, a drive circuit 528 for driving the moving device 527, a heating drive circuit 529 for heat-driving a heater 504 in the cantilever by supplying power to the heater 504 through the electrode patterns 513 and wiring patterns 512 in the cantilever 521, a deflection detecting unit 530 for detecting a deflection of the flexible plate 502 of the cantilever 521, a thermal electromotive force detecting circuit 560 for performing signal processing such as amplification or compensation of the thermal electromotive force obtained through the electrode pattern 508b and the second thermocouple constituent 510 of the cantilever 521, an arithmetic operation-control unit 531 comprised of a computer etc. for controlling the drive circuits 524, 526, 528, 529, capturing the thermal electromotive force obtained through the thermal electromotive force detecting circuit 560 to control the heating drive circuit 529, and capturing a detection signal from the deflection detecting unit 530 to execute predetermined operation, an input device 532 such as a keyboard or a mouse for the user to give a command or the like to the arithmetic operation-control unit, and a display device 533 such as a CRT for displaying a result obtained etc. The moving device 527 also serves as a sample stage for sample 550. In FIG. 41, numeral 534 designates a base.

In the present embodiment the deflection detecting unit 530 is constructed to detect a deflection of the flexible plate 502 of cantilever 521 in accordance with the well-known optical lever method. More specifically, the deflection detecting unit 530 is composed, for example, of a laser light source consisting of a He—Ne laser or the like for emitting laser light to the flexible plate 502 and a bisected photodetector for detecting the laser light reflected by the flexible plate 502. It is, however, noted that the structure of the deflection detecting unit 530 is not limited to the above structure and thus, it does not have to apply the optical lever method.

The structure of the heating-topography measuring apparatus as described above appears similar to that of the conventional AFM, but is completely different from the conventional AFM in that the cantilever 521 has the heater 504, the apparatus has the heating drive circuit 529, and the arithmetic operation-control unit 531 executes the heating control and temperature control as detailed below.

Next explained is an example of the operation of the heating-topography measuring apparatus.

In the first heating operation of the heating-topography measuring apparatus, the arithmetic operation-control unit 531 controls the drive circuits 524, 526, 528, 529 in response to a specific command given by the user through the input device 532 so that the heater heats only a desired point on the surface of sample 550 or successively heats points in a desired region on the surface of sample 550 in the state where the cantilever 521 is deflected to urge the probe 503 against the surface of sample 550. Further, the arithmetic operation-control unit 531 controls the heating drive circuit 529 upon heating to raise the temperature of the probe 503 to the temperature set by the user through the input device 532, based on the thermal electromotive force (voltage between the electrode pattern 508b and the second thermocouple constituent 510 of cantilever 521) from the thermocouple. The arithmetic operation-control unit 531 controls the heating drive circuit 529, and the unit 531 constitutes a temperature control portion For heating a desired region on the surface of sample 550, for example, the user may set different temperatures for respective points in the region. In that case, the arithmetic operation-control unit 531 controls the heating drive circuit 529 so that the probe 503 becomes at respective, set temperatures upon scan of respective points according to the setting.

Specifically, supposing only a desired point of sample 550 is heated, for example, the moving devices 528, 527 are actuated through the drive circuits 526, 529 to move the sample 550 in the X- and Y-directions before the tip of probe 503 reaches a position on the XY plane corresponding to the desired point on the surface of sample 550; thereafter the sample 550 is moved in the Z-direction to deflect the cantilever 521 so as to make the tip of probe 503 urged against the surface of sample 550. Then the heater 504 in the cantilever 521 is actuated to heat through the drive circuit 529 or the heater 504 is preliminarily set in a heating state.

Further, supposing a predetermined region of sample 550 is heated, for example, the moving devices 525, 527 are actuated through the drive circuits 526, 528 to move the sample 550 in the X- and Y-directions before the tip of probe 503 reaches a position on the XY plane corresponding to the desired region in the surface of sample 550; thereafter the sample is moved in the Z-direction to deflect the cantilever 521 so as to make the tip of probe 503 urged against the surface of sample 550. Then the moving devices 525, 527 are actuated through the drive circuits 526, 528 while keeping the sample 550 at the position in the Z direction, so that the sample 550 may be moved in the X- and Y-directions so as to scan the desired region in the surface of sample 550. During the scan the heater 504 in the cantilever 521 is actuated to heat through the drive circuit 529.

Since in the first heating operation as described is above the probe 503 is urged against the surface of sample 550 by deflection of cantilever 521, the probe 503 is kept in sure contact with the surface of sample 550, and thermal conduction is effectively done from the tip of probe 503 to the surface of sample 550. When the probe 503 scans the surface of sample 550 in order to heat the desired region in the surface of sample 550, the probe 503 can follow the topography of the surface of sample 550 by deflection of cantilever 521, whereby the probe 503 can be kept in sure contact with the surface of sample 550 and heat conduction can be effectively done from the tip of probe 503 to the surface of sample 550 as well.

Since the first heating operation does not necessarily detect the deflection of cantilever 521, the deflection detecting unit 530 can be removed in case of only the first heating operation being executed.

In the second heating operation of the heating-topography measuring apparatus, in response to a specific command given by the user through the input device 532, the arithmetic operation-control unit 531 executes such control that while it controls the Z-directional position of sample 550 through the drive circuits 526, 528 and moving devices 525, 527 so as to keep the deflection of cantilever 521 constant, based on detection signals from the deflection detecting unit 530, it controls the position of sample 550 on the XY plane through the drive circuits 526, 528 and moving devices 525, 527 so as to make the probe 503 opposed to a desired point on the surface of sample 550 or so as to successively scan points in a desired region in the surface of sample 550, and the arithmetic operation-control unit 531 also controls the heating drive circuit 529 so as to heat only a desired point on the surface of sample 550 or so as to successively heat points in the desired region in the surface of sample. Further, similarly as in the first heating operation, the arithmetic operation-control unit 531 controls the heating drive circuit 529 upon heating so as to raise the temperature of the probe 503 to the temperature set by the user through the input device 532, based on the thermal electromotive force (voltage between the electrode pattern 508b and the second thermocouple constituent 510 of cantilever 521) from the thermocouple.

Specifically, in the second heating operation, position adjustment of the cantilever 521 is first carried out using the moving device 523. This position adjustment means that the laser light from the laser light source constituting the deflection detecting unit 530 is projected to a predetermined position of cantilever 521 and the position of cantilever 521 is adjusted so that reflected light from the cantilever 521 is incident to a predetermined position of the bisected photodetector. Next, the moving devices 525, 527 are actuated through the drive circuits 526, 528, thereby moving the sample 550 in the X- and Y-directions before the tip of probe 503 reaches a desired point or a position on the XY plane corresponding to a desired region on the surface of sample 550. After that, the moving devices 525, 527 are actuated to move the sample 550 in the Z-direction before the probe 503 of cantilever 521 comes into contact with the sample 550. On this occasion, contact between the probe 503 of cantilever 521 and the sample 550 can be achieved by detecting the deflection of cantilever 521 by the deflection detecting unit 530. In the cases where only a desired point is heated on the surface of sample 550, the heater 504 in the cantilever 521 is actuated to heat through the drive circuit 529 in this contact state, then completing the heating. In the cases where a desired region is heated on the surface of sample 550, after achieving the contact between the sample 550 and the probe 503, the moving device 527 is actuated to effect such movement that while the sample 550 is moved up and down in the Z-direction so as to keep constant the deflection of the cantilever 521 measured by the deflection detecting unit 530, the sample 550 is moved in the X- and Y-directions so as to scan the desired region on the surface of sample 550 with the tip of probe 503. During the scan, the heater 504 in the cantilever 521 is actuated to heat through the drive circuit 529.

In the second heating operation as described above, while achieving the movement control of the probe 503 similar to the so-called contact mode in AFM, the heater heats only a desired point on the surface of sample 550 or the heater successively heats points in a desired region on the surface of sample 550. Since the probe 503 can be kept in a constant contact state with the surface of sample 550 to follow the topography of surface of sample 550, a heating efficiency of the surface of sample 550 can be kept constant regardless of the topography of the surface of sample 550 accordingly.

For example, supposing the so-called raster scan is executed with the probe 503, any region in an arbitrary shape can be heated on the surface of sample 550 by actuating the heater 504 pulsewise in accordance with the scanning sequence.

In the topography measuring operation of the heating-topography measuring apparatus, in response to a specific command given by the user through the input device 532, the arithmetic operation-control unit 531 executes such control, similarly as in case of the second heating operation as described above, that while it controls the Z-directional position of sample 550 through the drive circuits 526, 528 and the moving devices 525, 527 so as to keep the deflection of cantilever 521 constant, based on detection signals from the deflection detecting unit 530, the control unit controls a position of sample 550 on the XY plane through the drive circuits 526, 528 and moving devices 525, 527 so as to successively scan points in a desired region on the surface of sample 550 with the probe 503, and the arithmetic operation-control unit 531 also obtains information concerning relative positions of the probe 503 relative to the surface of sample 550, that is, data on the topography of surface of sample 550.

This topography measuring operation is the same as the operation in the contact mode in the conventional AFM.

Since in the present embodiment the position control of moving devices is based on open loop control, the control signals output from the arithmetic operation-control unit 531 to the moving devices 523, 525, 527 correspond to position information of the moving devices 523, 525, 527. Because of this, the arithmetic operation-control unit 531 stores the data on the topography of surface of sample 550 based on the control signals, in the inside memory. If the position control of moving devices 523, 525, 527 is based on feedback control, for example, position detectors are to be provided for the respective moving devices 523, 525, 527.

In the present embodiment, the arithmetic operation-control unit 531 processes the topography data described above to display an image of topography of surface of sample 550 on the display device.

Since the scan itself with the probe 503 is common to the second heating operation and the topography measuring operation, these operations may be carried out at a time.

Since the heating-topography measuring apparatus performs the operations as discussed above, it can also be used in the following manner.

Namely, when the second heating operation and the third topography measuring operation are simultaneously carried out, the apparatus can simultaneously perform acquisition of data on the topography of surface of sample 550 and total or local heating of the surface of sample 550.

In another use, the topography measuring operation is first performed to obtain the data on the topography of surface of sample 550 before heating, a heating portion is determined based on the topography data, and thereafter the second heating operation is performed to locally heat the portion determined. In more detail, if one desires to start a thermal reaction at a peculiar point or arbitrary position based on observation of topography etc. of sample 550 by the topography measuring operation, the position can be locally heated by the second heating operation. In this case, a preferred example is such that a user interface is constructed in such an arrangement that when the user points a part in an image of topography of surface of sample 550 before heating, as displayed on the display device 533, through a mouse or the like as the input device 532, that part is automatically heated by the second heating operation.

Further, a change in topography of the surface of sample 550 before and after heating can also be observed in such a manner that the topography measuring operation is performed to obtain the data on the topography of surface of sample 550 before heating, the second heating operation is then performed to totally or locally heat the surface of sample 550, and thereafter the topography measuring operation is again performed to obtain the data on the topography of surface of sample 550 after heating.

The second heating operation and the topography measuring operation in the heating-topography measuring apparatus in the embodiment as described above are those in the contact mode in AFM.

It is also possible to realize the heating operation and topography measuring operation in the non-contact mode in AFM by modifying the heating-topography measuring apparatus as described above in the following manner.

Namely, in FIG. 41, added to the apparatus are a vibrating portion for vibrating the cantilever 521 and a vibration frequency detecting unit for detecting the vibration frequency of the cantilever 521.

Specific examples of the vibrating portion are a piezoelectric device (not shown) provided in the part of flexible plate 502 in the cantilever 521, a piezoelectric device (not shown) interposed between the cantilever holder 522 and the cantilever moving device 523, etc. The cantilever 521 vibrates with application of an ac voltage to the piezoelectric device. Preferably, the frequency of the ac voltage applied to the piezoelectric device in this case is so set that the vibration frequency of the cantilever 521 becomes a frequency a little different from the natural frequency of the cantilever 521.

Since the deflection detecting portion 530 is composed of the laser light source and the bisected photodetector, they can be used as the vibration frequency detecting portion as they are. In another example, the vibration frequency detecting portion may employ the piezo resistor provided in the portion of flexible plate 502 in the cantilever 521, and then the vibration frequency can be detected from a change in resistance of the piezo resistor.

Since the vibration frequency changes depending upon the distance between the surface of sample 550 and the probe 531, the sample 550 and the cantilever 521 are relatively moved up and down to change the distance between them so as to keep the vibration frequency of the cantilever 521 constant. Since this arrangement can keep constant the distance between the sample 550 and the center of vibration of the cantilever 521, a heat amount of the sample surface can be kept constant regardless of the topography of the surface of sample 550 and data can be obtained on the topography of the surface of sample 550.

The above modification of the heating-topography measuring apparatus described previously to realize the heating operation and the topography measuring operation in the non-contact mode is substantially equivalent to the heating-topography measuring apparatus as described previously.

The heating-topography measuring apparatus as described above can measure the thermal profile of the surface of sample 550 in such a manner that without heating the heater 504 of the cantilever 521, scan with probe 503 is carried out in the contact mode or in the non-contact mode as described above, and temperature data is taken based on the thermal electromotive force in accordance with the relative positions of the probe 503 to the sample 550. In this case, a change can be obtained in temperature profile of the surface of sample after heated, which is further effective in analysis etc. of sample.

Embodiment 14

Typical examples of the microscopes for obtaining an image resulting from the topography of the surface of substance or a physicochemical property thereof in the resolution of atomic or molecular order are scanning near field optical microscopes for obtaining a distribution of an optical property of the surface of a specimen, as well as the AFM.

However, the conventional AFMs can obtain an image of topography of the surface of specimen, but cannot obtain distribution of an optical property of the surface of specimen at the same time. Conversely, the conventional scanning near field optical microscopes can obtain distribution of an optical property of the surface of specimen, but cannot obtain an image of topography of the surface of specimen at the same time. No matter how evaluation and analysis was attempted as comparing the image of topography obtained by AFM with the distribution of optical property obtained by the scanning near field optical microscope at same positions of specimen, it was difficult to assure that the image of topography and the distribution of optical property resulted from same positions. In fact, it was difficult to evaluate and analyze the both as comparing with each other.

When the evaluation and analysis is impossible under the comparison between them, it cannot be determined, for example, whether a light intensity distribution obtained as signals by the scanning near field optical microscope is truly resulting from the optical property of the specimen or by the topography of surface of specimen. If evaluation and analysis under comparison between them is possible, such determination can be made, which is further preferably in observing the specimen.

Then, proposed is a cantilever which can simultaneously measure an image of topography of the surface of specimen and a distribution of an optical property thereof. This cantilever has a thin-film beam portion provided with a projecting probe in the tip region. A top portion of the probe is irradiated with a focused ion beam, thereby forming a through hole penetrating from the top portion to the back.

This cantilever can simultaneously measure the image of topography of the surface of specimen and the distribution of optical property by scanning the surface of specimen (sample) while measuring the intensity of evanescent light passing from the opening of the top portion of probe (aperture of the hole) through the hole and simultaneously measuring a deflection of the thin-film beam portion. Accordingly, evaluation and analysis can be done as comparing the image of topography with the distribution of optical property at same positions.

A method for fabricating this cantilever is next explained referring to FIGS. 42 to 45. FIGS. 42 to 45 are schematic cross sections to show fabrication steps of the cantilever.

First, using a silicon substrate 620 of the (100) plane orientation as a substrate material, inorganic films 621, 622, such as silicon dioxide films or silicon nitride films, are formed on the both surfaces of the silicon substrate 620. After that, the resultant is subjected to patterning by the photolithography process and the dry etching process to form an opening 621a for exposing the surface of the silicon substrate 620 at a predetermined portion of the upper inorganic film 621 on the top surface of silicon substrate 620. Next, using the inorganic films 621, 622 as a mask, the exposed portion of silicon substrate 620 from the opening 621a is etched in a pyramid shape by the anisotropic etching method, for example, to form a pyramid trench 620a continuous to the opening 621a in the inorganic film 621 (FIG. 42).

Figure 42:
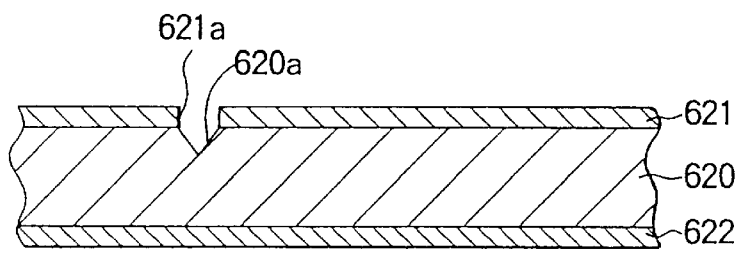
FIGS. 42 to 45 are schematic cross sections to show a cantilever fabricating method concerning a cantilever according to Embodiment 14.
Figure 43:
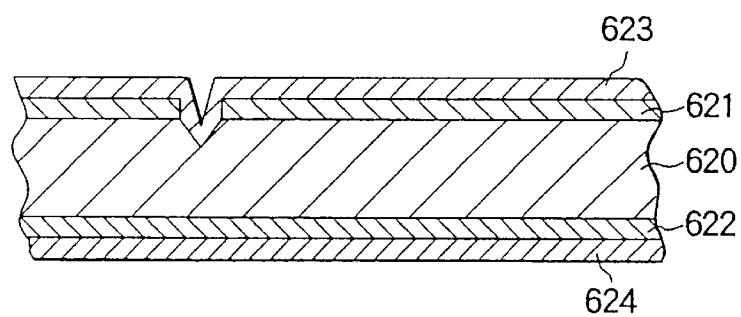

After that, further inorganic films 623, 624 are formed by the CVD process on the both surfaces of the substrate in the state shown in FIG. 42 (FIG. 43).

Figure 44:
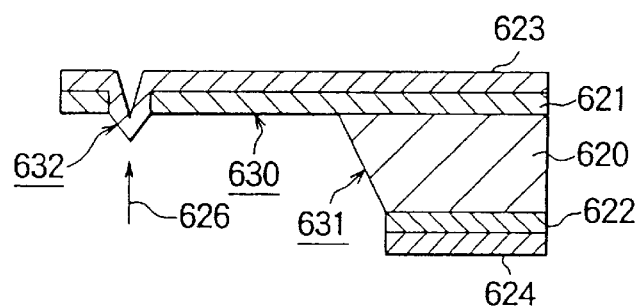
Figure 45:
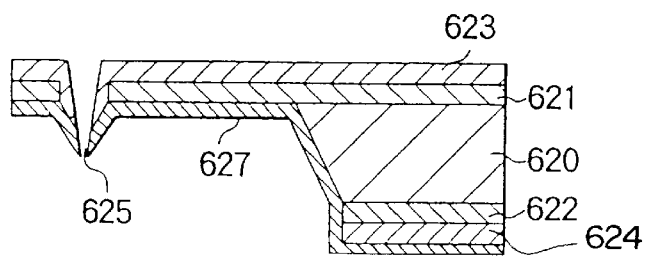

Next, the inorganic films 621–624 on the both surfaces of silicon substrate 620 are subjected to patterning by the photolithography process and the dry etching process so as to match with a desired shape of a beam portion and a desired shape of a support supporting the beam portion. After that, the exposed portion of the silicon substrate 620 by the patterning is dissolved by wet etching to form the cantilever body shown FIG. 44. As shown in FIG. 44, the cantilever body is composed of a thin-film beam portion 630, a support 631 for supporting the thin-film beam portion 630, and a probe 632 projecting in the tip region of the thin-film beam portion 630. The thin-film beam portion 630 is comprised of the inorganic films 621, 623. The support 631 is comprised of a non-etched portion of silicon substrate 620 remaining after the wet etching, and the inorganic films 621–624 on the both surfaces of the portion. The probe 632 is comprised of the inorganic film 623 deposited on the portion of trench 621a in the silicon substrate 620.

After that, a focused ion beam 626 is irradiated onto the top part of probe 632 to perforate the top part, thereby forming a through hole 625 penetrating from the top part to the back. Finally, a metal layer 627 is formed by vapor deposition on the bottom surface of the cantilever body including the probe 632, thereby completing the cantilever shown in FIG. 45.

The above fabrication method can fabricate a lot of cantilevers on a same silicon substrate 620.

When a multiplicity of cantilevers are fabricated simultaneously by the above fabrication method, the thin-film beam portions 630 and supports 631 can be processed en bloc (in a batch process) for the multiplicity of cantilevers.

However, the probe 632 is constructed of the inorganic film 623 deposited on the portion of trench 620a in the silicon substrate 620 by the CVD process, and the hole 625 is formed by irradiating the top portion of the probe 632 with the focused ion beam 624.

Because of this, for simultaneously fabricating a lot of cantilevers, the holes 625 must be formed one by one while successively irradiating the probes 630 one by one with the focused ion beam. Thus, the holes 625 through the probes 632 must be processed one by one. In other words, the fabrication method cannot employ batch processing, but must employ single processing for formation of the holes 625 in the probes 632. Accordingly, the fabrication cost is raised.

Figure 46:
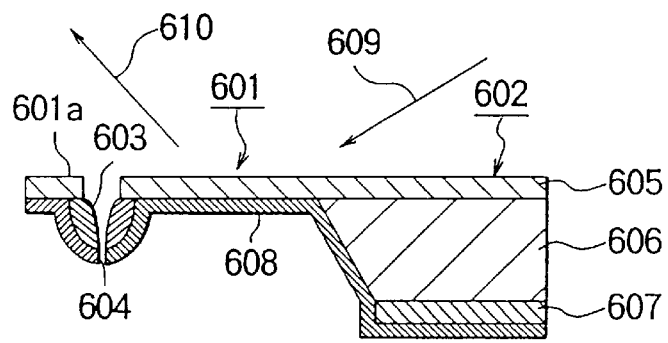
FIG. 46 is a schematic cross section to show the cantilever according to Embodiment 14 of the present invention.
Figure 47:
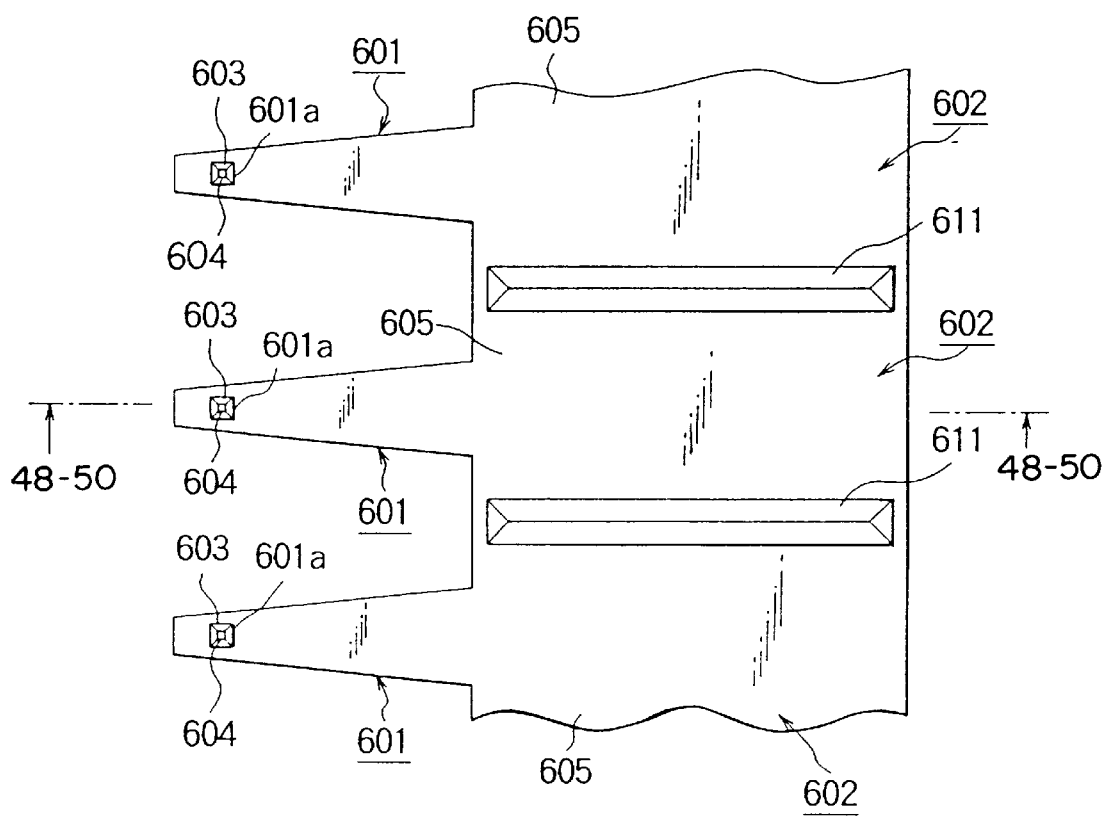
FIG. 47 is a plan view to show the cantilever according to Embodiment 14 of the present invention.

FIG. 46 is a schematic cross section of a cantilever according to Embodiment 14. FIG. 47 is a plan view of cantilevers shown in FIG. 46. Here, FIG. 46 is a cross section taken along G—G line in FIG. 47.

As shown in FIGS. 46 and 47, a cantilever is comprised of a thin-film beam portion 601 having an opening 601a formed in the tip region, a support 602 for supporting the thin-film beam portion 601, and a probe 603, which is substantially of a pyramid shape projecting to embrace the opening 601a around the opening 601a of the thin-film beam portion 601 and which has a through hole 604 penetrating from the top part of the probe 603 to the opening 601a of the thin-film beam portion 601. The probe 603 is constructed of silicon dioxide formed by thermal oxidation of silicon.

In the present embodiment, the thin-film beam portion 601 is constructed of an inorganic film 605, which is, for example, double films consisting of silicon nitride films or silicon dioxide films, or a silicon dioxide film and a silicon nitride film. The support 602 is constructed of the inorganic film 605, a silicon layer 606, and an inorganic film 607, which is, for example, double films consisting of silicon nitride films or silicon dioxide films, or a silicon dioxide film and a silicon nitride film. It is, however, noted that the structure of the support 602 is not limited to this structure.

In the present embodiment, a metal layer 608 is formed on the bottom surfaces of the thin-film beam portion 601 and probe 603 and on the side surface and bottom surface of the support 602, as a reflecting layer for reflecting a light beam 609 for detection of deflection of the thin-film beam portion 601, projected toward the thin-film beam portion 601, and as a light shielding layer surrounding the hole 604 on the side of the top part of probe 603. In the present embodiment, the light beam 609 passes through the inorganic film 605, then is reflected by the top surface of the metal layer 608, and further passes through the inorganic film 605 to be emergent as a reflected light beam 610 to the outside. It is, however, noted that a metal layer may also be formed on the top surface of the inorganic film 605 so as to keep the light beam 609 from passing through the inorganic film 605. The metal layer 608 may be replaced by any other reflective layer.

The metal layer 608 may be formed only at positions where the light beam 609 impinges and around the hole 604 on the side of the top portion of the probe 603. Further, a reflecting layer other than the metal layer may be formed at the positions irradiated with the light beam 609 on the top surface of the inorganic film 605. Any light-shielding layer, such as a reflecting layer other than the metal layer or a light absorbing layer, may be formed at the position around the hole 604 on the side of the top portion of probe.

Since the reflecting layer is formed as described above in the present embodiment, the reflectivity of the light beam 609 is increased. Accordingly, the present embodiment is advantageous in detection of deflection of the thin-film beam portion 601 by the optical lever method.

Further, because the light shielding layer is formed around the hole 604 on the side of the top portion of probe 603 in the present embodiment, evanescent light can travel only through the hole in the probe. Accordingly, the SN ratio can be improved in measuring the optical property of the surface of specimen.

Further, a plurality of cantilevers are connected through separation grooves 611 in the present embodiment, as shown in FIG. 47. Specifically, the supports 602 of plural cantilevers are connected to each other with the separation grooves 611 inbetween. Normally, these cantilevers are supplied to the user in the connected state, and when using a cantilever, the user exerts a force on the support 602 to separate each cantilever by breaking the support along the separation groove 611. The present embodiment is so arranged that a support 602 is provided with one thin-film beam portion 601 with a probe 603, but another example may be so arranged that a single support 602 is provided with a plurality of thin-film beam portions 601 with probes 603 different in mechanical characteristics.

The cantilever shown in FIGS. 46 and 47 can simultaneously measure an image of topography of the surface of specimen and a distribution of optical property of the surface of specimen by scanning the surface of specimen (sample) while measuring the intensity of evanescent light passing through the hole 604 of probe 603 and simultaneously measuring the deflection of thin-film beam portion, similarly as with the cantilever shown in FIGS. 42 to 45. Accordingly, evaluation and analysis can be done as comparing the image of topography with the distribution of optical property at same positions.

Since the cantilever shown in FIGS. 46 and 47 is provided with the probe 603 made of silicon dioxide by thermal oxidation of silicon, it can be fabricated by the fabrication method as explained below with reference to FIGS. 48 to 50, and batch processing can be applied instead of single processing to formation of holes 604 in probes 603. Accordingly, the fabrication cost can be greatly reduced as compared with the cantilevers shown in FIGS. 42 to 45.

Figure 48:
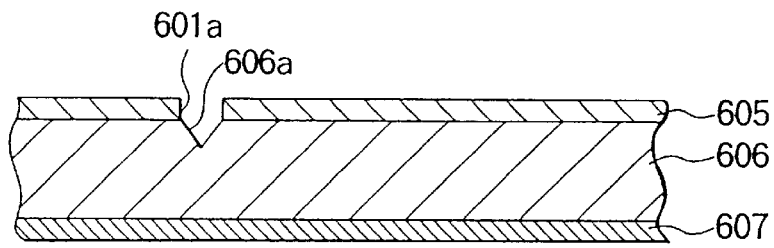
FIGS. 48 to 50 are schematic cross sections to show a method for fabricating the cantilever according to Embodiment 14.
Figure 49:
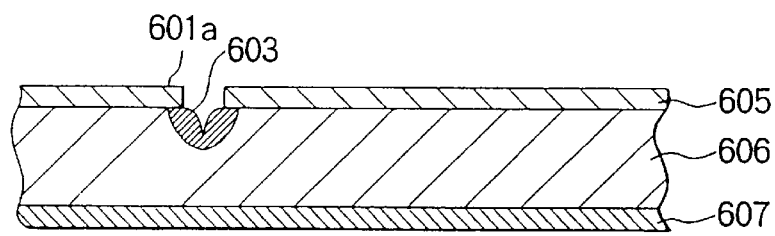
Figure 50:
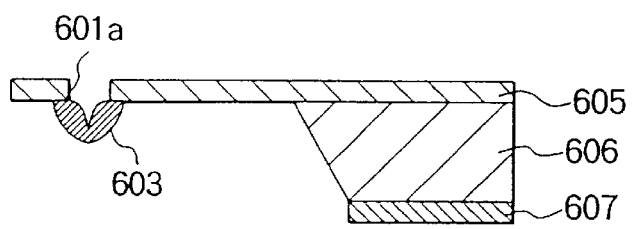

Next explained referring to FIGS. 48 to 50 is an example of the method for fabricating the cantilever shown in FIGS. 46 and 47. FIGS. 48 to 50 are schematic cross sections to show an example of the fabrication steps of the cantilevers shown in FIGS. 46 and 47. In FIGS. 48 to 50, elements corresponding to those in FIG. 46 are denoted by the same reference numerals.

First, a silicon nitride film is formed in the thickness of 700 nm on the both surfaces of an n-type silicon substrate 606 of the (100) plane orientation covered with a thin oxide film (silicon dioxide) and having the diameter of 3 inches and the thickness of 250 $\mu$m, by the low pressure vapor phase growth method using raw materials of dichlorosilane and ammonia gas. The double layers of the oxide film and silicon nitride film correspond to the inorganic films 605, 607 in FIG. 46. Further, the inorganic film 605 on the top surface of substrate 606 is subjected to patterning by the photolithography process and the dry etching process to form square openings 601a about 5 $\mu$m to 10 $\mu$m square so as to expose the surface of substrate 606 at predetermined portions of the upper inorganic film 605 on the substrate 606. The pattern shape, the size or the number of openings 601a can be arbitrarily set. Next, this substrate is immersed in a silicon etchant such as an aqueous potassium hydroxide (KOH) solution or an aqueous tetramethylammonium hydroxide (TMAH) solution to etch the exposed portions of substrate 606 from the openings 601a each in a quadrangular pyramid shape with the inorganic films 605, 607 as a mask, thereby forming quadrangular pyramid trenches 606a each being continuous to the corresponding openings 601a in the inorganic film 605 (FIG. 48). Since the substrate 606 is of the (100) plane orientation, etching automatically stops at the (111) plane of silicon, as well known. Thus, faces of each trench 606a become tapered faces with angle of 54.7°.

After that, the substrate in the state shown in FIG. 48 is set in an electric oven to grow a silicon dioxide film 603 in the portions of trenches 606a of the exposed substrate 606 by thermal oxidation (any type of thermal oxidation, such as wet oxidation or dry oxidation) (FIG. 49). As well known, the growth rate of the silicon dioxide film is faster in a flat portion but slower at corners. Thus, the cross section of the silicon dioxide film 603 grown in the each portion of trench 606a becomes as shown in FIG. 49, in which the thickness of the bottom part becomes extremely thinner than those of the other portions.

Next, the inorganic films 605, 607 on the both surfaces of the substrate 606 are subjected to patterning by the photolithography process and the dry etching process so as to match with a desired shape of beam portions 601 and a desired shape of supports 602. At the same time, the inorganic film 605 is subjected to patterning so as to match with the shape of separation grooves 611. After that, this substrate is immersed in an aqueous tetramethylammonium hydroxide solution (which rarely etches the silicon dioxide film) adjusted in a concentration of 20 to 25 wt % and heated at 80° C. to dissolve only unnecessary silicon portions exposed by the above patterning. This removes a part of the inorganic film 607 on the back surface of substrate 606 and a part of substrate 606 in the portion corresponding to the thin-film beam portion 601, thereby forming the cantilever body shown in FIG. 50. Also, the separation grooves 611 are formed on the substrate 606, as shown in FIG. 47.

Next, the cantilever body shown in FIG. 50 is immersed in an aqueous potassium hydroxide solution (which etches the silicon dioxide film at low rate) adjusted in a concentration of 40 wt % and heated at 85° C. for about 30 minutes to etch and remove a very small amount of the silicon dioxide film 603. This makes openings at the thinnest top part of the silicon dioxide film 603, thereby forming probes with hole 604 communicating from the top part to the opening 601a. After that, a metal layer 608 is formed, for example, by vacuum deposition on the bottom surface of the cantilever body, thereby completing the cantilevers shown in FIGS. 46 and 47. The metal layer 608 can be, for example, double layers including a nichrome layer first formed and a gold layer formed on the nichrome layer, or a single layer of gold.

The fabrication method as described above is a batch process by which many cantilevers can be formed at a time. It was confirmed that the cantilevers according to one embodiment of the present invention obtained by the fabrication method as described above were able to be fabricated at processing cost one tenth or less lower than that of the cantilevers shown in FIGS. 42 to 45.

Although the fabrication method as described referring to FIGS. 48 to 50 employed the n-type silicon substrate of the (100) plane orientation as the silicon substrate 606, the silicon substrate may be a p-type silicon substrate. If the trenches 606a are formed, for example, by dry etching, the silicon substrate 606 may be a silicon substrate of another plane orientation.

Further, the fabrication method as explained with reference to FIGS. 48 to 50 comprises film-forming the silicon nitride films on the both surfaces of silicon substrate 606 covered with an oxide film, but the silicon nitride films may be film-formed on the both surfaces of a silicon substrate not covered with a silicon dioxide film, or only silicon dioxide films may be film-formed on the both surfaces of silicon substrate 606.

The fabrication method as explained referring to FIGS. 48 to 50 comprises forming the trenches 606a by wet etching, but the trenches 606a may be formed, for example, by dry etching.

Further, the fabrication method as explained with reference to FIGS. 48 to 50 comprises etching the silicon dioxide film 603 by wet etching, but the silicon dioxide film 603 may be etched by any type of etching enabling the batch process, for example, the plasma etching, the reactive ion etching, the photo excited etching, etc.

Embodiment 15

Figure 51:
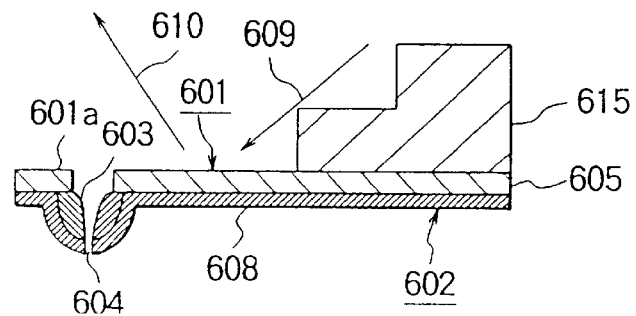
FIG. 51 is a schematic cross section to show a cantilever according to Embodiment 15 of the present invention.
Figure 52:
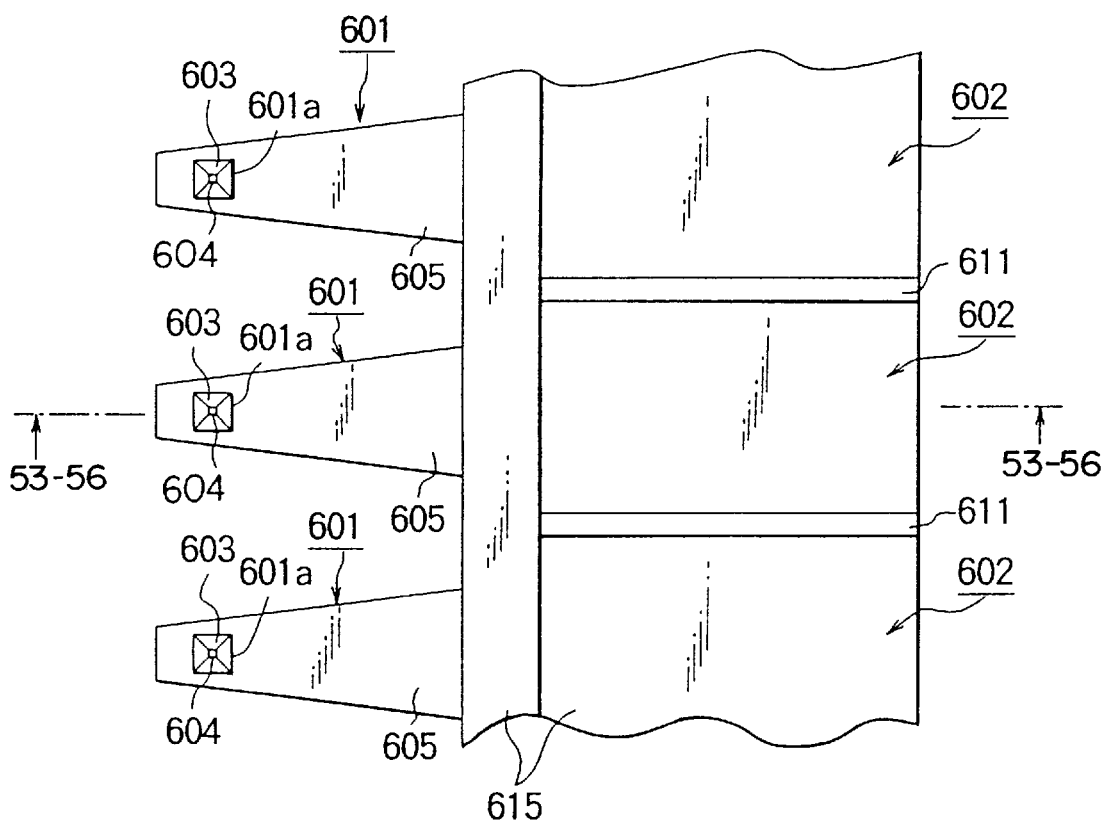
FIG. 52 is a plan view to show the cantilever according to Embodiment 15 of the present invention.

The cantilever according to Embodiment 15 of the present invention is next explained referring to FIGS. 51 and 52.

FIG. 51 is a schematic cross section of a cantilever according to the present embodiment. FIG. 52 is a plan view of cantilevers shown in FIG. 51. FIG. 51 is a cross section taken along H—H line in FIG. 52.

In FIG. 51 and FIG. 52, identical or corresponding elements to those in FIGS. 46 and 47 are denoted by the same reference numerals.

A cantilever as shown in FIGS. 51 and 52 is also comprised of, similarly as in the embodiment shown in FIGS. 46 and 47, a thin-film beam portion 601 with an opening 601a formed in the tip region, a support 602 for supporting the thin-film beam portion 601, and a probe 603 which is substantially a pyramid shape projecting to surround the opening 601a around the opening 601a of the thin-film beam portion 601 and which has a hole 604 communicating from the top part of probe 603 to the opening 601a of the thin-film beam portion 601. The probe 603 is constructed of silicon dioxide obtained by thermal oxidation of silicon.

Also in the present embodiment, the thin-film beam portion 601 is comprised of, similarly as in the embodiment shown in FIGS. 46 and 47, the inorganic film 605 consisting of double films, such as silicon nitride films or silicon dioxide films, or a silicon dioxide film and a silicon nitride film. The present embodiment is, however, different from the embodiment shown in FIGS. 46 and 47 in that the support 602 is comprised of the inorganic film 605 and a glass member 615 bonded to the top surface of the inorganic film 605.

In the present embodiment, a metal layer 608 is formed on the bottom surfaces of the thin-film beam portion 601, probe 603, and support 602, as a reflective layer for reflecting a light beam 609 for detection of deflection of the thin-film beam portion 601, projected toward the thin-film beam portion 601, and as a light shielding layer around the hole 604 on the side of the top portion of probe 603.

A corner of the glass member 615 is removed so as not to obstruct the light beam 609, as shown in FIG. 51.

The cantilever according to the present embodiment can also measure the image of topography of the surface of specimen and the distribution of optical property of specimen at the same time, similarly as the cantilever shown in FIGS. 46 and 47 can.

Since in the cantilever according to the present embodiment the probe 603 is comprised of silicon dioxide obtained by thermal oxidation of silicon similarly as in the embodiment shown in FIGS. 46 and 47, the cantilever can be fabricated by the fabrication method as explained below with reference to FIGS. 53 to 56 and batch processing instead of single processing can be applied to formation of holes 604 of probes 603. Accordingly, the fabrication cost can be greatly reduced as compared with that of the cantilevers shown in FIGS. 42 to 45.

The cantilever shown in FIGS. 51 and 52 is different particularly in the structure of support 602 from that shown in FIGS. 46 and 47. The support 602 in the embodiment shown in FIGS. 46 and 47 projects downward (on the side of probe 603), whereas the support 602 in the embodiment shown in FIGS. 51 and 52 projects upward (on the opposite side to the probe 603). Accordingly, the embodiment shown in FIGS. 51 and 52 can prevent the support 602 from colliding with and hindering a specimen upon scan, whereby the surface of specimen can be scanned in a broad region, as compared with the embodiment shown in FIGS. 46 and 47.

Next explained referring to FIGS. 53 to 56 is an example of the method for fabricating the cantilever shown in FIGS. 51 and 52. FIGS. 53 to 56 are schematic cross sections to show an example of the fabrication steps of the cantilevers shown in FIGS. 51 and 52. In FIGS. 53 to 56, elements corresponding to those in FIG. 51 are denoted by the same reference numerals.

First, inorganic films 605, 607 are formed on the both surfaces of a silicon substrate 606 of the (100) plane orientation. Further, the inorganic film 605 on the top surface of the substrate 606 is subjected to patterning by the photolithography process and the dry etching process to form openings 601a exposing the surface of substrate 606 at predetermined portions of the upper inorganic film 605 on the substrate 606. Next, this substrate is immersed in a silicon etchant such as an aqueous potassium hydroxide (KOH) solution or an aqueous tetramethylammonium hydroxide (TMAH) solution to etch the exposed portions of substrate 606 from the openings 601a each in a quadrangular pyramid shape with the inorganic films 605, 607 as a mask, thereby forming quadrangular pyramid trenches 606a each being continuous to the openings 601a in the inorganic film 605 (FIG. 53).

Figure 53:
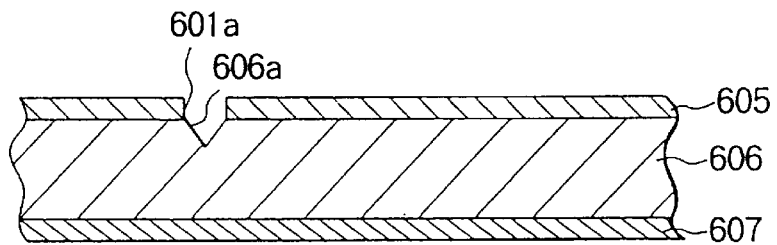
FIGS. 53 to 56 are schematic cross sections to show a method for fabricating the cantilever according to Embodiment 15.
Figure 54:
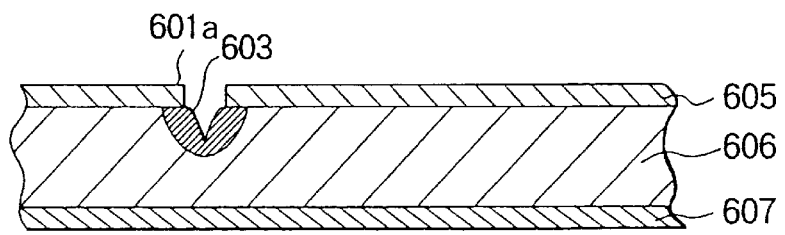

After that, the substrate in the state shown in FIG. 53 is set in an electric oven to grow the silicon dioxide film 603 by thermal oxidation in the portions of trenches 606a of exposed substrate 606 (FIG. 54). As well known, the growth rate of the silicon dioxide film is faster in a flat portion but slower at corners. Thus, the cross section of the silicon dioxide film 603 grown in the each portion of trench 606a becomes as shown in FIG. 54, in which the thickness of the bottom part in extremely thinner than those of the other portions.

Figure 55:
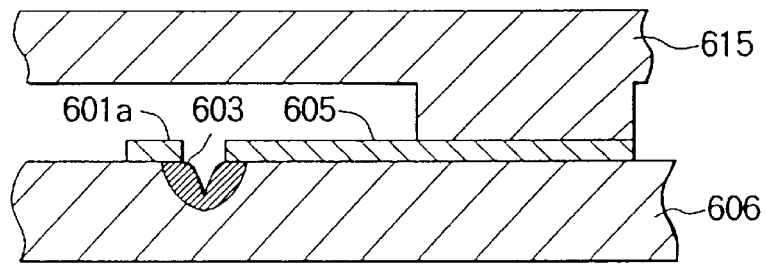

Next, the lower inorganic film 607 on the bottom face of substrate 606 is removed, for example, by dry etching. Further, the inorganic film 605 on the top surface of substrate 606 is subjected to patterning by the photolithography process and the dry etching process so as to match with a desired shape of beam 601 and a desired shape of support 602. After that, a glass substrate 615, which was preliminarily processed to remove a non-bonded region (a portion not to be bonded to the inorganic film 605) for example by a dicing machine, is bonded to the inorganic film 605 by the anode coupling method (FIG. 55).

After that, the upper portion not corresponding to the support 602 in the glass substrate 615 is removed for example using the dicing machine, and further, the corner of glass substrate 615, the upper portion of which was removed, is then removed so as not to hinder the light beam 609. Also, the separation grooves 611 are formed in the glass substrate 615, as shown in FIG. 52, for example using the dicing machine. Next, this substrate is immersed in a silicon etchant such as an aqueous tetramethylammonium hydroxide (TMAH) solution to remove the substrate 606. This forms the cantilever body shown in FIG. 56.

Figure 56:
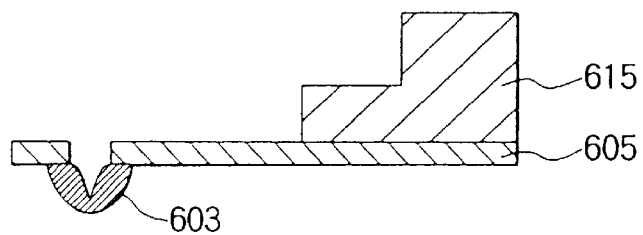

Next, the cantilever body shown in FIG. 56 is immersed in an aqueous potassium hydroxide solution (which etches the silicon dioxide film at low rate) to etch and remove a very small part of the silicon dioxide film 603. This forms openings at the thinnest top part of the silicon dioxide film 603, thereby forming probes each with hole 604 communicating from the top part to the opening 601a. After that, a metal layer 608 is formed, for example, by vacuum deposition on the bottom surface of the cantilever body, thereby completing the cantilevers shown in FIGS. 51 and 52.

The fabrication method as described above is also a batch process by which many cantilevers can be formed at a time.

Embodiment 16

Typical examples of scanning probe microscopes for obtaining an image resulting from the topography of surface of substance or a physicochemical property in the resolution of atomic or molecular order are the scanning tunneling microscope (STM) and the atomic force microscope (AFM) for obtaining an image of topography of the surface of specimen, and the scanning capacitance microscope (SCaM) for obtaining a distribution of capacitances between the surface of specimen and a conductive probe.

The atomic force microscope is one for obtaining an image of topography of surface due to an interatomic force appearing between the probe and the surface of a specimen (sample). Also, the scanning tunneling microscope is one for obtaining an image of topography of surface due to a tunnel current flowing between the probe and the specimen. Further, the scanning capacitance microscope is one for obtaining an image of capacitance profile resulting from capacitances between the probe and the surface of specimen.

The cantilever as a probe used in these microscopes is generally provided with a thin-film beam portion and a probe projecting in the tip region of the thin-film beam portion.

The cantilever used in the scanning capacitance microscope, the scanning tunneling microscope, etc. needs to have a probe with electric conduction in respect of the operational principle thereof.

Thus, such scanning capacitance microscope, scanning tunneling microscope, etc. employ a probe with electric conduction obtained by forming a film of a metal material over the entire lower surface of the cantilever generally used for the atomic force microscope. Namely, the cantilever as a probe is provided with electric conduction by forming a protrusion with electric insulation in the tip region of the thin-film beam portion and forming a film of a metal material over the entire lower surface of the thin-film beam portion including the surface of the protrusion.

Incidentally, the conventional atomic force microscope and scanning tunneling microscope can obtain an image of topography of the surface of specimen, but cannot obtain a capacitance profile of the specimen at the same time. Conversely, the conventional scanning capacitance microscope can obtain a capacitance profile of specimen, but cannot obtain an image of topography of the surface of specimen at the same time.

Therefore, even if one attempted to make evaluation and analysis as comparing a topography image obtained by AFM or STM with a capacitance profile obtained by SCaM at same positions of specimen, it would be difficult to attain such assurance that the topography image and the capacitance profile were from the same positions. In fact, it was difficult to make evaluation and analysis based on comparison between them.

However, it cannot be determined, for example, whether the capacitance profile obtained as signals by the scanning capacitance microscope is resulting from true capacitances of specimen or from the topography of the surface of specimen, if the evaluation and analysis is not allowed based on comparison between them. If evaluation and analysis is allowed based on comparison between them, such determination becomes possible, which is further preferable in observing a specimen.

Then, there were the conventional cases where the above-described probe, provided with electric conduction by forming a film of a metal material over the entire bottom surface of the cantilever generally used in AFM, was used to simultaneously measure an image of surface topography due to the interatomic force caused between the probe and the surface of specimen or an image of surface topography due to the tunnel current flowing between the probe and the specimen, and an image of capacitance profile caused by ac-wise capacitances between the surface of specimen and the probe.

Here is described a specific example of the cantilever (the above-described probe provided with electric conduction by forming a film of a metal material over the entire bottom surface of the cantilever generally used in AFM) with reference to FIGS. 57 to 60. FIGS. 57 to 60 are schematic cross sections to show the fabrication steps of the cantilever.

First, using a silicon substrate 720 of the (100) plane orientation as a substrate material, inorganic films 721, 722 with electric insulation, such as silicon dioxide films or silicon nitride films, etc., are formed on the both surfaces of the silicon substrate 720. After that, the resultant is subjected to patterning by the photolithography process and the dry etching process to form an opening 721a for exposing the surface of silicon substrate 720 at a predetermined portion of the inorganic film 721 on the top surface of the silicon substrate 720. Next, with the inorganic films 721, 722 as a mask, the exposed portion of silicon substrate 720 from the opening 721a is etched in a pyramid shape, for example by anisotropic etching, to form a pyramid trench 720a continuous to the opening 721a of the inorganic film 721 (FIG. 57).

Figure 57:
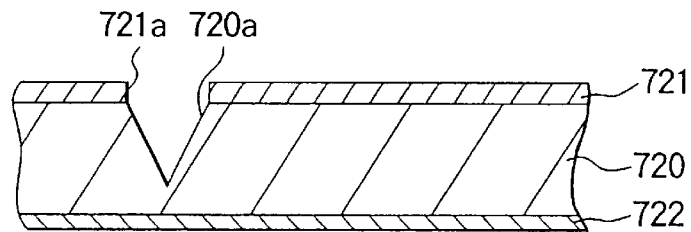
FIGS. 57 to 60 are schematic cross sections to show a cantilever fabricating method concerning a cantilever according to Embodiment 16.
Figure 58:
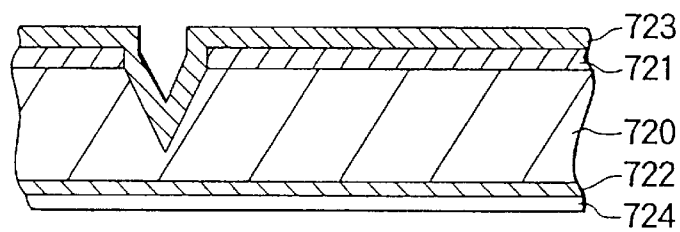

After that, inorganic films 723, 724 are further formed by the CVD process on the both surfaces of the substrate in the state shown in FIG. 57 (FIG. 58).

Figure 59:
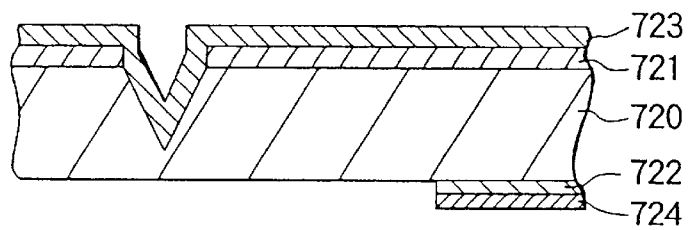

Next, the inorganic films 721–724 on the both surfaces of the silicon substrate 720 are subjected to patterning by the photolithography process and the dry etching process so as to match with a desired shape of the beam portion and a desired shape of the support supporting the beam portion (FIG. 59).

Figure 60:
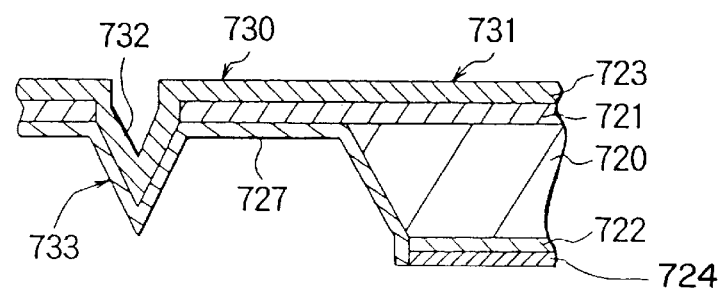

After that, the exposed portion of silicon substrate 720 by the above patterning is dissolved by wet etching to form a cantilever body. As shown in FIG. 60 explained in the below description, the cantilever body is comprised of a thin-film beam portion 730, a support 731 for supporting the thin-film beam portion 730, and a projecting portion 732 projecting in the tip region of the thin-film beam portion 730. The thin-film beam portion 730 is comprised of the inorganic films 721, 723. The support 731 is comprised of the remaining portion of silicon substrate 720 not dissolved by wet etching and the inorganic films 721–724 on the both surfaces of this remaining portion. The projecting portion 732 is comprised of the inorganic film 723 deposited on the portion of trench 721a in the silicon substrate 720.

Finally, a metal layer 727 is formed, for example, by vacuum deposition on the entire bottom surface of the cantilever body including the projecting portion 732, thereby completing the cantilever shown in FIG. 60. Here, the probe 733 is comprised of the projecting portion 732 and the portion of metal layer 727 formed on the projecting portion 732.

This cantilever can simultaneously measure at least one of the surface topography image due to the interatomic force, the surface topography image due to the tunnel current, and the capacitance profile image, etc.

Incidentally, the tip of the probe 733 is in contact with a specimen for obtaining the capacitance profile image, and the tip of the probe 733 sometimes occurs to contact the specimen upon scanning even in the cases for obtaining the surface topography image due to the interatomic force or the surface topography image due to the tunnel current.

Since the above cantilever has such a structure of the probe 733 that the metal layer 727 is formed on the projection 732, the metal layer 727 at the tip of probe 733 is likely to wear off due to the contact with the specimen. As a result, the resolution of measurement of tunnel current, capacitance, etc. becomes lowered with progress of wear, which makes signals obtained unstable and which shortens the life of the cantilever.

Figure 61:
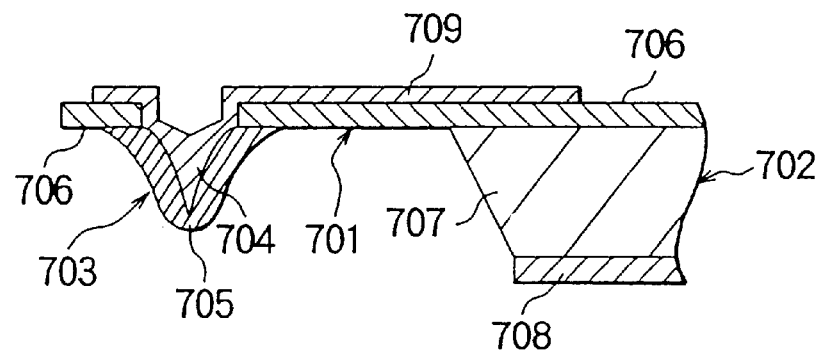
FIG. 61 is a schematic cross section to show the cantilever according to Embodiment 16 of the present invention.
Figure 62:
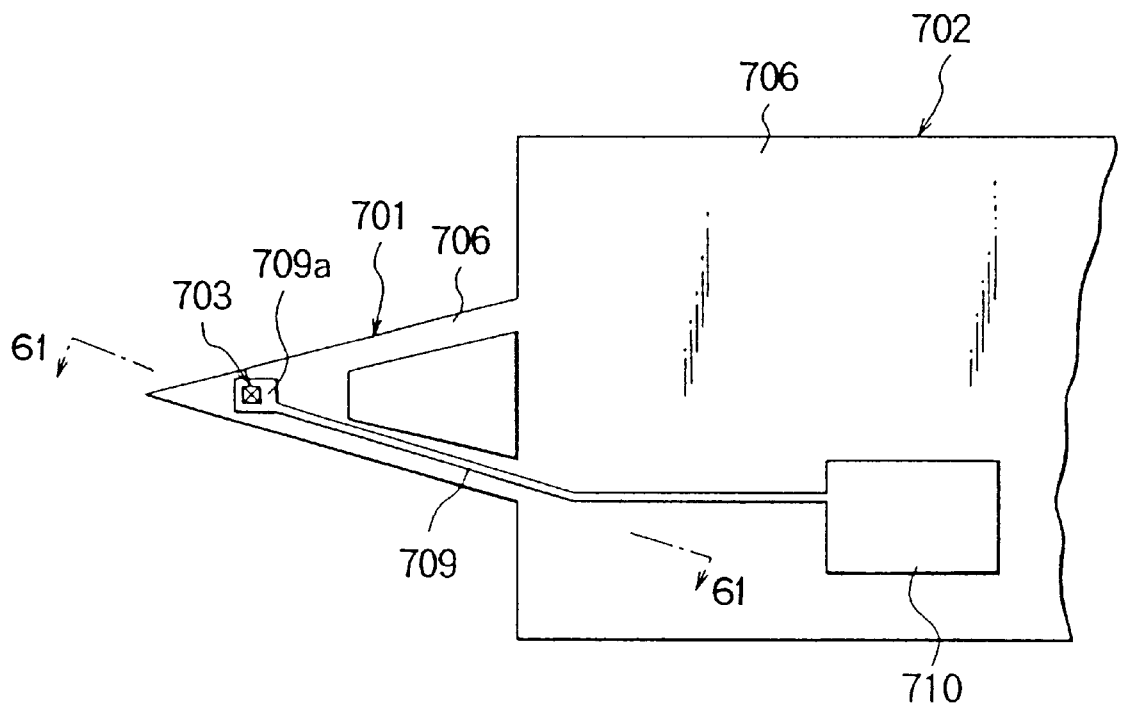
FIG. 62 is a plan view to show the cantilever according to Embodiment 16 of the present invention.

FIG. 61 is a schematic cross section of the cantilever according to Embodiment 16 of the present invention. FIG. 62 is a plan view of the cantilever shown in FIG. 61. Here, FIG. 61 is a cross section taken along I—I line in FIG. 62.

This cantilever is composed, as shown in FIGS. 61 and 62, of a thin-film beam portion 701, a support 702 for supporting the thin-film beam portion 701, and a probe 703 projecting in the tip region of the thin-film beam portion 701. The probe 703 is comprised of a projection 704 with electric conduction, and a silicon dioxide film 705, which covers the tip and surroundings of the projection 704 and the thickness of which on the tip side of the projection 704 is thinner than those of the other portions.

In the present embodiment, the thin-film beam portion 701 is comprised of an inorganic film 706 with electric insulation, such as a silicon nitride film or a silicon dioxide film. The support 702 is comprised of the inorganic film 706, a silicon layer 707, and an inorganic film 708, such as a silicon nitride film or a silicon dioxide film. It is, however, noted that the structure of the support 702 is not limited to this structure.

In the present embodiment a wiring pattern 709 electrically connected to the probe 704 is formed in a part on the thin-film beam portion 701. In the present invention, the wiring pattern 709 may be, however, formed, for example, by forming an electric conductive film over the entire top surface of the thin-film beam portion 701. However, when the electric conductive film is formed over the entire top surface of the inorganic film 706, a stray capacitance becomes larger between the cantilever and the specimen, similarly as in the cantilever as described above, which degrades the SN ratio of measurement signals in measuring the capacitance profile of specimen. It is thus preferred that the wiring pattern 709 be partially formed as in the present embodiment.

As shown in FIG. 62, the wiring pattern 709 also extends on the support 702 to be connected to an electrode pattern 710 for electric connection with the outside, formed on the support 702. In the present embodiment, the projection 704, wiring pattern 709, and electrode pattern 710 are continuously formed of a same conductive material. However, these elements may be formed of different conductive materials.

In the present embodiment, the projection 704, wiring pattern 709, and electrode pattern 710 each are comprised of a plurality of metal layers of different kinds. For example, each of these can be comprised of a nichrome or chrome layer and a layer of a metal suitable as a wiring material such as gold or aluminum, formed thereon. In this case, interposition of the nichrome or chrome layer is preferable because it enhances adhesion of gold or aluminum, etc. to the inorganic film 706 etc. such as the silicon dioxide film or the silicon nitride film. The present invention, however, does not necessarily have to employ such a multilayer structure, but can employ a single metal layer. Further, the projection 704, wiring pattern 709, and electrode pattern 710 may be constructed of a conductive material other than metals.

In the present embodiment, the wiring pattern 709 has an extended portion 709a on the right side of the probe 703, as shown in FIG. 62, and this extended portion 709a also serves as a reflecting layer for reflecting a light beam for detection of deflection of the thin-film beam portion 701, projected toward the thin-film beam portion 701. It is, however, noted that in the present invention a reflecting layer separate from the wiring pattern 709 may be formed on the thin-film beam portion 701. The reflecting layer does not have to be formed if the deflection of the thin-film beam portion 701 is detected by another method different from the optical lever method or if there is no need to detect the deflection of the thin-film beam portion 701 (for example, in case of obtaining only the surface topography image due to the tunnel current).

The cantilever shown in FIGS. 61 and 62 can simultaneously measure at least one of the surface topography image due to the interatomic force, the surface topography image due to the tunnel current, and the capacitance profile image, etc., similarly as the cantilever as shown in FIGS. 57 to 60 can.

Since the cantilever shown in FIGS. 61 and 62 includes the probe 703 comprised of the projection 704 with electric conduction and the silicon dioxide film 705 covering the tip and surroundings of the projection 704, the projection 704 can be protected against wear by the silicon dioxide film 705 covering the tip and surroundings of projection 704 because of high wear resistance of the silicon dioxide film 705. As a result, the progress in decrease of resolution of measurement of the tunnel current, capacitance, etc. becomes extremely slower than that of the cantilever as shown in FIGS. 57 to 60, which enables stable measurement for a long time and which extends the life of the cantilever. Since the silicon dioxide film 705 is thinner on the tip side of projection 704 than the other portions, it rarely lowers the tunnel current, capacitance signal, etc.

Embodiment 17

Figure 63:
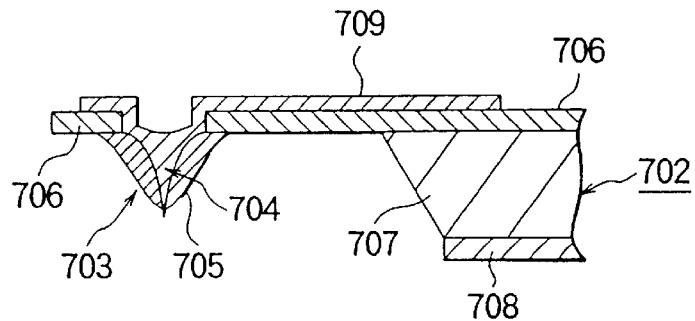
FIG. 63 is a schematic cross section to show a cantilever according to Embodiment 17 of the present invention.

The cantilever according to Embodiment 17 of the present invention is next explained referring to FIG. 63. FIG. 63 is a schematic cross section of the cantilever. In FIG. 63, identical or corresponding constituent elements to those shown in FIG. 61 are denoted by the same reference numerals, and the description thereof will be omitted.

The cantilever shown in FIG. 63 is different from the embodiment shown in FIGS. 61 and 62 only in that the cantilever shown in FIGS. 61 and 62 had the silicon dioxide film 705 covering not only the surroundings of projection 704 but also the tip thereof, whereas the cantilever shown in FIG. 63 has the silicon dioxide film 705 covering only the surroundings of the projection 704 so that the tip of projection 704 is projecting a little from the silicon dioxide film 705.

The cantilever shown in FIG. 63 is advantageous in that the projection 704 is protected against wear by the silicon dioxide film 705 covering the surroundings thereof. As a result, wear of the projection 704 proceeds at the same rate in the first stage as that in the conventional cantilever, but after the projecting portion of the projection 704 out of the silicon dioxide film 705 is worn out, progress becomes extremely slower in decrease of resolution of measurement of tunnel current, capacitance, etc. than in the conventional cantilever, which enables stable measurement for a long time and which extends the life of the cantilever. Although the cantilever shown in FIG. 63 is somewhat inferior in wear resistance to the cantilever shown in FIGS. 61 and 62, it has such an advantage that the tunnel current, capacitance signal, or the like is not decreased at all because the tip of projection 704 is exposed.

The tip of the projection 704 is projecting out of the silicon dioxide film 705 in the cantilever shown in FIG. 63, but the tip of projection 704 may be arranged to be exposed so that the tip of projection 704 does not project out of the silicon dioxide film 705.

In this case the progress in decrease of resolution of measurement of tunnel current, capacitance, etc. becomes extremely slower from the beginning than in the conventional cantilever, thus enabling stable measurement for a long time and extending the life of the cantilever. Also in this case, the cantilever has such an advantage that the tunnel current, capacitance signal, or the like is not lowered at all, as in case of the cantilever shown in FIG. 63.

Figure 64:
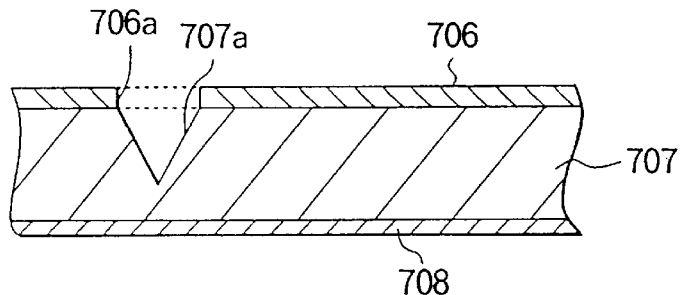
FIGS. 64 to 66 are schematic cross sections to show a method for fabricating the cantilever according to Embodiment 17.
Figure 65:
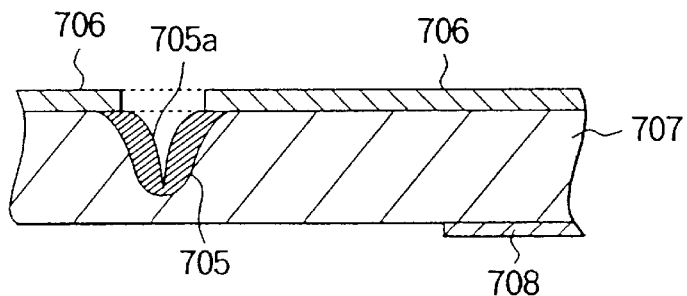
Figure 66:
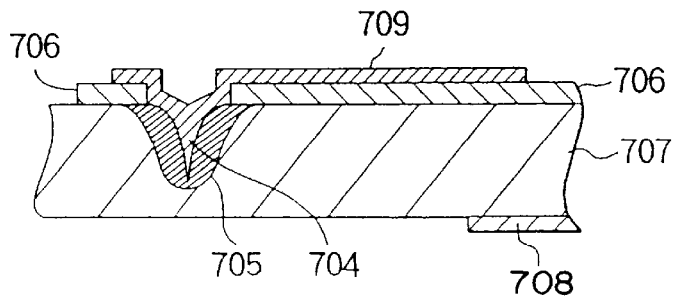

An example of the method for fabricating the cantilever shown in FIGS. 61 and 62 is next explained referring to FIGS. 64 to 66. FIGS. 64 to 66 are schematic cross sections to show an example of the fabrication steps of the cantilever shown in FIGS. 61 and 62. In FIGS. 64 to 66, elements corresponding to those in FIG. 61 are denoted by the same reference numerals.

First, a silicon nitride film is formed in the thickness of 700 nm on the both surfaces of an n-type silicon substrate 707 of the (100) plane orientation covered with a thin oxide film (silicon dioxide film) having the diameter of 3 inches and the thickness of 250 $\mu$m, by the low pressure vapor phase growth method using raw materials of dichlorosilane and ammonia gas. The oxide film and silicon nitride film correspond to the inorganic films 706, 708 in FIG. 61. Further, the inorganic film 706 on the top surface of substrate 707 is subjected to patterning by the photolithography process and the dry etching process to form a square opening 706a about 5 $\mu$m to 10 $\mu$m square, exposing the surface of substrate 707 at a predetermined portion of the inorganic film 706 on the top surface of substrate 707. The pattern shape and size of opening 706a, and the number of openings 706a can be arbitrarily set. After that, this substrate is immersed in a silicon etchant such as an aqueous potassium hydroxide (KOH) solution or an aqueous tetramethylammonium hydroxide (TMAH) solution, whereby with the inorganic films 706, 708 as a mask, the exposed portion of substrate 707 out of the opening 706a is etched in a quadrangular pyramid shape to form a quadrangular pyramid trench 707a continuous to the opening 706a of the inorganic film 706 (FIG. 64). Since the substrate 707 is of the (100) plane orientation, etching automatically stops at the (111) plane of silicon, as well known. Thus, faces of the trench 707a become tapered surfaces with angle of 54.7°.

After that, the substrate in the state shown in FIG. 64 is set in an electric oven and then is heated at 900° C. in the oxygen and steam atmosphere, thereby growing the silicon dioxide film 705 by thermal oxidation (which may be any type of thermal oxidation, such as wet oxidation or dry oxidation) in the portion of trench 707a of the exposed substrate 707 (FIG. 65). As well known, the growth rate of the silicon dioxide film is faster in a flat portion but slower at corners. Thus, the cross section of the silicon dioxide film 705 grown on the portion of trench 707a becomes as shown in FIG. 65, in which the thickness of the bottom part is extremely thinner than those of the other portions. Observing the sample in the present embodiment, the thickness of the bottom part of this silicon dioxide film 705 was about 5 nm.

Next, the inorganic films 706, 708 on the both surfaces of the substrate 707 are subjected to patterning by the photolithography process and the dry etching process so as to match with a desired shape of the beam portion 701 and a desired shape of the support 702 (FIG. 65).

After that, on the top surface of the substrate in the state shown in FIG. 65, a metal layer, for example, of gold, platinum, nichrome, chrome, rhodium, nickel, or aluminum, is patterned by a well-known technique such as the lift-off process, thereby forming the projection 704 in the portion of trench 705a of the silicon dioxide film 705 and forming the wiring pattern 709 continuous to the projection 704 and the electrode pattern 710 (FIG. 62) continuous to the wiring pattern 709 (FIG. 66). In this case, in order to enhance adhesion to the inorganic film 706 etc., such as the silicon nitride film or silicon dioxide film, a preferred example includes a multilayer metal film formed by first forming a film of nichrome or chrome in about 2 nm and thereafter forming a film of a wiring material such as gold or aluminum thereon.

The above metal layer may be formed over the entire top surface of the inorganic film 706, but it is preferably formed in as small area of the metal layer as possible by patterning such as the lift-off process as described above, because a capacitance or stray capacitance in the region except for the tip region of probe to be measured can be decreased.

After that, this substrate is immersed in an aqueous tetramethylammonium hydroxide solution (TMAH) (which rarely etches the silicon dioxide film) adjusted in a concentration of 20 to 25 wt % and heated at 80° C. to dissolve only unnecessary silicon portions exposed by the above patterning. This completes the cantilever shown in FIGS. 61 and 62.

Next explained is an example of the method for fabricating the cantilever shown in FIG. 63.

First, the cantilever shown In FIGS. 61 and 62 is fabricated by the method as described above.

Next, the cantilever shown in FIGS. 61 and 62 is immersed in an aqueous potassium hydroxide solution (which etches the silicon dioxide film at low rate) adjusted in a concentration of 40 wt % and heated at 85° C., to isotropically etch and remove a very small amount of the silicon dioxide film 705, thereby making the projection 704 slightly projecting out of the top portion (corresponding to the thinnest portion before etching) of the silicon dioxide film 705 after the etching removal. This completes the cantilever shown in FIG. 63.

The each fabrication method as described above skillfully utilizes the property that the growth rate of the silicon dioxide film by thermal oxidation of silicon is faster in a flat portion and slower at corners, so that the cantilever shown in FIGS. 61 and 62 and the cantilever shown in FIG. 63 can be easily fabricated in a decreased number of steps.

The projection 704 can be exposed so as not to project out from the silicon dioxide film 705 by adjusting the degree of etching in etching the cantilever shown in FIGS. 61 and 62 in the above-described manner. Such adjustment is, however, difficult in fact, and thus, the projecting portion of the projection 704 out of the silicon dioxide film 705 may be preliminarily removed by so-called preparatory trace to move the exposed tip of projection 704 of the cantilever shown in FIG. 63 in contact with a glass member, for example.

The fabrication method as described above employs the n-type silicon substrate of the (100) plane orientation as the silicon substrate 707, but the p-type silicon substrate may be used. If the trench 707a is formed, for example, by dry etching, a silicon substrate of another plane orientation may be used as the silicon substrate 707.

The fabrication method as described above comprises forming the silicon nitride films on the both surfaces of the silicon substrate 707 covered with the oxide film, but the silicon nitride films may be formed on the both surfaces of a silicon substrate not covered with the silicon dioxide film or only the silicon dioxide films may be formed on the both sides of the silicon substrate 707.

The fabrication method as described above comprises forming the trench 707a by wet etching, but the trench 707a may be formed, for example, by dry etching.

Further, the fabrication method as described above comprises etching the silicon dioxide film 705 by wet etching, but the silicon dioxide film 705 may be etched by any type of etching, such as the plasma etching, the reactive ion etching, and the photo excited etching.

Embodiment 18

Next explained referring to FIG. 67 is a scanning probe microscope according to Embodiment 18 of the present invention using the cantilever shown in FIGS. 61 and 62 or the cantilever shown in FIG. 63 as described above. FIG. 67 is a schematic structural drawing of the scanning probe microscope.

This scanning probe microscope is provided with the cantilever 741 as shown in FIGS. 61 and 62 (or the cantilever as shown in FIG. 63), a cantilever holder 742 for supporting the cantilever 741, a cantilever moving device 743 for moving the cantilever holder 742 in the X-, Y-, and Z-directions (where the X-direction is defined as a direction perpendicular to the plane of FIG. 67, the Y-direction as a horizontal direction in FIG. 67, and the Z-direction as a vertical direction in FIG. 67), a drive circuit 744 for driving the moving device 743, a moving device 745 for coarsely moving a sample (specimen) 750 in the X-, Y-, and Z-directions, a drive circuit 746 for driving the moving device 745, a moving device 747 for finely moving the sample 750 in the X-, Y-, and Z-directions, a drive circuit 748 for driving the moving device 747, a mount stage 749 with electric conduction in which the sample 750 is mounted, a deflection detecting unit 751 for detecting a deflection of the thin-film beam portion of the cantilever according to the optical lever method etc., a tunnel current detecting unit 752 for detecting a tunnel current flowing between the projection of probe of cantilever 741 and the surface of sample 750, a capacitance detecting unit 753 for detecting a capacitance (which is an ac-wise electric capacity between the projection of probe of cantilever 741 and the surface of sample 750) of the sample 750, an arithmetic operation-control unit 754 consisting of a computer etc. for controlling the drive circuits 744, 753, 746 and executing predetermined operations as capturing detection signals from detectors 751, 752, 753, an input device 755 for the user to give a command or the like to the arithmetic operation-control unit, and a display device 756 for displaying a measurement result.

In the present embodiment, the moving devices 743, 745, 749 compose a scan unit for moving the cantilever 741 relative to the sample 750 to scan the sample 750 with the probe of the cantilever 741.

Using the scanning probe microscope, the user first sets the cantilever 741 in the cantilever holder 742. Next, the relative position of the cantilever 741 is set relative to the sample 750 to be measured by giving a command from the input device 755 to actuate the cantilever moving device 743 through the arithmetic operation-control unit 754 and drive circuit 744. Further, the moving device 745 is actuated through the arithmetic operation-control unit 754 etc. to move the sample 750 in the Z-direction before the tip of the probe of cantilever 741 comes into contact with the sample 750. On this occasion, contact between the probe of cantilever 741 and the sample 750 can be achieved by detecting a deflection of the thin-film beam portion of the cantilever 741 by the deflection detecting unit 751. After achieving the contact between the sample 750 and the probe of cantilever 741, the sample is scanned for example about 100 μm each in the X- and Y-directions as moving it in the Z-direction by the moving device 747 so as to keep constant the deflection of the thin-film beam portion of the cantilever 741 detected by the deflection detecting unit 751 or the tunnel current detected by the tunnel current detecting unit 752. The arithmetic operation-control unit 754 stores Z-directional positions or Z-directional heights of sample 750 and capacitance signals detected by the capacitance detecting unit 753 with reference to the positions on this occasion (i.e., XY coordinates), and for example, properly processes these data to indicate the measurement results on the display device 756.

Actual measurement was conducted using the cantilever 741 according to the above-discussed embodiment of the present invention in the microscope shown in FIG. 67 in this manner, and the measurement results confirmed that the surface topography image and capacitance image of sample 750 were able to be simultaneously measured and that the use of the cantilever according to the above-discussed embodiment of the present invention made stable measurement of over 10 hours possible whereas the measurement resolution of the conventional cantilever reduced to the half after scanning of one hour.

If the image of topography of the surface of specimen is obtained by the interatomic force, the tunnel current detecting unit 752 in FIG. 67 may be omitted; if the image of topography of the surface of specimen is obtained by the tunnel current, the deflection detecting unit 751 in FIG. 67 may be omitted.

Further, if only one is measured out of the surface topography image due to the interatomic force, the surface topography image due to the tunnel current, and the capacitance profile image, not performing the simultaneous measurement of the surface topography image and the capacitance profile image as in the embodiment shown in FIG. 67, only one corresponding detector may be left out of the detectors 751, 752, 753 in FIG. 67, and the other two detectors may be omitted.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 190626/1994, 308568/1994, 018458/1995, 097817/1995, 097818/1995, 198737/1995 filed on Aug. 12, 1994, Dec. 13, 1994, Jan. 10, 1995, Mar. 30, 1995, Mar. 30, 1995, Aug. 3, 1995 respectively are hereby incorporated by reference.

What is claimed is:

1. A cantilever comprising:
   a flexible plate formed of one or more layers of thin films;
   a support for supporting one end of said flexible plate;
   an electrically and thermally conductive probe projecting from a tip of said flexible plate; and
   a thermocouple formed by contact of two different kinds of metals, said contact being formed in only a tip portion of said probe.

2. A cantilever according to claim 1, wherein a tip of said probe has a sharp shape as a needle.

3. A scanning thermal profiler for measuring a thermal profile of a surface of a sample, comprising:
   a cantilever according to claim 1;
   a first moving mechanism for effecting relative movement between said support and said sample in a direction substantially parallel to said surface of the sample while keeping said probe in contact with said surface of the sample; and
   a thermal electromotive force detecting portion for detecting a thermal electromotive force generated in said thermocouple.

4. A scanning thermal profiler according to claim 3, wherein said plate is a spring body, said scanning thermal profiler further comprising:
   a deflection detecting portion for detecting a deflection of said plate;
   a second moving mechanism for effecting relative movement between said support and said sample in a direction substantially perpendicular to said surface of the sample so as to keep the deflection of said plate constant, based on a signal from said deflection detecting portion; and
   a movement amount detecting portion for detecting an amount of the relative movement between said support and said sample, effected by said second moving mechanism.

5. A scanning thermal profiler according to claim 4, wherein said deflection detecting portion is one utilizing an optical lever.

6. A scanning thermal profiler according to claim 3, further comprising:
   a plate drive portion for vibrating said plate by periodically moving said support;
   a vibration detecting portion for detecting a vibration frequency of said plate; and
   a second moving mechanism for effecting relative movement between said support and said sample in a direction substantially perpendicular to said surface of the sample so as to keep constant the vibration frequency of said plate, detected by said vibration detecting portion.

7. A scanning thermal profiler according to claim 6, wherein said plate drive portion is a piezoelectric device mounted to said plate.

8. A scanning thermal profiler according to claim 6, further comprising a movement amount detecting portion for detecting an amount of the relative movement between said support and said sample, effected by said second moving mechanism.

9. A scanning thermal profiler according to claim 3, further comprising an image display portion for displaying an image indicating a temperature profile of said sample, based on a signal from said thermal electromotive force detecting portion.

10. A cantilever according to claim 1, further comprising a heater for heating said probe.

11. A cantilever according to claim 10, wherein at least a part of a metal portion composing said thermocouple functions as a thermal conductor for guiding heat from said heater to said probe.

12. A cantilever comprising:
   a thin-film beam portion having an opening;
   a support for supporting one end of said thin-film beam portion; and
   a probe projecting from said thin-film beam portion, a through hole penetrating from a top part of said probe to said opening of said thin-film beam portion, wherein said probe is constructed of silicon dioxide formed by thermal oxidation of silicon.

13. A cantilever according to claim 12, further comprising a reflecting layer formed on a surface of said thin-film beam portion for reflecting a light beam for detecting a deflection of said thin-film beam portion.

14. A cantilever according to claim 12, further comprising a light shielding layer formed around said through hole for making a light beam travel only through said through hole.

15. A cantilever according to claim 12, wherein said thin-film beam portion is constructed of an inorganic material.

16. A cantilever according to claim 15, wherein said thin-film beam portion comprises silicon nitride.

17. A cantilever according to claim 15, wherein said thin-film beam portion comprises silicon dioxide.

18. A cantilever comprising:

a thin-film beam portion;

a support for supporting one end of said thin-film beam portion; and a probe projecting from said thin-film beam portion, said probe having a projection with electric conduction, and a silicon dioxide film, which covers a tip of said probe and surroundings of said projection, the thickness of said silicon dioxide film covering the tip of said probe being thinner than the thickness of said silicon dioxide film covering the surroundings of said projection.

19. A cantilever according to claim 18, wherein the thickness of said silicon dioxide film covering the tip of said probe is zero, so that a tip of said projection is exposed.

20. A cantilever according to claim 18, wherein a tip of said projection is projecting from said silicon dioxide film.

21. A cantilever according to claim 18, wherein said thin-film beam portion is composed of an inorganic film with electric insulation.

22. A cantilever according to claim 21, wherein said thin-film beam portion comprises silicon nitride.

23. A cantilever according to claim 21, wherein said thin-film beam portion comprises silicon dioxide.

24. A cantilever according to claim 18, further comprising a wiring pattern electrically connected to said probe which is formed on only a part of a top or bottom surface of said thin-film beam portion.

25. A cantilever according to claim 18, further comprising a wiring pattern electrically connected to said probe which is composed of a plurality of layers of different metals and formed on a surface of said thin-film beam portion.

26. A cantilever according to claim 18, further comprising a reflecting layer formed on a surface of said thin-film beam portion for reflecting a light beam for detecting a deflection of said thin-film beam portion.

27. A cantilever according to claim 18, further comprising a wiring pattern electrically connected to said probe which is formed on a surface of said thin-film beam portion, said wiring pattern having a function as a reflecting layer for reflecting a light beam for detecting a deflection of said thin-film beam portion.

28. A scanning probe microscope for observing a sample, comprising:

a thin-film beam portion;

a support for supporting one end of said thin-film beam portion;

a probe projecting from said thin-film beam portion, said probe having a projection with electric conduction, and a silicon dioxide film, which covers a tip of said probe and surroundings of said projection, the thickness of said silicon dioxide film covering the tip of said probe being thinner than the thickness of said silicon dioxide film covering the surroundings of said projection; and a first moving mechanism for effecting relative movement between said support and said sample in a direction substantially parallel to a surface of said sample.

29. A scanning probe microscope according to claim 28, wherein said thin-film beam portion is a spring body, said scanning probe microscope further comprising:

a deflection detecting portion for detecting a deflection of said thin-film beam portion;

a second moving mechanism for effecting relative movement between said support and said sample in a direction substantially perpendicular to the surface of said sample so as to keep the deflection of said thin-film beam portion constant, based on a signal from said deflection detecting portion; and a movement amount detecting portion for detecting an amount of the relative movement between said support and said sample, effected by said second moving mechanism.

30. A scanning probe microscope according to claim 28, further comprising a tunnel current detecting unit for detecting a tunnel current flowing between said projection of said probe and the surface of said sample.

31. A scanning probe microscope according to claim 28, further comprising a capacitance detecting unit for detecting an ac-wise capacitance between said projection of said probe and the surface of said sample.

* * * * *